US006587837B1

(12) United States Patent
Spagna et al.

(10) Patent No.: US 6,587,837 B1
(45) Date of Patent: Jul. 1, 2003

(54) METHOD FOR DELIVERING ELECTRONIC CONTENT FROM AN ONLINE STORE

(75) Inventors: Richard Spagna, Boca Raton, FL (US); Kenneth Louis Milsted, Boynton Beach, FL (US); David P. Lybrand, Lantana, FL (US); Edgar Downs, Fort Lauderdale, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/203,315

(22) Filed: Dec. 1, 1998

Related U.S. Application Data

(60) Division of application No. 09/177,096, filed on Oct. 22, 1998, now Pat. No. 6,389,538, which is a continuation-in-part of application No. 09/133,519, filed on Aug. 13, 1998, now Pat. No. 6,226,618.

(51) Int. Cl.⁷ .............................................. G06F 17/60
(52) U.S. Cl. .......................................... 705/26; 705/50
(58) Field of Search .............................. 705/50, 51, 52, 705/54, 1, 26; 380/4, 21, 24, 25, 44

(56) References Cited

U.S. PATENT DOCUMENTS

| 4,200,770 A | 4/1980 | Hellman et al. |
|---|---|---|
| 4,218,582 A | 8/1980 | Hellman et al. |
| 4,272,810 A | 6/1981 | Gates et al. |
| 4,405,829 A | 9/1983 | Rivest et al. |
| 4,424,414 A | 1/1984 | Hellman et al. |
| 4,463,387 A | 7/1984 | Hashimoto et al. |
| 4,528,643 A | 7/1985 | Freeny, Jr. |
| 4,731,840 A | 3/1988 | Mniszewski et al. |
| 4,757,534 A | 7/1988 | Matyas et al. |
| 4,782,529 A | 11/1988 | Shima |
| 4,803,725 A | 2/1989 | Horne et al. |
| 4,809,327 A | 2/1989 | Shima |
| 4,825,306 A | 4/1989 | Robers |
| 4,868,687 A | 9/1989 | Penn et al. |
| 4,868,877 A | 9/1989 | Fischer |
| 4,878,246 A | 10/1989 | Pastor et al. |
| 4,879,747 A | 11/1989 | Leighton et al. |
| 4,905,163 A | 2/1990 | Garber et al. |
| 4,926,479 A | 5/1990 | Goldwasser et al. |
| 4,944,006 A | 7/1990 | Citta et al. |

(List continued on next page.)

FOREIGN PATENT DOCUMENTS

| WO | WO 97/43717 | 11/1997 |
|---|---|---|
| WO | WO 98/13970 | 4/1998 |

OTHER PUBLICATIONS

J. Linn, "Privacy Enhancement for Internet Electronic Mail: Part I: Message Encryption and Authentication Procedures", RFC 1421, Feb., 1993, pp. 1–37.

S. Kent, "Privacy Enhancement of Internet Electronic Mail: Part II: Certificate–Based Key Management". RFC 1422, Feb., 1993, pp. 1–28.

D. Balenson, "Privace Enhancement for Internet Electronic Mail: Part III: Algorithms, Modes, and Identifiers", RFC 1423, Feb. 1993, pp. 1–13.

B. Kaliski, "Privacy Enhancement for Internet Electronic Mail: Part IV: Key Certification and Related Services", RFC 1424, Feb. 1993, pp. 1–8.

*Primary Examiner*—Vincent Millin
*Assistant Examiner*—Geoffrey Akers
(74) *Attorney, Agent, or Firm*—David M. Shofi; Jon A. Gibbons; Fleit, Kain, Gibbons, Gutman & Bongini P.L.

(57) ABSTRACT

A method for permitting the electronic delivery of digital content. Metadata is acquired which has been previously associated with content. Promotional metadata is extracted for use with a electronic store. At least one of the metadata is altered to create offer data. And at least one of the metadata is altered to create transaction data. In accordance with another aspect of the invention, a computer readable medium is described to carry out the above method.

28 Claims, 21 Drawing Sheets

U.S. PATENT DOCUMENTS

| | | |
|---|---|---|
| 4,995,082 A | 2/1991 | Schnorr |
| 5,005,200 A | 4/1991 | Fischer |
| 5,130,792 A | 7/1992 | Tindell et al. |
| 5,159,634 A | 10/1992 | Reeds, III |
| 5,214,702 A | 5/1993 | Fischer |
| 5,220,604 A | 6/1993 | Gasser et al. |
| 5,224,163 A | 6/1993 | Gasser et al. |
| 5,224,166 A | 6/1993 | Hartman, Jr. |
| 5,260,788 A | 11/1993 | Takano et al. |
| 5,261,002 A | 11/1993 | Perlman et al. |
| 5,276,901 A | 1/1994 | Howell et al. |
| 5,315,658 A | 5/1994 | Micali |
| 5,319,705 A | 6/1994 | Halter et al. |
| 5,347,580 A | 9/1994 | Molva et al. |
| 5,355,302 A | 10/1994 | Martin et al. |
| 5,369,705 A | 11/1994 | Bird et al. |
| 5,371,794 A | 12/1994 | Diffie et al. |
| 5,412,717 A | 5/1995 | Fischer |
| 5,420,927 A | 5/1995 | Micali |
| 5,497,421 A | 3/1996 | Kaufman et al. |
| 5,509,071 A | 4/1996 | Petrie, Jr. et al. |
| 5,519,778 A | 5/1996 | Leighton et al. |
| 5,537,475 A | 7/1996 | Micali |
| 5,557,541 A | 9/1996 | Schulhof et al. |
| 5,581,479 A | 12/1996 | McLaughlin et al. |
| 5,588,060 A | 12/1996 | Aziz |
| 5,592,664 A | 1/1997 | Starkey |
| 5,604,804 A | 2/1997 | Micali |
| 5,606,617 A | 2/1997 | Brands |
| 5,636,139 A | 6/1997 | McLaughlin et al. |
| 5,646,999 A * | 7/1997 | Saito .......................... 380/25 |
| 5,666,420 A | 9/1997 | Micali |
| 5,673,316 A | 9/1997 | Auerbach et al. |
| 5,675,734 A | 10/1997 | Hair |
| 5,710,887 A | 1/1998 | Chelliah et al. |
| 5,796,841 A | 8/1998 | Cordery et al. |
| 5,799,088 A * | 8/1998 | Raike .......................... 380/30 |
| 5,862,223 A * | 1/1999 | Walker et al. ............... 380/25 |
| 5,864,620 A * | 1/1999 | Pettitt .......................... 380/4 |
| 5,892,900 A | 4/1999 | Ginter et al. |
| 5,960,086 A * | 9/1999 | Atalla .......................... 380/44 |
| 5,982,891 A * | 11/1999 | Ginter et al. ................. 380/4 |
| 6,009,177 A * | 12/1999 | Sudia .......................... 380/25 |
| 6,064,989 A * | 5/2000 | Cordery et al. .............. 705/50 |
| 6,192,473 B1 * | 2/2001 | Ryan .......................... 713/168 |
| 6,226,618 B1 * | 5/2001 | Downs .......................... 705/1 |

\* cited by examiner

SCHEDULE DOWNLOAD
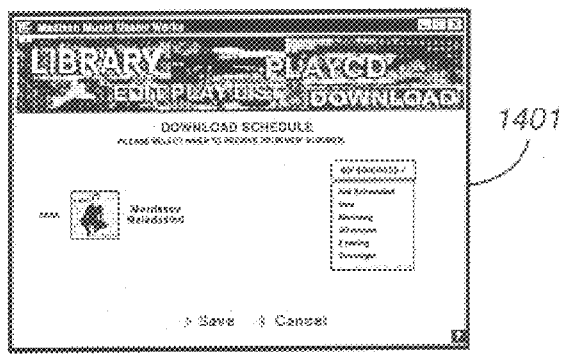
↓ USER STARTS A DOWNLOAD
DOWNLOAD
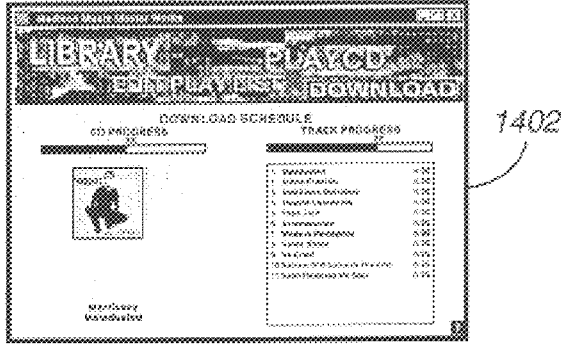
↓ DOWNLOAD COMPLETES
LIBRARY
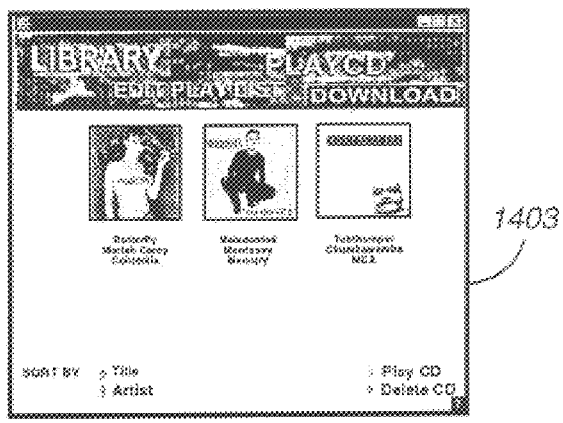
*FIG. 14*

ALTERNATE EMBODIMENT FOR THE WORK FLOW MANAGER

METHOD FOR DELIVERING ELECTRONIC CONTENT FROM AN ONLINE STORE

CROSS-REFERENCE TO RELATED APPLICATIONS

This is a divisional of application Ser. No. 09/177,096, filed Oct. 22, 1998, now U.S. Pat. No. 6,389,538, which is a continuation-in-part of application Ser. No. 09/133,519, filed Aug. 13, 1998, now U.S. Pat. No. 6,226,618. The entire disclosure of prior application Ser. No. 09/177,096 is herein incorporated by reference.

This is a continuation-in-part of application Ser. No. 09/133,519, filed Aug. 13, 1998, now U.S. Pat No. 6,226,618. The entire disclosure of prior application Ser. No. 09/133,519 is herein incorporated by reference. Additionally, this application claims subject matter that is technically related to the following applications that are commonly assigned herewith to International Business Machines Corporation (IBM).

| ATTORNEY DOC. NO. | APPLICATION SER. NO. | TITLE OF THE INVENTION | INVENTOR(S) |
|---|---|---|---|
| SE9-98-006 | | Secure Electronic Content Management | Kenneth L. Milsted George Gregory Gruse Marco M. Hurtado Edgar Downs Cesar Medina |
| SE9-98-007 | | Multimedia Player Toolkit | George Gregory Gruse John J. Dorak, Jr. Kenneth L. Milsted |
| SE9-98-008 | | Multimedia Content Creation System | Kenneth L. Milsted Qing Gong Edgar Downs |
| SE9-98-010 | | Key Management System for End-User Digital Player | Jeffrey B. Lotspiech Marco M. Hurtado George Gregory Gruse Kenneth L. Milsted |
| SE9-98-011 | | Multi-media player for an Electronic Content Delivery System | Marco M. Hurtado George Gregory Gruse Edgar Downs Kenneth L. Milsted |
| SE9-98-013 | | A method to identify CD content | Kenneth L. Milsted Craig Kindell Qing Gong |
| SE9-98-015 | | A method and apparatus to automatically create encode digital content | Kenneth L. Milsted Kha Kinh Nguyen Qing Gong |
| SE9-98-016 | | A method and apparatus to indicate an encoding rate for digital content | Kenneth L. Milsted Qing Gong |

BACKGROUND OF THE INVENTION

1. Field of the Invention

The invention disclosed broadly relates to the field of electronic commerce and more particularly to a system and related tools for the secure delivery and rights management of digital assets, such as print media, films, games, and music over global communications networks such as the Internet and the World Wide Web.

2. Description of the Related Art

The use of global distribution systems such as the Internet for distribution of digital assets such as music, film, computer programs, pictures, games and other content continues to grow. At the same time owners and publishers of valuable digital content have been slow to embrace the use of the Internet for distribution of digital assets for several reasons. One reason is that owners are afraid of unauthorized copying or pirating of digital content The electronic delivery of digital content removes several barriers to pirating. One barrier that is removed with electronic distribution is the requirement of the tangible recordable medium itself (e.g., diskettes or CD ROMs). It costs money to copy digital content on to tangible media, albeit, in many cases less than a dollar for a blank tape or recordable CD. However, in the case of electronic distribution, the tangible medium is no longer needed. The cost of the tangible medium is not a factor because content is distributed electronically. A second barrier, is the format of the content itself i.e. is the content stored in an analog format versus a digital format. Content stored in an analog format,.for example, a printed picture, when reproduced by photocopying, the copy is of lesser quality than the original. Each subsequent copy of a copy, sometimes called a generation, is of less quality than the original. This degradation in quality is not present when a picture is stored digitally. Each copy, and every generation of copies can be as clear and crisp as the original. The aggregate effect of perfect digital copies combined with the very low cost to distribute content electronically and to distribute content widely over the Internet makes it relatively easy to pirate and distribute unauthorized copies. With a couple of keystrokes, a pirate can send hundreds or even of thousands of perfect copies of digital content over the Internet. Therefore a need exists to ensure the protection and security of digital assets distributed electronically.

Providers of digital content desire to establish a secure, global distribution system for digital content that protects the rights of content owners. The problems with establishing a digital content distribution system includes developing systems for digital content electronic distribution, rights management, and asset protection. Digital content that is distributed electronically includes content such as print media, films, games, programs, television, multimedia, and music.

The deployment of an electronic distribution system provides the digital content providers the ability to achieve fast settlement of payment through immediate sales reporting and electronic reconciliation as well as gain secondary sources of revenue through redistribution of content. Since the electronic digital content distribution system is not affected by physical inventory outages or returns, the digital content providers and retailers may realize reduced costs and improved margins. Digital content providers could facilitate new, or augment existing, distribution channels for better timed-release of inventory. The transactional data from the electronic distribution system could be used to obtain information regarding consumer buying patterns as well as to provide immediate feedback on electronic marketing programs and promotions. In order to meet these goals, a need exists for digital content providers to use an electronic distribution model to make digital content available to a wide range of users and businesses while ensuring protection and metering of digital assets.

Other commercially available electronic distribution systems for digital content, such as real audio, A2B from AT&T, Liquid Audio Pro from Liquid Audio Pro Corp., City Music Network from Audio Soft and others offer transmission of digital data over secured and unsecured electronic networks. The use of secured electronic networks greatly reduces the requirement of digital content providers of distributing digital to a wide audience. The use of unsecured networks such as the Internet and Web allows the digital content to arrive to an end-user securely such as through the use of encryption. However, once the encrypted digital content is de-encrypted on the end-user'machine, the digital content is readily available to the end-user for unauthorized re-distribution. Therefore a need exists for a secure digital content electronic distribution system that provides protection of digital assets and ensures that the Content Provider (s)' rights are protected even after the digital content is delivered to consumers and businesses. A need thus exists for rights management to allow for secure delivery, licensing authorization, and control of the usage of digital assets.

Another reason owners of digital content have been slow to embrace electronic distribution is their desire to maintain and foster existing channels of distribution. Most content owners sell through retailers. In the music market these U.S. retailers include Tower Records, Peaches, Blockbuster, Circuit City and others. Many of these retailers have Web sites that allow Internet users to makes selections over the Internet and have selections mailed to the end-user. Example music Web sites include @tower, Music Boulevard and Columbia House. The use of electronic distribution can remove the ability of the retail stores from differentiating themselves from each other and differentiate themselves from the content owners, especially on the Web. Therefore a need exists to provide retailers of electronic content such as pictures, games, music, programs and videos a way to differentiate themselves from each other and the content owners when selling music through electronic distribution.

Content owners prepare their digital content for electronic distribution through distribution sites such as electronic stores. Electronic stores on the Internet, or through other online services, want to differentiate themselves from each other by their product offerings and product promotions. A traditional store, i.e.—the non-electronic, non-online analogs to electronic stores—use product promotions, product sales, product samples, liberal return policies and other promotional programs to differentiate themselves from their competitors. However, in the online world where the content providers impose usage conditions on the digital content, the ability of electronic stores to differentiate themselves may be severely limited. Moreover, even if the usage conditions can be changed, electronic stores are faced with the difficult task of processing the metadata associated with the digital content from the content providers to promote and sell products electronically. Electronic stores need to manage several requirements when processing the metadata. First, the electronic store is required to receive the metadata associated with the digital content from the content providers. Many times, parts of this metadata may be sent encrypted, so the content provider must create a mechanism to decrypt the encrypted content. Second, the electronic store may wish to preview metadata from the content provider either before the content is received from the content provider or after the content is received by the electronic store, in order to assist with product marketing, product positioning and other promotional considerations for the content. Third, the electronic store is required to extract certain metadata used for promotional materials such as graphics and artist information. Often, this promotional material is used directly by the electronic store in its online promotions. Fourth, the electronic stores may wish to differentiate themselves from one another by modifying some of the permitted usage conditions to create different offerings of the digital content. Fifth, the electronic store may have to insert or alter certain address, such as URLs, in the metadata to direct payment reconciliation to an account reconciliation house automatically by the purchaser without the need to go through the electronic store for payment clearance. Sixth, the electronic store may need to create licenses for the permitted use of the copyrighted digital content that match usage conditions. For example, the license may grant the permission to make a limited number of copies of the digital content. A license is needed to reflect the terms and conditions of the permission granted.

In light of all these requirements, to process the metadata related to the digital content, many electronic stores write customized software programs to handle these requirements. The time, cost and testing needed to create these customized software programs can be large. Accordingly, a need exists to provide a solution to these requirements.

Still, another reason owners of digital content have been slow to embrace electronic distribution is the difficulty in preparing content for electronic distribution. Today, many providers of content have thousands or even tens of thousands of titles in their portfolio. In a music example, it is not unusual for a content owner to have a single master sound recording available on several different formats simultaneously (e.g. CD, tape and MiniDisc). In addition, a single format can have a master sound recording re-mastered or re-mixed for a specific distribution channel. As an example, the mixing for broadcast radio may be different than the mixing for a dance club sound track, which may be different than a generally available consumer CD. Inventorying and keeping track of these different mixes can be burdensome. Moreover, many owners of master recordings often times re-issue old recordings in various subsequent collections, such as "The Best Of", or in compilations for musical sound tracks to movies and other collections or compilations. As more content is offered digitally, the need to re-mix and encode the content for electronic distribution grows. Many times providers need to use old recording formats as guides to select the correct master sound recordings and have these sound recordings reprocessed and encoded for release for electronic distribution. This may be especially true for content providers that wish to use their old formats to assist them in re-releasing the old sound recording for electronic distribution. Providers will look through databases to match up titles, artists and sound recordings to set the encoding parameters. This process of manually searching databases for recording portfolios is not without its shortcomings. One shortcoming is the need to have an operator manually search a database and set the processing parameters appropriately. Another shortcoming is the possibility of operator transcription error in selecting data from a database. Accordingly, a need exists to provide content providers a method to automatically retrieve associated data and master recordings for content such as audio.

Content owners prepare their digital content for electronic distribution through a process known as encoding. Encoding involves taking the content, digitizing it, if the content is presented in an analog format, and compressing it. The process of compressing allows the digital content to be transferred over networks and stored on recordable medium more efficiently because the amount of data transmitted or stored is reduced. However, compression is not without its shortcomings. Most compression involves the loss of some information, and is called lossy compression. Content providers must make decisions on what compression algorithm to use and the compression level required. For example, in music, the digital content or song may have very different characteristics depending on the genre of the music. The compression algorithm and compression level selected for one genre may not be the optimal choice for another genre of music. Content providers may find certain combinations of compression algorithms and compression levels work very well for one genre of music, say classical, but provide unsatisfactory results for another genre of music such as heavy metal. Moreover, audio engineers must often equalize the music, perform dynamic range adjustments and perform other preprocessing and processing settings to ensure the genre of music encoded produces the desired results. The requirement to always have to manually set these encoding parameters such as setting the equalization levels and the dynamic range settings for each digital content can be burdensome. Returning to the music example, a content provider for music with a collection covering a variety of musical genre would have to manually select for each song or set of songs to be encoded, the desired combination of encoding parameters. Accordingly, a need exists to overcome the need for manually selection of process parameters for encoding.

The process to compress content can require a large amount of dedicated computational resources, especially for larger content items such as full-length feature movies. Providers of compression algorithms offer various tradeoffs and advantages associated with their compression techniques. These tradeoffs include: the amount of time and computational resources needed to compress the content; the amount of compression achieved from the original content; the desired bit rate for playback; the performance quality of the compressed content; and other factors. Using an encoding program which take as input a multimedia file and generate an encoded output file with no interim indication of progress or status is a problem. Moreover, in many circumstances, other programs are used to call or to manage an encoding program with no interim indication of progress. This leaves the calling application with no way to gauge the amount of content that has been encoded as a percentage of the entire selection of designated to be encoded. In circumstances where the calling program is trying to schedule several different programs to run at once this can be a problem. Furthermore, this can be especially burdensome in cases where batches of content have been selected for encoding and the content provider wants to determine the progress of the encoding process. Accordingly, a need exists to overcome these problems.

Yet, still another reason digital content providers have been slow to adopt electronic distribution for their content is lack of standards for creating digital players on end-user devices for electronically delivered content. Content providers, electronic stores, or others in the electronic distribution chain may want to offer customized players on a variety of devices such as PCS, set-top boxes, hand-held devices and more. A set of tools that can handle the decryption of the digital content in a tamper resistant environment, that is, an environment to deter the unauthorized access to the content during playing by a third party is needed. Moreover, a set of tools is needed to enable an end user to manage of a local library of digital content without allowing the end user to have access to the content for uses other than what was purchased.

Further information on the background of protecting digital content can be found from the following three sources. "Music on the Internet and the Intellectual Property Protection Problem" by Jack Lacy, James Snyder, David Maher, of AT&T Labs, Florham Park, N.J. available online URL http://www.a2bmusic.com/about/papers/musicipp.htm. Cryptographically protected container, called DigiBox, in the article "Securing the Content, Not the Wire for Information Commerce" by Olin Sibert, David Bernstein and David Van Wie, InterTrust Technologies Corp. Sunnyvale, Calif. available online URL http://www.intertrust.con/architecture/stc.html. And "Cryptolope Container Technology", an IBM White Paper, available online URL http:///cyptolope.ibm.com/white.htm.

SUMMARY OF THE INVENTION

It is an object of the present invention to remove the above-mentioned drawbacks and to provide a system for tracking usage of content data. One embodiment of the present invention provides a system for tracking usage of digital content on user devices. Electronic stores coupled to a network sell licenses to play digital content data to users. Content players, which receive from the network the licensed content data, are used to play the licensed content data. Additionally, a logging site that is coupled to the network tracks the playing of the content data. In particular, the logging site receives play information from the network, and the play information includes the number of times that the content data has been played by the associated content player.

A further embodiment of the present invention provides a method for tracking usage of digital content on user devices. According to the method, a license to play digital content data is sold to a user, and the licensed content data is transmitted to a content player for the user. Further, information is transmitted to a logging site whenever the content data is played by the content player or copied from the content player to an external medium so that usage of the licensed content data can be tracked.

BRIEF DESCRIPTION OF THE DRAWINGS

FIG. 14 is an example of user interface screens of the Player Application downloading content to a local library as described in FIG. 15 according to the present invention.

DETAILED DESCRIPTION OF AN EMBODIMENT

Figure 1A:
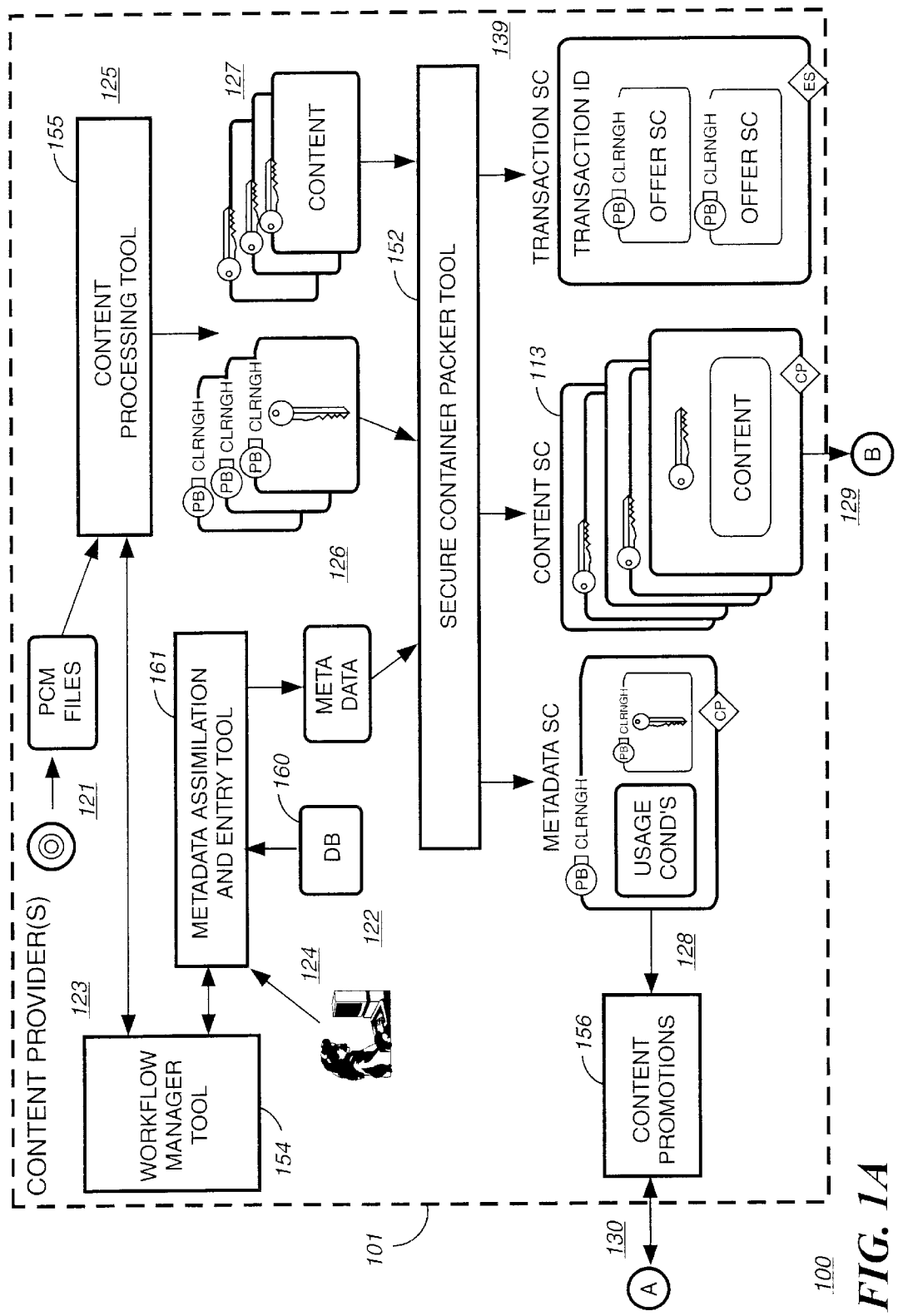
FIG. 1 is a block diagram illustrating an over view of a Secure Digital Content Electronic Distribution System according to the present invention.
Figure 1B:
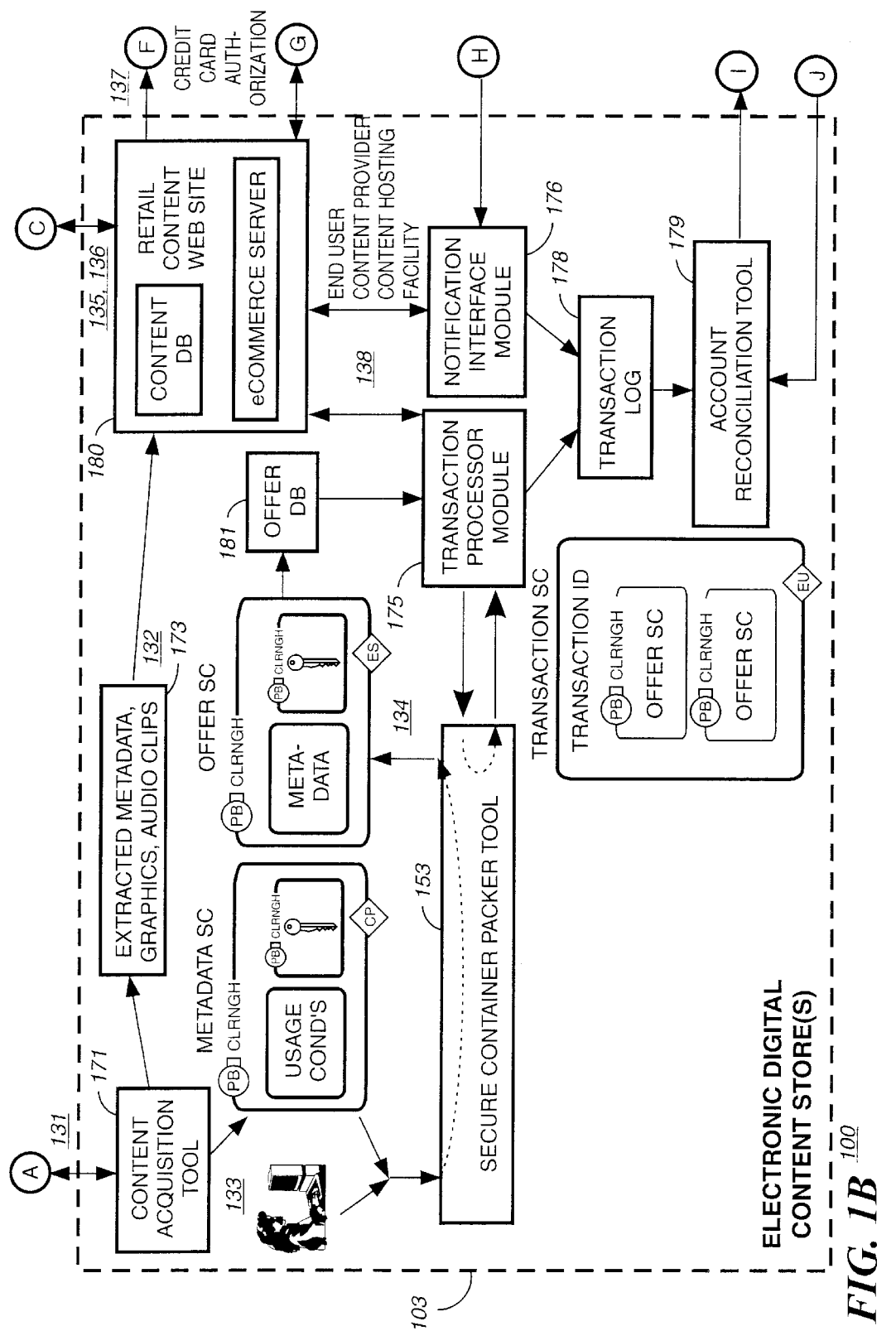
Figure 1C:
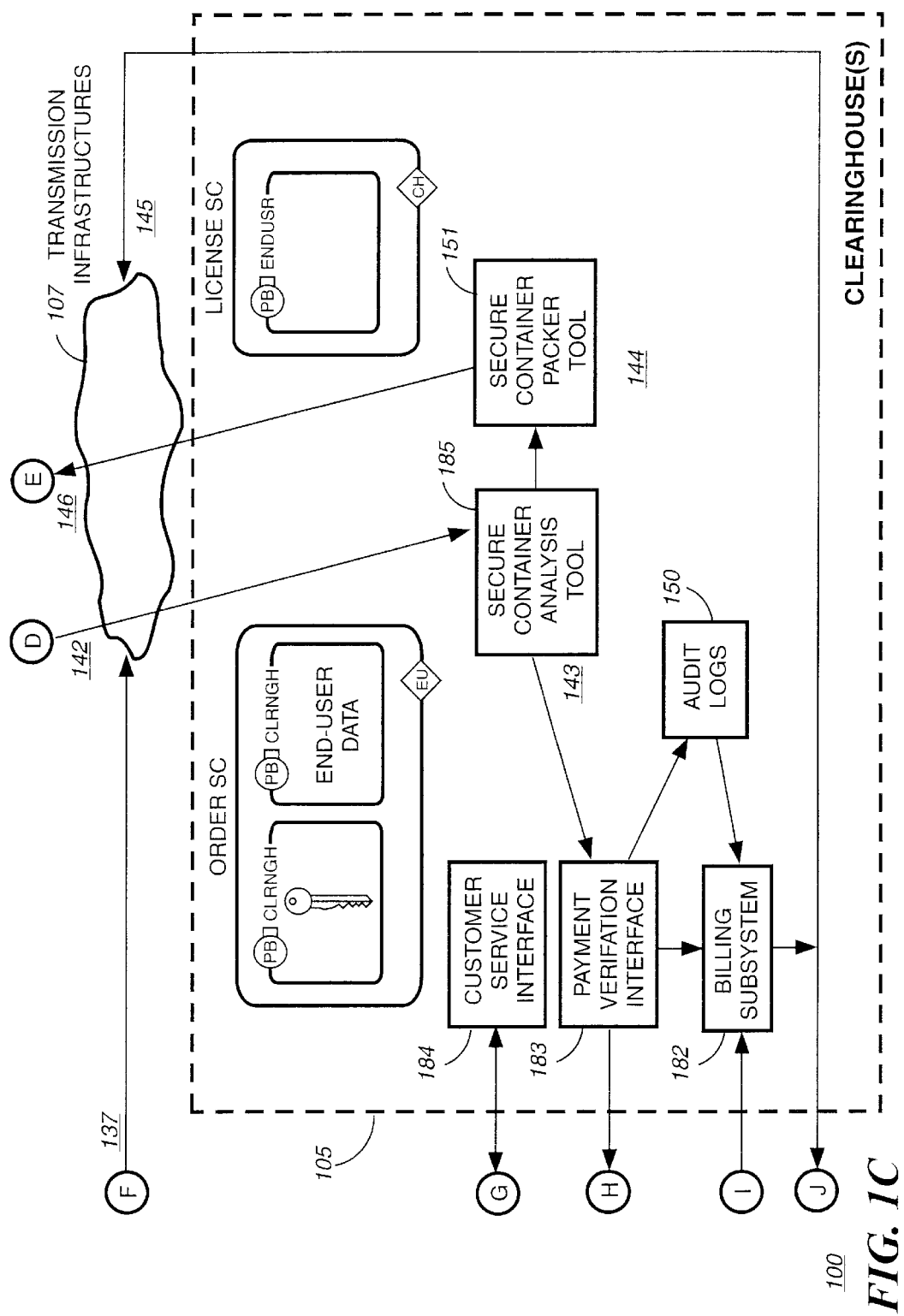
Figure 1D:
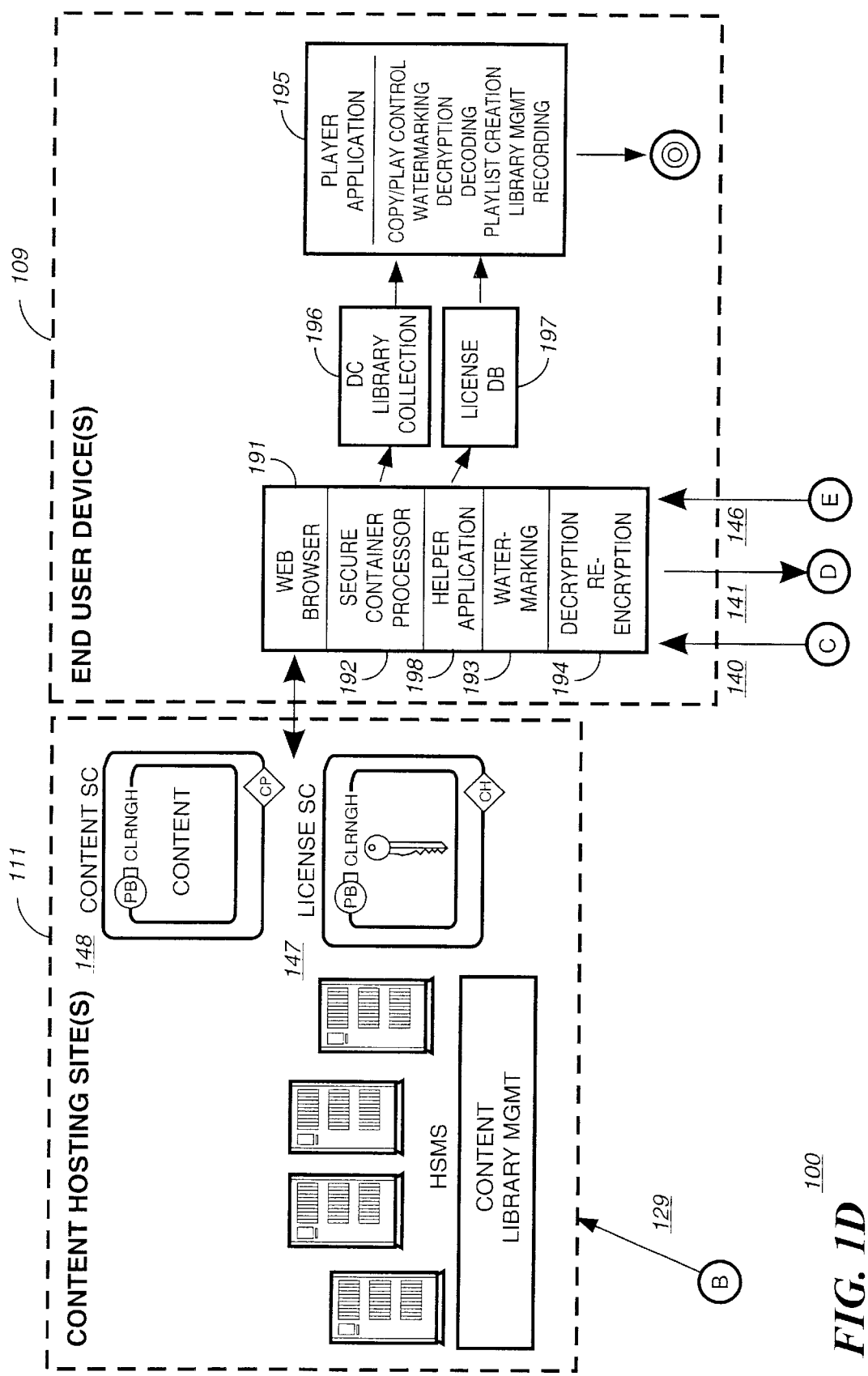

A Table of Contents is provided for this present invention to assist the reader in quickly locating different sections in this embodiment.

I. SECURE DIGITAL CONTENT ELECTRONIC DISTRIBUTION SYSTEM
  A. System Overview
    1. Rights Management
    2. Metering
    3. Open Architecture
  B. System Functional Elements
    1. Content Provider(s)
    2. Electronic Digital Content Store(s)
    3. Intermediate Market Partners
    4. Clearinghouse(s)
    5. End-User Device(s)
    6. Transmission Infrastructures
  C. System Uses II. CRYPTOGRAPHY CONCEPTS AND THEIR APPLICATION TO THE SECURE DIGITAL CONTENT ELECTRONIC DISTRIBUTION SYSTEM
  A. Symmetric Algorithms
  B. Public Key Algorithms
  C. Digital Signature
  D. Digital Certificates
  E. Guide To The SC(s) Graphical Representation
  F. Example of a Secure Container Encryption

III. SECURE DIGITAL CONTENT ELECTRONIC DISTRIBUTION SYSTEM FLOW

IV. RIGHTS MANAGEMENT ARCHITECTURE MODEL
  A. Architecture Layer Functions
  B. Function Partitioning and Flows
    1. Content Formatting Layer
    2. Content Usage Control Layer
    3. Content Identification Layer
    4. License Control Layer
  C. Content Distribution and Licensing Control V. SECURE CONTAINER STRUCTURE
  A. General Structure
  B. Rights Management Language Syntax and Semantics
  C. Overview of Secure Container Flow and Processing
  D. Metadata Secure Container 620 Format
  E. Offer Secure Container 641 Format
  F. Transaction Secure Container 640 Format
  G. Order Secure Container 650 Format
  H. License Secure Container 660 Format
  I. Content Secure Container Format VI. SECURE CONTAINER PACKING AND UNPACKING
  A. Overview
  B. Bill of Materials (BOM) Part
  C. Key Description Part VII. CLEARINGHOUSE(S)
  A. Overview
  B. Rights Management Processing
  C. Country Specific Parameters
  D. Audit Logs and Tracking
  E. Reporting of Results
  F. Billing and Payment Verification
  G. Retransmissions VIII. CONTENT PROVIDER
  A. Overview
  B. Work Flow Manager
    1. Products Awaiting Action/information Process
    2. New Content Request Process
    3. Automatic Metadata Acquisition Process
    4. Manual Metadata Entry Process
    5. Usage Conditions Process
    6. Supervised Release Process
    7. Metadata SC(s) Creation Process
    8. Watermarking Process
    9. Preprocessing and Compression Process
    10. Content Quality Control Process
    11. Encryption Process
    12. Content SC(s) Creation Process
    13. Final Quality Assurance Process
    14. Content Dispersement Process
    15. Work Flow Rules C. Metadata Assimilation and Entry Tool
 1. Automatic Metadata Acquisition Tool
 2. Manual Metadata Entry Tool
 3. Usage Conditions Tool
 4. Parts of the Metadata SC(s)
 5. Supervised Release Tool
D. Content Processing Tool
 1. Watermarking Tool
 2. Preprocessing and Compression Tool
 3. Content Quality Control Tool
 4. Encryption Tool
E. Content SC(s) Creation Tool
F. Final Quality Assurance Tool
G. Content Dispersement Tool
H. Content Promotions Web Site
I. Content Hosting
 1. Content Hosting Sites
 2. Content Hosting Site(s) 111 provided by the Secure Digital Content Electronic Distribution System
IX. ELECTRONIC DIGITAL CONTENT STORE(S)
 A. Overview—Support for Multiple Electronic Digital Content Store(s)
 B. Point-to-Point Electronic Digital Content Distribution Service
  1. Integration Requirements
  2. Content Acquisition Tool
  3. Transaction Processing Module
  4. Notification Interface Module
  5. Account Reconciliation Tool
 C. Broadcast Electronic Digital Content Distribution Service
X. END-USER DEVICE(S)
 A. Overview
 B. Application Installation
 C. Secure Container Processor
 D. The Player Application
  1. Overview
  2. End-User Interface Components
  3. Copy/Play Management Components
  4. Decryption 1505, Decompression 1506 and Playback Components
  5. Data Management 1502 and Library Access Components
  6. Inter-application Communication Components
  7. Other Miscellaneous Components
  8. The Generic Player I. Secure Digital Content Electronic Distribution System A. System Overview The Secure Digital Content Electronic Distribution System is a technical platform that encompasses the technology, specifications, tools, and software needed for the secure delivery and rights management of Digital Content and digital content-related content to an end-user, client device. The End-User Device(s) include PCS, set top boxes (IRDs), and Internet appliances. These devices may copy the content to external media or portable, consumer devices as permitted by the content proprietors. The term Digital Content or simply Content, refers to information and data stored in a digital format including: pictures, movies, videos, music, programs, multimedia and games.

The technical platform specifies how Digital Content is prepared, securely distributed through point-to-point and broadcast infrastructures (such as cable, Internet, satellite, and wireless) licensed to End-User Device(s), and protected against unauthorized copying or playing. In addition, the architecture of the technical platform allows for the integration and migration of various technologies such as watermarking, compression/encoding, encryption, and other security algorithms as they evolve over time.

The base components of the Secure Digital Content Electronic Distribution System are: (1) rights management for the protection of ownership rights of the content proprietor; (2) transaction metering for immediate and accurate compensation; and (3) an open and well documented architecture that enables Content Provider(s) to prepare content and permit its secure delivery over multiple network infrastructures for playback on any standard compliant player.

1. Rights Management Rights management in the Secure Digital Content Electronic Distribution System is implemented through a set of functions distributed among the operating components of the system. Its primary functions include: licensing authorization and control so that content is unlocked only by authorized intermediate or End-User(s) that have secured a license; and control and enforcement of content usage according to the conditions of purchase or license, such as permitted number of copies, number of plays, and the time interval or term the license may be valid. A secondary function of rights management is to enable a means to identify the origin of unauthorized copies of content to combat piracy.

Licensing authorization and control are implemented through the use of a Clearinghouse(s) entity and Secure Container (SC) technology. The Clearinghouse(s) provides licensing authorization by enabling intermediate or End-User(s) to unlock content after verification of a successful completion of a licensing transaction. Secure Containers are used to distribute encrypted content and information among the system components. A SC is a cryptographic carrier of information or content that uses encryption, digital signatures, and digital certificates to provide protection against unauthorized interception or modification of electronic information and content. It also allows for the verification of the authenticity and integrity of the Digital Content. The advantage of these rights management functions is that the electronic Digital Content distribution infrastructure does not have to be secure or trusted. Therefore allowing transmission over network infrastructures such as the Web and Internet. This is due to the fact that the Content is encrypted within Secure Containers and its storage and distribution are separate from the control of its unlocking and use. Only users who have decryption keys can unlock the encrypted Content, and the Clearinghouse(s) releases decryption keys only for authorized and appropriate usage requests. The Clearinghouse(s) will not clear bogus requests from unknown or unauthorized parties or requests that do not comply with the content'usage conditions as set by the content proprietors. In addition, if the SC is tampered with during its transmission, the software in the Clearinghouse(s) determines that the Content in a SC is corrupted or falsified and repudiate the transaction.

The control of Content usage is enabled through the End-User Player Application 195 running on an End-User Device(s). The application embeds a digital code in every copy of the Content that defines the allowable number of secondary copies and play backs. Digital watermarking technology is used to generate the digital code, to keep it hidden from other End-User Player Application 195, and to make it resistant to alteration attempts. In an alternate embodiment, the digital code is just kept as part of the usage conditions associated with the Content 113. When the Digital Content 113 is accessed in a compliant End-User Device (s), the End-User Player Application 195 reads the watermark to check the use restrictions and updates the watermark as required. If the requested use of the content does not comply with the usage conditions, e.g., the number of copies has been exhausted, the End-User Device(s) will not perform the request.

Digital watermarking also provides the means to identify the origin of authorized or unauthorized copies of Content. An initial watermark in the Content is embedded by the content proprietor to identify the content proprietor, specify copyright information, define geographic distribution areas, and add other pertinent information. A second watermark is embedded in the Content at the End-User Device(s) to identify the content purchaser (or licensee) and End-User Device(s), specify the purchase or license conditions and date, and add any other pertinent information.

Since watermarks become an integral part of the Content, they are carried in the copies independent of whether the copies were authorized or not. Thus the Digital Content always contains information regarding its source and its permitted use regardless of where the content resides or where it comes from. This information may be used to combat illegal use of the Content.

2. Metering

As part of its rights management functions, the Clearinghouse(s) keeps a record of all transactions where a key exchange is cleared through the Clearinghouse(s). This record allows for the metering of licensing authorization and the original conditions of use. The transaction record can be reported to responsible parties, such as, content proprietors or Content Provider(s), retailers, and others, on an immediate or periodic basis to facilitate electronic reconciliation of transaction payments and other uses.

3. Open Architecture

The Secure-Digital Content Electronic Distribution System (System) is an open architecture with published specifications and interfaces to facilitate broad implementation and acceptance of the System in the market place while maintaining rights protection for the content proprietors. The flexibility and openness of the System architecture also enable the System to evolve over time as various technologies, transmission infrastructures, and devices are delivered to the marketplace.

The architecture is open regarding the nature of the Content and its format. Distribution of audio, programs, multimedia, video, or other types of Content is supported by the architecture. The Content could be in a native format, such as linear PCM for digital music, or a format achieved by additional preprocessing or encoding, such as filtering, compression, or pre/de-emphasis, and more. The architecture is open to various encryption and watermarking techniques. It allows for the selection of specific techniques to accommodate different Content types and formats and to allow the introduction or adoption of new technologies as they evolve. This flexibility allows Content Provider(s) to pick and evolve the technologies they use for data compression, encryption, and formatting within the Secure Digital Content Electronic Distribution System.

The architecture is also open to different distribution networks and distribution models. The architecture supports content distribution over low-speed Internet connections or high-speed satellite and cable networks and can be used with point-to-point or broadcast models. In addition, the architecture is designed so that the functions in the End-User Device(s) can be implemented on a wide variety of devices, including low cost consumer devices. This flexibility allows Content Provider(s) and retailers to offer Content to intermediate or End-User(s) through a variety of service offerings and enables the users to purchase or license Content, play it back, and record it on various compliant player devices.

B. System Functional Elements

Turning now to FIG. 1, there is shown a block diagram illustrating an overview of a Secure Digital Content Electronic Distribution System 100 according to the present invention. The Secure Digital Content Electronic Distribution System 100 encompasses several business elements that comprise an end-to-end solution, including: Content Provider(s) 101 or the proprietors of the Digital Content, Electronic Digital Content Store(s) 103, Intermediate Market Partners (not shown), Clearinghouse(s) 105, Content Hosting Site 111, Transmission Infrastructures 107, and End-User Device(s) 109. Each of these business elements use various components of the Secure Digital Content Electronic Distribution System 100. A high level description of these business elements and system components, as they pertain specifically to electronic Content 113 distribution, follows.

1. Content Provider(s) 101

Content Provider(s) 101 or content proprietor(s) are owners of original Content 113 and/or distributors authorized to package independent Content 113 for further distribution. Content Provider(s) 101 may exploit their rights directly or license Content 113 to the Electronic Digital Content Store (s) 103, or Intermediate Market Partners (not shown), usually in return for Content usage payments related to electronic commerce revenues. Examples of Content Provider(s) 101 include Sony, Time-Warner, MTV, IBM, Microsoft, Turner, Fox and others.

Content Provider(s) 101 use tools provided as part of the Secure Digital Content Electronic Distribution System 100 in order to prepare their Content 113 and related data for distribution. A Work Flow Manager Tool 154 schedules Content 113 to be processed and tracks the Content 113 as it flows through the various steps of Content 113 preparation and packaging to maintain high quality assurance. The term metadata is used throughout this document to mean data related to the Content 113 and in this embodiment does not include the Content 113 itself. As an example, metadata for a song may be a song title or song credits but not the sound recording of the song. The Content 113 would contain the sound recording. A Metadata Assimilation and Entry Tool 161 is used to extract metadata from the Content Provider (s)' Database 160 or data provided by the Content Provider (s) in a prescribed format (for a music example the Content 113 information such as CD title, artist name, song title, CD artwork, and more) and to package it for electronic distribution. The Metadata Assimilation and Entry Tool 161 is also used to enter the Usage Conditions for the Content 113. The data in Usage Conditions can include copy restriction rules, the wholesale price, and any business rules deemed necessary. A Watermarking Tool is used to hide data in the Content 113 that identifies the content owner, the processing date, and other relevant data. For an embodiment where the Content 113 is audio, an audio preprocessor tool is used to adjust the dynamics and/or equalize the Content 113 or other audio for optimum compression quality, compress the Content 113 to the desired compression levels, and encrypt the Content 113. These can be adapted to follow technical advances in digital content compression/encoding, encryption, and formatting methods, allowing the Content Provider(s) 101 to utilize best tools as they evolve over time in the marketplace.

The encrypted Content 113, digital content-related data or metadata, and encrypted keys are packed in SCs (described below) by the SC Packer Tool and stored in a content hosting site and/or promotional web site for electronic distribution. The content hosting site can reside at the Content Provider (s) 101 or in multiple locations, including Electronic Digital Content Store(s) 103 and Intermediate Market Partners (not shown) facilities. Since both the Content 113 and the Keys (described below) are encrypted and packed in SCs, Electronic Digital Content Store(s) 103 or any other hosting agent can not directly access decrypted Content 113 without clearance from the Clearinghouse(s) and notification to the Content Provider(s) 101.

2. Electronic Digital Content Store(s) 103

Electronic Digital Content Store(s) 103 are the entities who market the Content 113 through a wide variety of services or applications, such as Content 113 theme programming or electronic merchandising of Content 113. Electronic Digital Content Store(s) 103 manage the design, development, business operations, settlements, merchandising, marketing, and sales of their services. Example online Electronic Digital Content Store(s) 103 are Web sites that provide electronic downloads of software.

Within their services, Electronic Digital Content Store(s) 103 implement certain functions of the Secure Digital Content Electronic Distribution System 100. Electronic Digital Content Store(s) 103 aggregate information from the Content Provider(s) 101, pack content and metadata in additional SCs, and deliver those SCs to consumers or businesses as part of a service or application. Electronic Digital Content Store(s) 103 use tools provided by the Secure Digital Content Electronic Distribution System 100 to assist with: metadata extraction, secondary usage conditions, SC packaging, and tracking of electronic content transactions. The secondary usage conditions data can include retail business offers such as Content 113 purchase price, pay-per-listen price, copy authorization and target device types, or timed-availability restrictions.

Once an Electronic Digital Content Store(s) 103 completes a valid request for electronic Content 113 from an End-User(s), the Electronic Digital Content Store(s) 103 is responsible for authorizing the Clearinghouse(s) 105 to release the decryption key for the Content 113 to the customer. The Electronic Digital Content Store(s) also authorizes the download of the SC containing the Content 113. The Electronic Digital Content Store(s) may elect to host the SCs containing the Digital Content at its local site and/or utilize the hosting and distribution facilities of another Content hosting site.

The Electronic Digital Content Store(s) can provide customer service for any questions or problems that an End-User(s) may have using the Secure Digital Content Electronic Distribution System 100, or the Electronic Digital Content Store(s) 103 may contract their customer service support to the Clearinghouse(s) 105.

3. Intermediate Market Partners (Not Shown)

In an alternate embodiment, the Secure Digital Content Electronic Distribution System 100 can be used to provide Content 113 securely to other businesses called Intermediate Market Partners. These partners may include digital content-related companies offering a non-electronic service, such as televisions stations or video clubs, radio stations or record clubs, that distribute Content 113. These Partners may also include other trusted parties who handle material as part of making or marketing sound recordings, such as record studios, replicators, and producers. These Intermediate Market Partners requires clearance from the Clearinghouse(s) 105 in order to decrypt the Content 113.

4. Clearinghouse(s) 105

The Clearinghouse(s) 105 provides the licensing authorization and record keeping for all transactions that relate to the sale and/or permitted use of the Content 113 encrypted in a SC. When the Clearinghouse(s) 105 receives a request for a decryption key for the Content 113 from an intermediate or End-User(s), the Clearinghouse(s) 105 validates the integrity and authenticity of the information in the request; verifies that the request was authorized by an Electronic Digital Content Store(s) or Content Provider(s) 101; and verifies that the requested usage complies with the content Usage Conditions as defined by the Content Provider(s) 101. Once these verifications are satisfied, the Clearinghouse(s) 105 sends the decryption key for the Content 113 to the requesting End-User(s) packed in a License SC. The key is encrypted in a manner so that only the authorized user can retrieve it. If the End-User'request is not verifiable, complete, or authorized, the Clearinghouse(s) 105 repudiates the request for the decryption key.

The Clearinghouse(s) 105 keeps a record of all transactions and can report them to responsible parties, such as Electronic Digital Content Store(s) 103 and Content Provider(s) 101, on an immediate, periodic, or restricted basis. This reporting is a means by which Content Provider (s) 101 can be informed of the sale of Content 113 and the Electronic Digital Content Store(s) 103 can obtain an audit trail of electronic delivery to their customers. The Clearinghouse(s) 105 can also notify the Content Provider(s) 101 and/or Electronic Digital Content Store(s) 103 if it detects that information in a SC has been compromised or does not comply with the Content'usage Conditions. The transaction recording and repository capabilities of the Clearinghouse(s) 105 database is structured for data mining and report generation.

In another embodiment, the Clearinghouse(s) 105 can provide customer support and exception processing for transactions such as refunds, transmission failures, and purchase disputes. The Clearinghouse(s) 105 can be operated as an independent entity, providing a trusted custodian for rights management and metering. It provides billing and settlement as required. Examples of electronic Clearinghouse(s) include Secure-Bank.com and Secure Electronic Transaction (SET) from Visa/Mastercard. In one embodiment, the Clearinghouse(s) 105 are Web sites accessible to the End-User Device(s) 109. In another embodiment, the Clearinghouse(s) 105 is part of the Electronic Digital Content Store(s) 103.

5. End-User Device(s) 109

The End-User Device(s) 109 can be any player device that contains an End-User Player Application 195 (described later) compliant with the Secure Digital Content Electronic Distribution System 100 specifications. These devices may include PCS, set top boxes (IRDs), and Internet appliances. The End-User Player Application 195 could be implemented in software and/or consumer electronics hardware. In addition to performing play, record, and library management functions, the End-User Player Application 195 performs SC processing to enable rights management in the End-User Device(s) 109. The End-User Device(s) 109 manages the download and storage of the SCs containing the Digital Content; requests and manages receipt of the encrypted Digital Content keys from the Clearinghouse(s) 105; processes the watermark(s) every time the Digital Content is copied or played; manages the number of copies made (or deletion of the copy) in accordance with the Digital Content'usage Conditions; and performs the copy to an external media or portable consumer device if permitted.

The portable consumer device can perform a subset of the End-User Player Application 195 functions in order to process the content'usage Conditions embedded in the watermark. The terms End-User(s) and End-User Player Application 195 are used throughout this to mean through the use or running-on an End-User Device(s) 109. 6. Transmission Infrastructures 107

The Secure Digital Content Electronic Distribution System 100 is independent of the transmission network connecting the Electronic Digital Content Store(s) 103 and End-User Device(s) 109. It supports both point-to-point such as the Internet and broadcast distribution models such as digital broadcast television.

Even though the same tools and applications are used to acquire, package, and track Content 113 transactions over various Transmission Infrastructures 107, the presentation and method in which services are delivered to the customer may vary depending on the infrastructure and distribution model selected. The quality of the Content 113 being transferred may also vary since high bandwidth infrastructures can deliver high-quality digital content at more acceptable response times than lower bandwidth infrastructures. A service application designed for a point-to-point distribution model can be adapted to support a broadcast distribution model as well.

C. System Uses

The Secure Digital Content Electronic Distribution System 100 enables the secure delivery of high-quality, electronic copies of Content 113 to End-User Device(s) 109, whether consumer or business, and to regulate and track usage of the Content 113.

The Secure Digital Content Electronic Distribution System 100 could be deployed in a variety of consumer and business-to-business services using both new and existing distribution channels. Each particular service could use a different financial model that can be enforced through the rights management features of the Secure Digital Content Electronic Distribution System 100. Models such as wholesale or retail purchase, pay-per-listen usage, subscription services, copy/no-copy restrictions, or redistribution could be implemented through the rights management of the Clearinghouse(s) 105 and the End-User Player Application 195 copy protection features.

The Secure Digital Content Electronic Distribution System 100 allows Electronic Digital Content Store(s) 103 and Intermediate Market Partners a great deal of flexibility in creating services that sell Content 113. At the same time it provides Content Provider(s) 101 a level of assurance that their digital assets are protected and metered so that they can receive appropriate compensation for the licensing of Content 113.

II. Cryptography Concepts and Their Application to the Secure Digital Content Electronic Distribution System License Control in the Secure Digital Content Electronic Distribution System 100 is based on the use of cryptography. This section introduces basic cryptography technologies of the present invention. The use of public key encryption, symmetric key encryption, digital signatures, digital watermarks and digital certificates is known.

A. Symmetric Algorithms

In the Secure Digital Content Electronic Distribution System 100 the Content Provider(s) 101 encrypts the content using symmetric algorithms. They are called symmetric algorithms because the same key is used to encrypt and decrypt data. The data sender and the message recipient must share the key. The shared key is referred to here as the symmetric key. The Secure Digital Content Electronic Distribution System 100 architecture is independent of the specific symmetric algorithm selected for a particular implementation.

Common symmetric algorithms are DES, RC2 and RC4. Both DES and RC2 are block cipher. A block cipher encrypts the data using a block of data bits at a time. DES is an official US government encryption standard, has a 64-bit block size, and uses a 56-bit key. Triple-DES is commonly used to increase the security achieved with simple DES. RSA Data Security designed RC2. RC2 uses a variable-key-size cipher and has a block size of 64 bits. RC4, also designed by RSA Data Security, is a variable-key-size stream cipher. A stream cipher operates on a single data bit at a time. RSA Data Security claims that eight to sixteen machine operations are required for RC4 per output byte.

IBM designed a fast algorithm called SEAL. SEAL is a stream algorithm that uses a variable-length key and that has been optimized for 32-bit processors. SEAL requires about five elementary machine instructions per data byte. A 50 MHZ, 486-based computer runs the SEAL code at 7.2 megabytes/second if the 160-bit key used has already been preprocessed into internal tables.

Microsoft reports results of encryption performance benchmark in its Overview of CryptoAPI document. These results were obtained by an application using Microsoft's CryptoAPI, running on a 120-MHZ, Pentium-based computer with Windows NT 4.0.

| Cipher | Key Size | Key Setup Time | Encryption Speed |
| --- | --- | --- | --- |
| DES | 56 | 460 | 1,138,519 |
| RC2 | 40 | 40 | 286,888 |
| RC4 | 40 | 151 | 2,377,723 |

B. Public Key Algorithms

In the Secure Digital Content Electronic Distribution System 100, symmetric keys and other small data pieces are encrypted using public keys. Public key algorithms use two keys. The two keys are mathematically related so that data encrypted with one key can only be decrypted with the other key. The owner of the keys keeps one key private (private key) and publicly distributes the second key (public key).

To secure the transmission of a confidential message using a public key algorithm, one must use the recipient'public key to encrypt the message. Only the recipient, who has the associated private key, can decrypt the message. Public key algorithms are also used to generate digital signatures. The private key is used for that purpose. The following section provides information on digital signatures.

The most common used public-key algorithm is the RSA public-key cipher. It has become the de-facto public key standard in the industry. Other algorithms that also work well for encryption and digital signatures are ElGamal and Rabin. RSA is a variable-key length cipher.

Symmetric key algorithms are much faster than the public key algorithms. In software, DES is generally at least 100 times as fast as RSA. Because of this, RSA is not used to encrypt bulk data. RSA Data Security reports that on a 90 MHZ Pentium machine, RSA Data Security's toolkit BSAFE 3.0 has a throughput for private-key operations (encryption or decryption, using the private key) of 21.6 kilobits/second with a 512-bit modulus and 7.4 kilobits/second with a 1024-bit modulus.

C. Digital Signature

In the Secure Digital Content Electronic Distribution System 100, the issuer of SC(s) protects the integrity of SC(s) by digitally signing it. In general, to create a digital signature of a message, a message owner first computes the message digest (defined below) and then encrypt the message digest using the owner'private key. The message is distributed with its signature. Any recipient of the message can verify the digital signature first by decrypting the signature using the public key of the message owner to recover the message digest. Then, the recipient computes the digest of the received message and compares it with the recovered one. If the message has not being altered during distribution, the calculated digest and recovered digest must be equal.

In the Secure Digital Content Electronic Distribution System 100, since SC(s) contain several data parts, a digest is calculated for each part and a summary digest is calculated for the concatenated part digests. The summary digest is encrypted using the private key of the issuer of the SC(s). The encrypted summary digest is the issuer'digital signature for the SC(s). The part digests and the digital signature are included in the body of the SC(s). The recipients of SC(s) can verify the integrity of the SC(s) and its parts by means of the received digital signature and part digests.

A one-way hash algorithm is used to calculate a message digest. A hash algorithm takes a variable-length-input message and converts it into a fixed length string, the message digest. A one-way hash algorithm operates only in one direction. That is, it is easy to calculate the digest for an input message, but it is very difficult (computationally infeasible) to generate the input message from its digest. Because of the properties of the one-way hash functions, one can think of a message digest as a fingerprint of the message.

The more common one-way hash functions are MD5 from RSA Data Security and SHA designed by the US National Institute of Technology and Standards (NITS).

D. Digital Certificates

A digital certificate is used to authenticate or verify the identity of a person or entity that has sent a digitally signed message. A certificate is a digital document issued by a certification authority that binds a public key to a person or entity. The certificate includes the public key, the name of the person or entity, an expiration date, the name of the certification authority, and other information. The certificate also contains the digital signature of the certification authority.

When an entity (or person) sends a message signed with its private key and accompanied with its digital certificate, the recipient of the message uses the entity'name from the certificate to decide whether or not to accept the message.

In the Secure Digital Content Electronic Distribution System 100, every SC(s), except those issued by the End-User Device(s) 109, includes the certificate of the creator of the SC(s). The End-User Device(s) 109 do not need to include certificates in their SC(s) because many End-User(s) do not bother to acquire a certificate or have certificates issued by non bona-fide Certification Authorities. In the Secure Digital Content Electronic Distribution System 100, the Clearinghouse(s) 105 has the option of issuing certificates to the Electronic Digital Content Store(s) 103. This allows the End-User Device(s) 109 to independently verify that the Electronic Digital Content Store(s) 103 have been authorized by the Secure Digital Content Electronic Distribution System 100.

E. Guide to the SC(s) Graphical Representation

Figure 2:
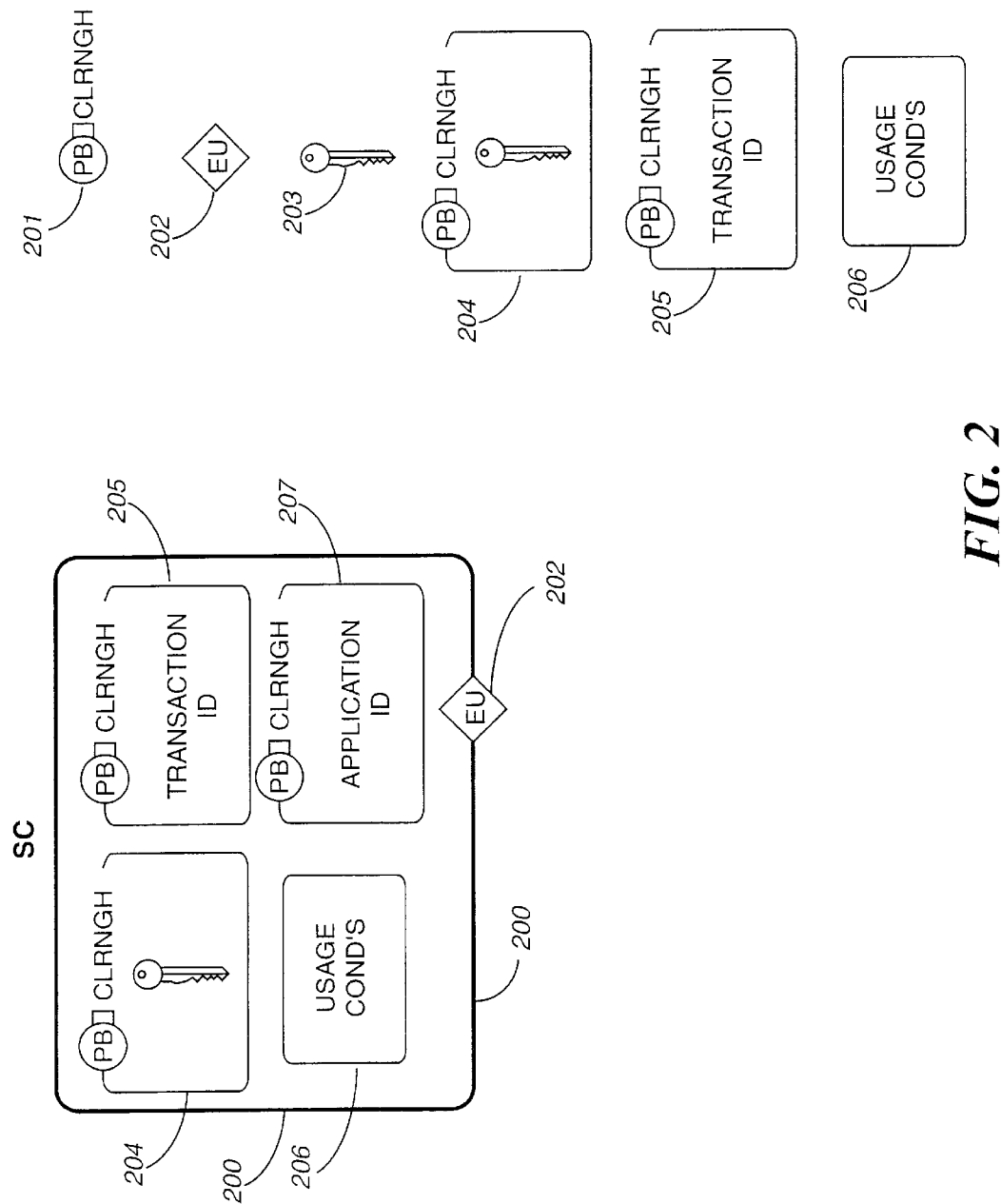
FIG. 2 is a block diagram illustrating an example Secure Container (SC) and the associated graphical representations according to the present invention.

This document uses a drawing to graphically represent SC(s) that shows encrypted parts, non-encrypted parts, the encryption keys, and certificates. Referring now to FIG. 2 is an example drawing of SC(s) 200. The following symbols are used in the SC(s) figures. Key 201 is a public or private key. The teeth of the key e.g. CLRNGH for Clearinghouse indicate the key owner. PB inside the handle indicates that it is a public key thus key 201 is a Clearinghouse public key. PV inside the handle indicates that it is a private key. Diamond shape is an End-User Digital Signature 202. The initials indicate which private key was used to create the signature thus in EU is the End-User(s) digital signature from table below. Symmetric key 203 is used to encrypt content. An encrypted symmetric key object 204 comprising a symmetric key 203 encrypted with a PB of CLRNGH. The key on the top border of the rectangle is the key used in the encryption of the object. The symbol or text inside the rectangle indicates the encrypted object (a symmetric key in this case). Another encrypted object, in this example a Transaction ID encrypted object 205 is shown. And Usage Conditions 206 for content licensing management as described below. The SC(s) 200 comprises Usage Conditions 206, Transaction ID encrypted object 205, an Application ID encrypted object 207, and encrypted symmetric key object 204, all signed with an End-User Digital Signature 202.

The table below shows the initials that identify the signer of SC(s).

| Initial | Component |
|---------|-----------|
| CP | Content Provider(s) 101 |
| MS | Electronic Digital Content Store(s) 103 |
| HS | Content Hosting Site(s) 111 |
| EU | End-User Device(s) 109 |
| CH | Clearinghouse(s) 105 |
| CA | certification authority(ies) (not shown) |

F. Example of a Secure Container Encryption

The tables and diagrams below provide an overview of the encryption and decryption process used to create and recover information from SC(s). The SC(s) that is created and decrypted in this process overview is a general SC(s). It does not represent any of the specific SC(s) types used for rights management in the Secure Digital Content Electronic Distribution System 100. The process consists of the steps described in FIG. 3 for encryption process.

Figure 3:
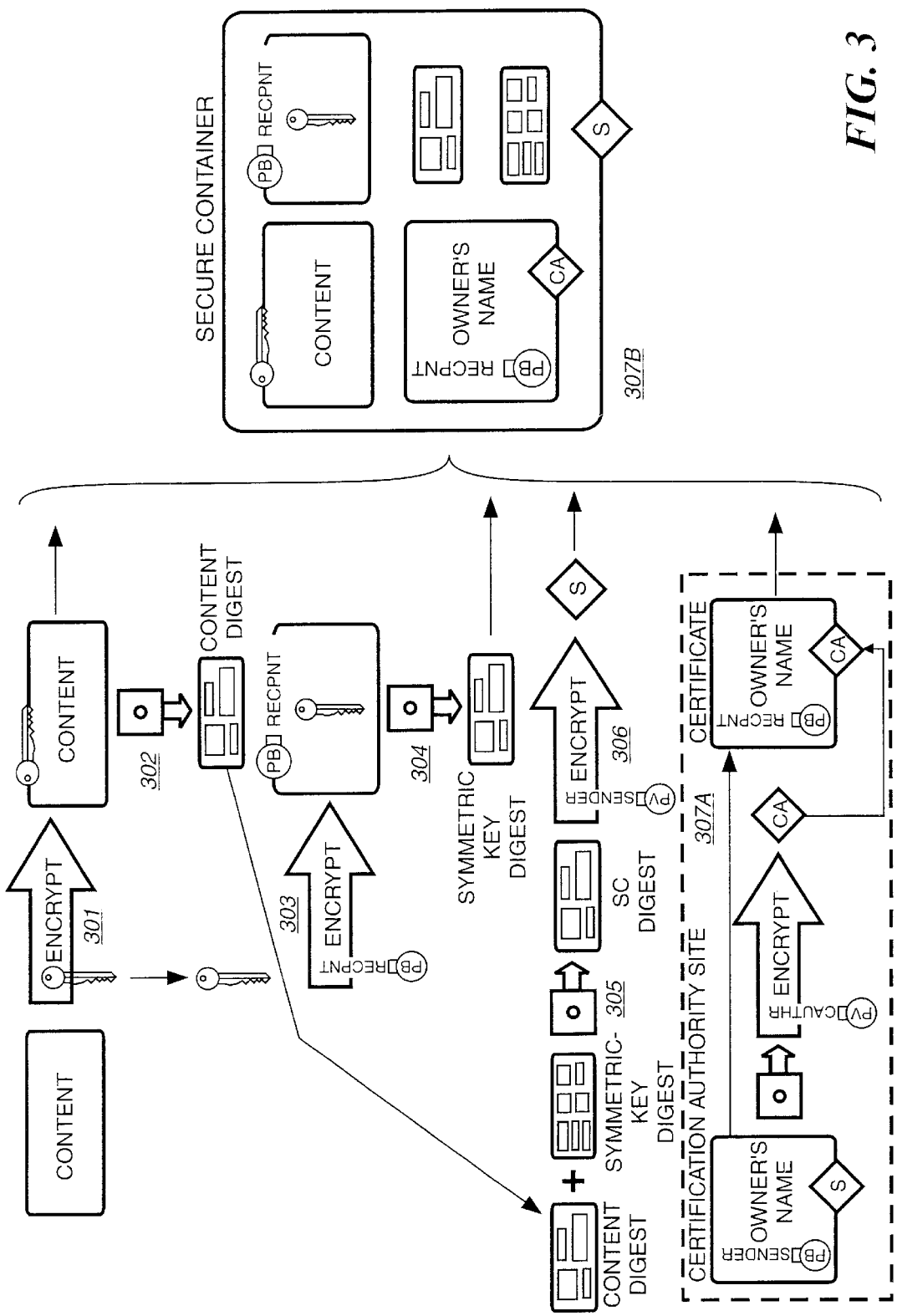
FIG. 3 is a block diagram illustrating an overview of the encryption process for a Secure Container (SC) according to the present invention.

Process Flow for Encryption Process of FIG. 3

Step Process

301 Sender generates a random symmetric key and uses it to encrypt the content.

302 Sender runs the encrypted content through a hash algorithm to produce the content digest.

303 Sender encrypts the symmetric key using the recipient'public key. PB RECPNT refers to the recipient'public key.

304 Sender runs the encrypted symmetric key through the same hash algorithm used in step 2 to produce the symmetric key digest.

305 Sender runs the concatenation of the content digest and symmetric key digest through the same hash algorithm used in step 2 to produce the SC(s) digest.

306 Sender encrypts the SC(s) digest with the sender's private key to produce the digital signature for the SC(s). PV SENDER refers to the sender's private key.

307B Sender creates a SC(s) file that includes the encrypted content, encrypted symmetric key, content digest, symmetric key digest, sender's certificate, and SC(s) signature.

307A Sender must have obtained the certificate from a certification authority prior to initiating secure communications. The certification authority includes in the certificate the sender's public key, the sender's name and signs it. PV CAUTHR refers to the certifications authority's private key. Sender transmits the SC(s) to the recipient.

Figure 4:
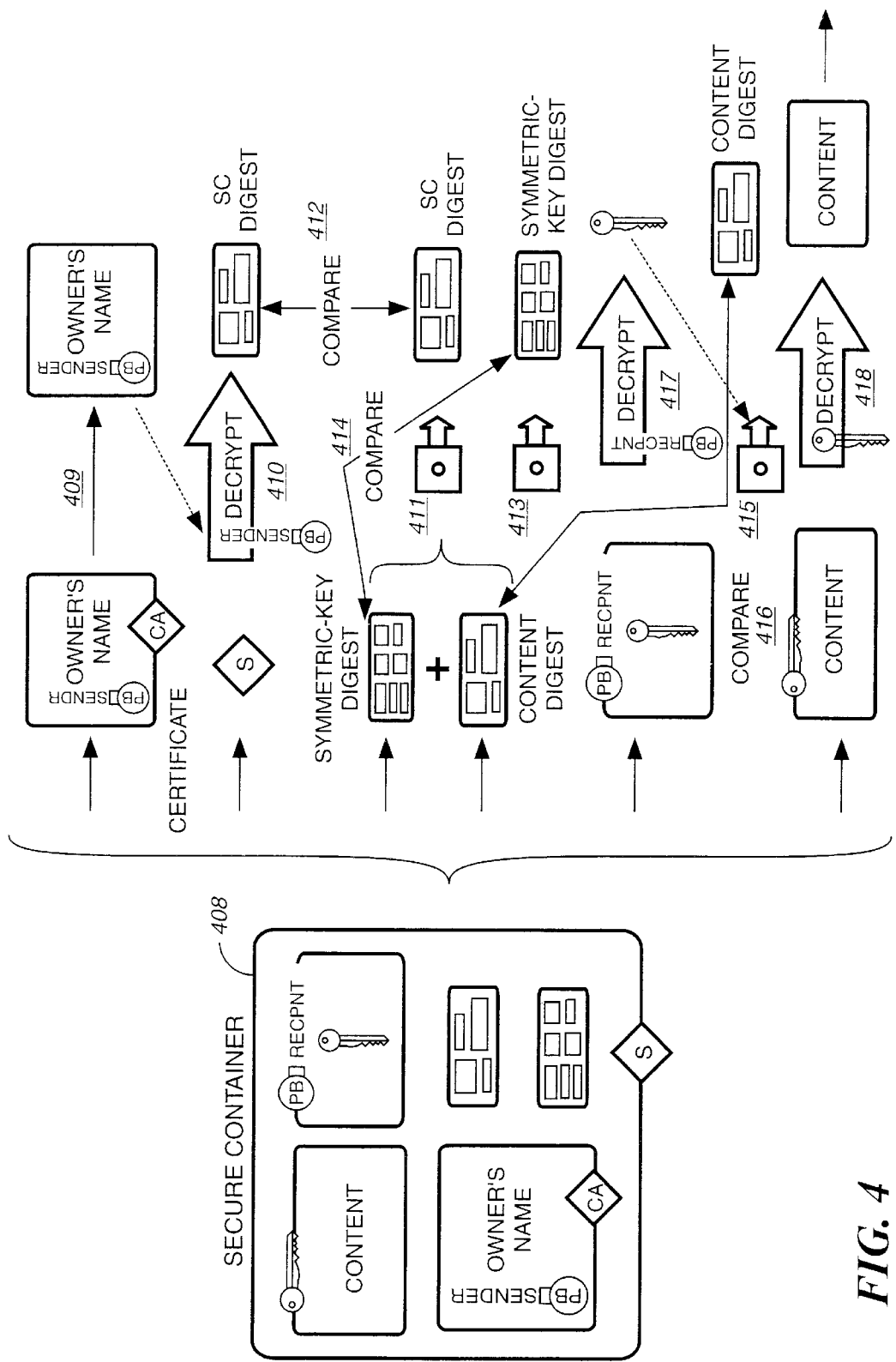
FIG. 4 is a block diagram illustrating an overview of the de-encryption process for a Secure Container (SC) according to the present invention.

Process Flow for Decryption Process of FIG. 4

Step Process

408 Recipient receives the SC(s) and separates its parts.

409 Recipient verifies the digital signature in the sender's certificate by decrypting it with the public key of the certification authority. If the certificate's digital signature is valid, recipient acquires the sender's public key from the certificate.

410 Recipient decrypts the SC(s) digital signature using the sender's public key. This recovers the SC(s) digest. PB SENDER refers to the sender's public key.

411 Recipient runs the concatenation of the received content digest and encrypted key digest through the same hash algorithm used by the sender to compute the SC(s) digest.

412 Recipient compares the computed SC(s) digest with the one recovered-from the sender's digital signature. If they are the same, recipient confirms that the received digests have not been altered and continues with the decryption process. If they are not the same, recipient discards the SC(s) and notifies the sender.

413 Recipient runs the encrypted symmetric key through the same hash algorithm used in step 411 to compute the symmetric key digest.

414 Recipient compares the computed symmetric key digest with the one received in the SC(s). If it is the same, recipient knows that the encrypted symmetric key has not been altered. Recipient continues with the decryption process. If not valid, recipient discards the SC(s) and notifies the sender.

415 Recipient runs the encrypted content through the same hash algorithm used in step 411 to compute the content digest.

416 Recipient compares the computed content digest with the one received in the SC(s). If it is the same, recipient knows that the encrypted content has not been altered. Recipient then continues with the decryption process. If not valid, recipient discards the SC(s) and notifies the sender.

417 Recipient decrypts the encrypted symmetric key using the recipient's private key. This recovers the symmetric key. PV RECPNT refers to the recipient's private key.

418 Recipient uses the symmetric key to decrypt the encrypted content. This recovers the content.

III. Secure Digital Content Electronic Distribution System Flow

The Secure Electronic Digital Content Distribution System 100, consists of several components that are used by the different participants of the system. These participants include the Content Provider(s) 101, Electronic Digital Content Store(s) 103, End-User(s) via End-User Device(s) 109 and the Clearinghouse(s) 105. A high level system flow is used as an overview of the Secure Digital Content Electronic Distribution System 100. This flow outlined below tracks Content as it flows throughout the System 100. Additionally it outlines the steps used by the participants to conduct the transactions for the purchase, unlocking and use of the Content 113. Some of the assumptions made in the system flow include:

This is a system flow for a Digital Content service (Point-to-Point Interface to a PC).

Content Provider(s) 101 submits audio Digital Content in PCM uncompressed format (as a music audio example).

Content Provider(s) 101 has metadata in an ODBC compliant database or Content Provider(s) 101 will enter the data directly into the Content Information Processing Subsystem, or will have provided data in prescribed ASCII file format(s).

Financial settlement is done by the Electronic Digital Content Store(s).

Content 113 is hosted at a single Content Hosting Site(s) 111.

It should be understood by those skilled in the art that these assumptions can be altered to accommodate the exact nature of the Digital Content e.g. music, video and program and electronic distribution systems broadcast.

The following process flow in illustrated in FIG. 1.

Step Process

121 A uncompressed PCM audio file is provided as Content 113 by the Content Provider(s) 101. Its filename is input into the Work Flow Manager 154 Tool along with the Content Provider(s)' 101 unique identifier for the Content 113.

122 Metadata is captured from the Content Provider(s)' Database 160 by the Content Information Processing Subsystem using the Content Provider(s)' 101 unique identifier for the Content 113 and information provided by the Database Mapping Template.

123 The Work Flow Manager Tool 154 is used to direct the content flow through the acquisition and preparation process at the Content Provider(s) 101. It can also be used to track the status of any piece of content in the system at any time.

124 The Usage Conditions for the Content 113 are entered into the Content Information Processing Subsystem, this can be done either manually or automatically. This data includes copy restriction rules and any other business rules deemed necessary. All of the metadata entry can occur in parallel with the Audio Processing for the data.

125 The Watermarking Tool is used to hide data in the Content 113 that the Content Provider(s) 101 deems necessary to identify the content. This could include when it was captured, where it came from (this Content Provider(s) 101), or any other information specified by the Content Provider(s) 101.

The Content Processing Tool 125 performs equalization, dynamics adjustments and re-sampling to the Content 113 as necessary for the different compression levels supported.

The Content 113 is compressed using the Content Processing Tool 125 to the desired compression levels. The Content 113 can then be played back to verify that the compression produces the required level of Content 113 quality. If necessary the equalization, dynamics adjustments, compression and playback quality checks can be performed as many times as desired.

The Content 113 and a subset of its metadata is encrypted with a Symmetric Key by the SC Packer. This tool then encrypts the key using the Public Key of the Clearinghouse(s) 105 to produce an Encrypted Symmetric Key. This key can be transmitted anywhere without comprising the security of the Content 113 since the only entity that can decrypt it is the Clearinghouse(s) 105.

126 The Encrypted Symmetric Key, metadata and other information about the Content 113 is then packed into a Metadata SC by the SC Packer Tool 152.

127 The encrypted Content 113 and metadata are then packed into a Content SC. At this point the processing on the Content 113 and metadata is complete.

128 The Metadata SC(s) is then sent to the Content Promotions Web Site 156 using the Content Disbursement Tool (not shown).

129 The Content Disbursement Tool sends the Content SC(s) to the Content Hosting Site(s) 111. The Content Hosting Site(s) can reside at the Content Provider(s) 101, the Clearinghouse(s) 105 or a special location dedicated for Content Hosting. The URL for this site is part of the metadata that was added to the Metadata SC.

130 The Content Promotions Web Site 156 notifies Electronic Digital Content Store(s) 103 of new Content 113 that is added to the System 100.

131 Using the Content Acquisition Tool, Electronic Digital Content Store(s) 103 then download the Metadata SCs that correspond to the Content 113 they wish to sell.

132 The Electronic Digital Content Store(s) 103 will use the Content Acquisition Tool to pull out any data from the Metadata SC(s) that they want to use to promote the Content 113 on their Web Site. Access to portions of this metadata can be secured and charged for if desired.

133 The Usage Conditions for the Content 113, specific to this Electronic Digital Content Store(s) 103, are entered using the Content Acquisition Tool. These Usage Conditions include the retail prices and copy/play restrictions for the different compression levels of the Content 113.

134 The Electronic Digital Content Store(s) 103 specific Usage Conditions and the original Metadata SC(s) are packed into an Offer SC by the SC Packer Tool.

135 After the Electronic Digital Content Store(s) 103 Web Site is updated, the Content 113 is available to End-User (s) surfing the Web.

136 When an End-User(s) finds Content 113 that they want to buy, they click on a content icon, such as a music icon, and the item is added to his/her shopping cart which is maintained by the Electronic Digital Content Store(s) 103. When the End-User(s) completes shopping they submit the purchase request to the Electronic Digital Content Store(s) 103 for processing.

137 The Electronic Digital Content Store(s) 103 then interacts with credit card clearing organizations to place a hold on the funds in the same way they do business today.

138 Once the Electronic Digital Content Store(s) 103 receives the credit card authorization number back from the credit card clearing organization, it stores this into a database and invokes the SC Packer Tool to build a Transaction SC. This Transaction SC includes all of the Offer SCs for the Content 113 that the End-User(s) has purchased, a Transaction ID that can be tracked back to the Electronic Digital Content Store(s) 103, information that identifies the End-User(s), compression levels, Usage Conditions and the price list for the songs purchased.

139 This Transaction SC is then transmitted to the End-User Device(s) 109.

140 When the Transaction SC arrives on the End-User Device(s) 109, it kicks off the End-User Player Application 195 which opens the Transaction SC and acknowledges the End-User's purchase. The End-User Player Application 195 then opens the individual Offer SCs and in an alternate embodiment, may inform the user with an estimate of the download time. It then asks the user to specify when they want to download the Content 113.

141 Based on the time the End-User(s) requested the download, the End-User Player Application 195 will wake up and initiate the start of the download process by building a Order SC that contains among other things the Encrypted Symmetric Key for the Content 113, the Transaction ID, and End-User(s) information.

142 This Order SC is then sent to the Clearinghouse(s) 105 for processing.

143 The Clearinghouse(s) 105 receives the Order SC, opens it and verifies that none of the data has been tampered with. The Clearinghouse(s) 105 validates the Usage Conditions purchased by the End-User(s). These Usage Conditions must comply with those specified by the Content Provider(s) 101. This information is logged in a database.

144 Once all the checks are complete, the Encrypted Symmetric Key is decrypted using the private key of the Clearinghouse(s) 105. The Symmetric Key is then encrypted using the public key of the End-User(s). This new Encrypted Symmetric Key is then packaged into a License SC by the SC Packer.

145 The License SC is then transmitted to the End-User(s).

146 When the License SC is received at the End-User Device(s) 109 it is stored in memory until the Content SC is downloaded.

147 The End-User Device(s) 109 request from the Content Hosting Facility 111, sending the corresponding License SC for the purchased Content 113.

148 Content 113 is sent to the End-User Device(s) 109. Upon the receipt the Content 113 is de-encrypted by the End-User Device(s) 109 using the Symmetric Key.

IV. Rights Management Architecture Model

A. Architecture Layer Functions

Figure 5:
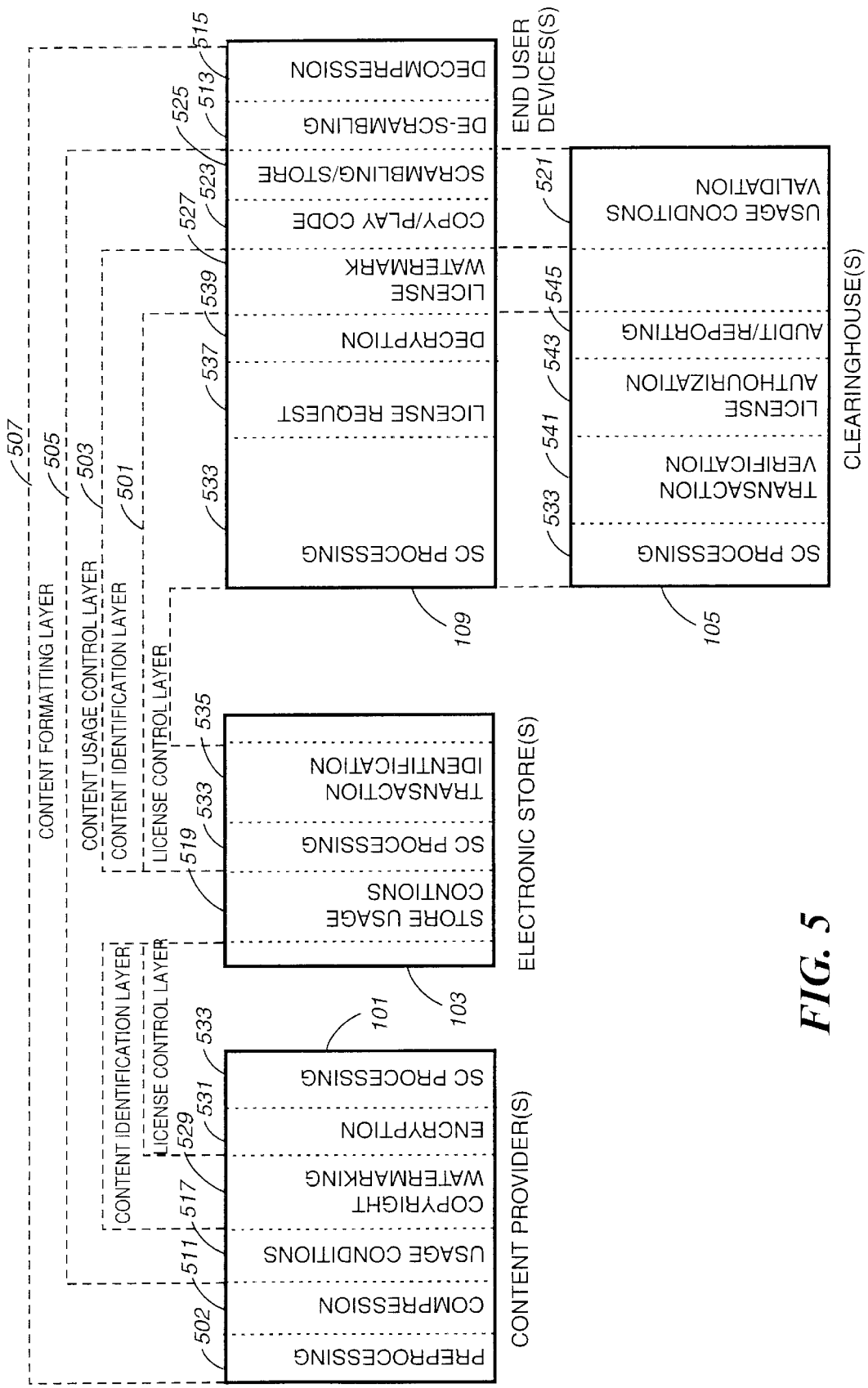
FIG. 5 is a block diagram illustrating an overview of the layers for the Rights Management Architecture of the Secure Digital Content Distribution System of FIG. 1 according to the present invention.

FIG. 5 is a block diagram of the Rights Management Architecture of the Secure Digital Content Electronic Distribution System 100. Architecturally, four layers represent the Secure Digital Content Electronic Distribution System 100: the License Control Layer 501, the Content Identification Layer 503, Content Usage Control Layer 505, and the Content Formatting Layer 507. The overall functional objective of each layer and the individual key functions for each layer are described in this section. The functions in each of the layers are fairly independent of the functions in the other layers. Within broad limitations, functions in a layer can be substituted with similar functions without affecting the functionality of the other layers. Obviously, it is required that the output from one layer satisfies format and semantics acceptable to the adjacent layer.

The License Control Layer 501 ensures that:

the Digital Content is protected during distribution against illegal interception and tampering;

the Content 113 originates from a rightful content owner and is distributed by a licensed distributor, e.g. Electronic Digital Content Store(s) 103;

the Digital Content purchaser has a properly licensed application;

the distributor is paid by the purchaser before a copy of the Content 113 is made available to the purchaser or End-User(s); and a record of the transaction is kept for reporting purposes.

The Content Identification Layer 503 allows for the verification of the copyright and the identity of the content purchaser. The content's copyright information and identity of the content purchaser enables the source tracking of any, authorized or not, copy of the Content 113. Thus, the Content Identification Layer 503 provides a means to combat piracy.

The Content Usage Control Layer 505 ensures that the copy of the Content 113 is used in the purchaser's device according-to the Store Usage Conditions 519. The Store Usage Conditions 519 may specify the number of plays and local copies allowed for the Content 113, and whether or not the Content 113 may be recorded to an external portable device. The functions in the Content Usage Control Layer 505 keep track of the content's copy/play usage and update the copy/play status.

The Content Formatting Layer 507 allows for the format conversion of the Content 113 from its native representation in the content owner's facilities into a from that is consistent with the service features and distribution means of the Secure Digital Content Electronic Distribution System 100. The conversion processing may include compression encoding and its associated preprocessing, such as frequency equalization and amplitude dynamic adjustment. For Content 113 which is audio, at the purchaser's side, the received Content 113 also needs to be processed to achieve a format appropriate for playback or transfer to a portable device.

B. Function Partitioning and Flows

The Rights Management Architectural Model is shown in FIG. 5 and this illustrates the mapping of the architectural layers to the operating components making up the Secure Digital Content Electronic Distribution System 100 and the key functions in each layer.

1. Content Formatting Layer 507

The general functions associated with the Content Formatting Layer 507 are Content Preprocessing 502 and Compression 511 at the Content Provider(s) 101, and Content De-scrambling 513 and Decompression 515 at the End-User Device(s) 109. The need for preprocessing and the examples of specific functions were mentioned above. Content Compression 511 is used to reduce the file size of the Content 113 and its transmission time. Any compression algorithm appropriate for the type of Content 113 and transmission medium can be used in the Secure Digital Content Electronic Distribution System 100. For music, MPEG ½/4, Dolby AC-2 and AC-3, Sony Adaptive Transform Coding (ATRAC), and low-bit rate algorithms are some of the typically used compression algorithms. The Content 113 is stored in the End-User Device(s) 109 in compressed form to reduce the storage size requirement. It is decompressed during active playback. De-scrambling is also performed during active playback. The purpose and type of scrambling will be described later during the discussion of the Content Usage Control Layer 505.

2. Content Usage Control Layer 505

The Content Usage Control Layer 505 permits the specification and enforcement of the conditions or restrictions imposed on the use of Content 113 use at the End-User Device(s) 109. The conditions may specify the number of plays allowed for the Content 113, whether or not a secondary copy of the Content 113 is allowed, the number of secondary copies, and whether or not the Content 113 may be copied to an external portable device. The Content Provider(s) 101 sets the allowable Usage Conditions 517 and transmits them to the Electronic Digital Content Store(s) 103 in a SC (see the License Control Layer 501 section). The Electronic Digital Content Store(s) 103 can add to or narrow the Usage Conditions 517 as long as it doesn't invalidate the original conditions set by the Content Provider(s) 101. The Electronic Digital Content Store(s) 103 then transmits all Store Usage Conditions 519 (in a SC) to the End-User Device(s) 109 and the Clearinghouse(s) 105. The Clearinghouse(s) 105 perform Usage Conditions Validation 521 before authorizing the Content 113 release to an End-User Device(s) 109.

The enforcement of the content Usage Conditions 517 is performed by the Content Usage Control Layer 505 in the End-User Device(s) 109. First, upon reception of the Content 113 copy from the Content Identification Layer 503 in the End-User Device(s) 109 marks the Content 113 with a Copy/Play Code 523 representing the initial copy/play permission. Second, the Player Application 195 cryptographically scrambles the Content 113 before storing it in the End-User Device(s) 109. The Player Application 195 generates a scrambling key for each Content item, and the key is encrypted and hidden in the End-User Device(s) 109. Then, every time the End-User Device(s) 109 accesses the Content 113 for copy or play, the End-User Device(s) 109 verifies the copy/play code before allowing the de-scrambling of the Content 113 and the Lexecution of the play or copy. The End-User Device(s) 109 also appropriately updates the copy/play code in the original copy of the Content 113 and on any new secondary copy. The copy/play coding is performed on Content 113 that has been compressed. That is, there is no need to decompress the Content 113 before the embedding of the copy/play code.

The End-User Device(s). 109 uses a License Watermark 527 to embed the copy/play code within the Content 113. Only the End-User Player Application 195 that is knowledgeable of the embedding algorithm and the associated scrambling key is able to read or modify the embedded data. The data is invisible or inaudible to a human observer; that is, the data introduces no perceivable degradation to the Content 113. Since the watermark survives several steps of content processing, data compression, D-to-A and A-to-D conversion, and signal degradation introduced by normal content handling, the watermark stays with the Content 113 in any representation form, including analog representation. In an alternate embodiment, instead of using a License Watermark 527 to embed the copy/play code within the Content 113, the End-User Player Application 195 uses securely stored Usage Conditions 519.

3. Content Identification Layer 503

As part of the Content Identification Layer 503, the Content Provider(s) 101 also uses a License Watermark 527 to embed data in the Content 113 such as to the content identifier, content owner and other information, such as publication date and geographic distribution region. This watermark is referred to here as the Copyright Watermark 529. Upon reception, the End-User Device(s) 109 watermarks the copy of the Content 113 with the content purchaser's name and the Transaction ID 535 (see the License Control Layer 501 section below), and with other information such as date of license and Usage Conditions 517. This watermark is referred to here as the license watermark. Any copy of Content 113, obtained in an authorized manner or not, and subject to audio processing that preserves the content quality, carries the copyright and license watermarks. The Content Identification Layer 503 deters piracy.

4. License Control Layer 501

The License Control Layer 501 protects the Content 113 against unauthorized interception and ensures that the Content is only released on an individual basis to an End-User(s) that has properly licensed End-User Device(s) 109 and successfully completes a license purchase transaction with an authorized Electronic Digital Content Store(s) 103. The License Control Layer 501 protects the Content 113 by double Encryption 531. The Content 113 is encrypted using an encryption symmetric key generated by the Content Provider(s) 101, and the symmetric key is encrypted using the public key 621 of the Clearinghouse(s). Only the Clearinghouse(s) 105 can initially recover the symmetric key.

License control is designed with the Clearinghouse(s) 105 as the "trusted party". Before releasing permission for the License Request 537, (i.e. the Symmetric Key 623 for the Content 113 to an End-User Device(s) 109), the Clearinghouse(s) 105 verifies that the Transaction 541 and the License Authorization 543 are complete and authentic, that the Electronic Digital Content Store(s) 103 has authorization from the Secure Digital Content Electronic Distribution System 100 for the sale of electronic Content 113, and that the End-User(s) has a properly licensed application. Audit/Reporting 545 allows the generation of reports and the sharing of licensing transaction information with other authorized parties in the Secure Electronic Digital Content Distribution System 100

License control is implemented through SC Processing 533. SC(s) are used to distribute encrypted Content 113 and information among the system operation components (more about the SC(s) detailed structure sections below). A SC is cryptographic carrier of information that uses cryptographic encryption, digital signatures and digital certificates to provide protection against unauthorized interception and modification of the electronic information or Content 113. It also allows for the authenticity verification of the electronic data.

License control requires that the Content Provider(s) 101, the Electronic Digital Content Store(s) 103, and the Clearinghouse(s) 105 have bona-fide cryptographic digital certificates from reputable Certificate Authorities that are used to authenticate those components. The End-User Device(s) 109 are not required to have digital certificates.

C. Content Distribution and Licensing Control

Figure 6:
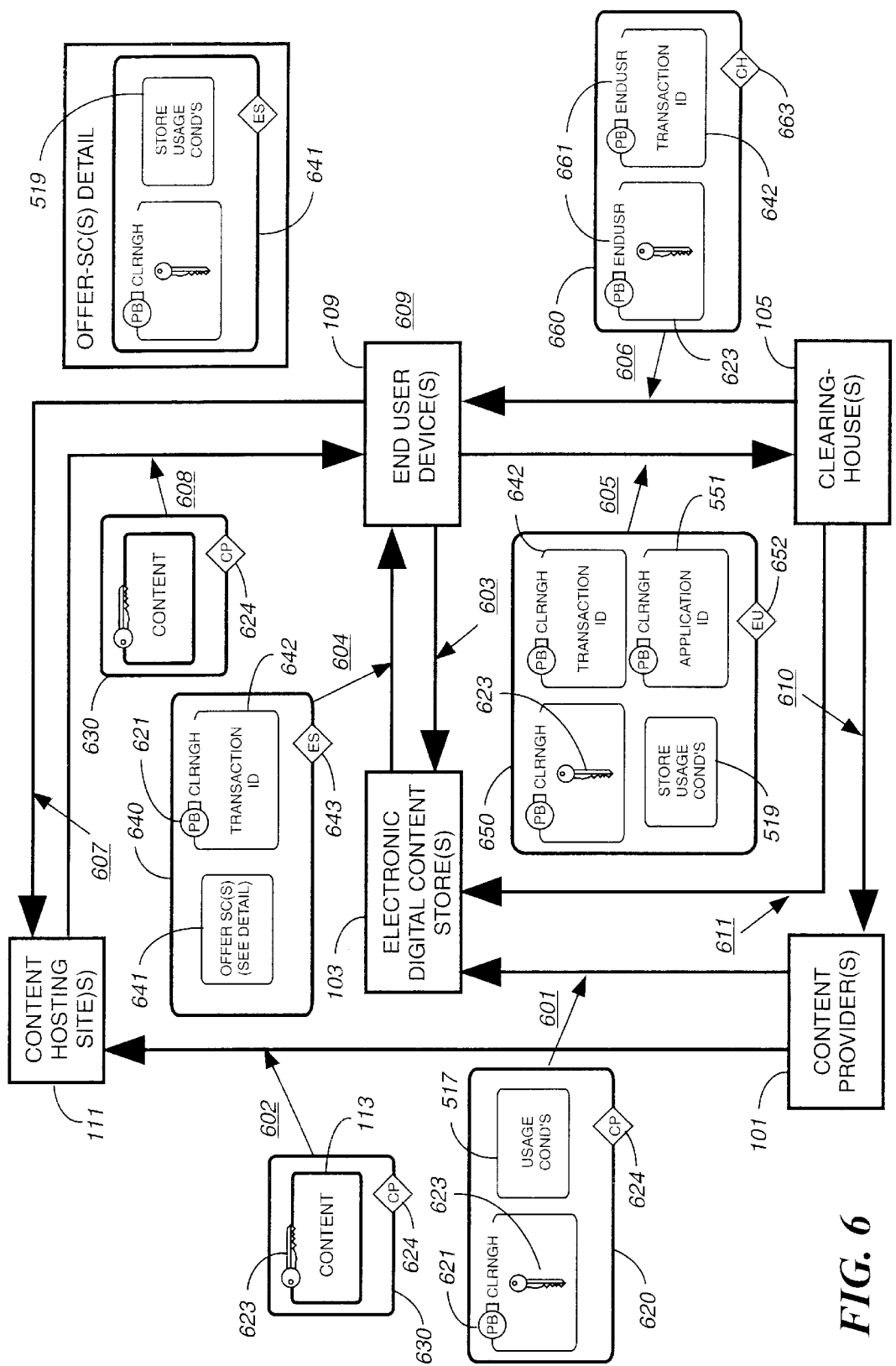
FIG. 6 is a block diagram illustrating an overview of the Content Distribution and Licensing Control as it applies to the License Control Layer of FIG. 5.

FIG. 6 is a block diagram illustrating an overview of the Content Distribution and Licensing Control as it applies to the License Control Layer of FIG. 5. The figure depicts the case in which the Electronic Digital Content Store(s) 103, End-User Device(s) 109 and the Clearinghouse(s) 105 are interconnected via the Internet, and unicast (point-to-point) transmission is used among those components. The communication between the Content Provider(s) 101 and the Electronic Digital Content Store(s) 103 could also be over the Internet or other network. It is assumed that the Content-purchase commercial transaction between the End-User Device(s) 109 and the Electronic Digital Content Store(s) 103 is based on standard Internet Web protocols. As part of the Web-based interaction, the End-User(s) makes the selection of the Content 113 to purchase, provides personal and financial information, and agrees to the conditions of purchase. The Electronic Digital Content Store(s) 103 could obtain payment authorization from an acquirer institution using a protocol such as SET.

It is also assumed in FIG. 6 that the Electronic Digital Content Store(s) 103 has downloaded the End-User Player Application 195 to an End-User Device(s) 109 based on standard Web protocols. The architecture requires that the Electronic Digital Content Store(s) 103 assigns a unique application ID to the downloaded Player Application 195 and that the End-User Device(s) 109 stores it for later application license verification (see below).

The overall licensing flow starts at the Content Provider(s) 101. The Content Provider(s) 101 encrypts the Content 113 using an encryption symmetric key locally generated, and encrypts the Symmetric Key 623 using the Clearinghouse's 105 public key 621. In an alternate embodiment, the symmetric key instead of being locally generated my be sent to the Content Provider(s) 101 from the Clearinghouse(s) 105. The Content Provider(s) 101 creates a Content SC(s) 630 around the encrypted Content 113, and a Metadata SC(s) 620 around the encrypted Symmetric Key 623, Store Usage Conditions 519, and other Content 113 associated information. There is one Metadata SC(s) 620 and one Content SC(s) 630 for every Content 113 object. The Content 113 object may be a compression level one same song or the Content 113 object may be each song on the album or the Content 113 object may be the entire album. For each Content 113 object, the Metadata SC(s) 620 also carries the Store Usage Conditions 519 associated with the Content Usage Control Layer 505.

The Content Provider(s) 101 distributes the Metadata SC(s) 620 to one or more Electronic Digital Content Store(s) 103 (step 601) and the Content SC(s) 630 to one or more Content Hosting Sites (step 602). Each Electronic Digital Content Store(s) 103, in turn creates an Offer SC(s) 641. The Offer SC(s) 641 typically carries much of the same information as the Metadata SC(s) 620, including the Digital Signature 624 of the Content Provider(s) 101 and the Certificate (not shown of the Content Provider(s) 101. As mentioned above, the Electronic Digital Content Store(s) 103 can add to or narrow the Store Usage Conditions 519 (handled by the Control Usage Control Layer) initially defined by the Content Provider(s) 101. Optionally, the Content SC(s) 630 and/or the Metadata SC(s) 620 is signed with a Digital Signature 624 of the Content Provider(s) 101.

After the completion of the Content-purchase transaction between the End-User Device(s) 109 and the Electronic Digital Content Store(s) 103 (step 603), the Electronic Digital Content Store(s) 103 creates and transfers to the End-User Device(s) 109 a Transaction SC(s) 640 (step 604). The Transaction SC(s) 640 includes a unique Transaction ID 535, the purchaser's name (i.e. End-User(s)') (not shown), the Public Key 661 of the End-User Device(s) 109, and the Offer SC(s) 641 associated with the purchased Content 113. Transaction Data 642 in FIG. 6 represents both the Transaction ID 535 and the End-User(s) name (not shown). The Transaction Data 642 is encrypted with the Public Key 621 of the Clearinghouse(s) 105. Optionally, the Transaction SC(s) 640 is signed with a Digital Signature 643 of the Electronic Digital Content Store(s) 103.

Upon reception of the Transaction SC(s) 640 (and the Offer SC(s) 641 included in it), the End-User Player Application 195 running on End-User Device(s) 109 solicits license authorization from the Clearinghouse(s) 105 by means of an Order SC(s) 650 (step 605). The Order SC(s) 650 includes the encrypted Symmetric Key 623 and Store Usage Conditions 519 from the Offer SC(s) 641, the encrypted Transaction Data 642 from the Transaction SC(s) 640, and the encrypted Application ID 551 from the End-User Device(s) 109. In another embodiment, the Order SC(s) 650 is signed with a Digital Signature 652 of the End-User Device(s) 109.

Upon reception of the Order SC(s) 650 from the End-User Device(s) 109, the Clearinghouse(s) 105 verifies:

1. that the Electronic Digital Content Store(s) 103 has authorization from the Secure Digital Content Electronic Distribution System 100 (exists in the Database 160 of the Clearinghouse(s) 105);
2. that the Order SC(s) 650 has not been altered;
3. that the Transaction Data 642 and Symmetric Key 623 are complete and authentic;
4. that the electronic Store Usage Conditions 519 purchased by the End-User Device(s) 109 are consistent with those Usage Conditions 517 set by the Content Provider(s) 101; and
5. that the Application ID 551 has a valid structure and that it was provided by an authorized Electronic Digital Content Store(s) 103.

If the verifications are successful, the Clearinghouse(s) 105 decrypts the Symmetric Key 623 and the Transaction Data 642 and builds and transfers the License SC(s) 660 to the End-User Device(s) 109 (step 606). The License SC(s) 660 carries the Symmetric Key 623 and the Transaction Data 642, both encrypted using the Public Key 661 of the End-User Device(s) 109. If any verification is not successful, the Clearinghouse(s) 105 denies the license to the End-User Device(s) 109 and informs the End-User Device(s) 109. The Clearinghouse(s) 105 also immediately informs the Electronic Digital Content Store(s) 103 of this verification failure. In an alternate embodiment, the Clearinghouse(s) 105 signs the License SC(s) 660 with its Digital Signature 663.

After receiving the License SC(s) 660, the End-User Device(s) 109 decrypts the Symmetric Key 623 and the Transaction Data 642 previously received from the Clearinghouse(s) 105 and requests the Content SC(s) 630 (step 607) from a Content Hosting Site(s) 111. Upon arrival of the Content SC(s) 630 (step 608), the End-User Device(s) 109 decrypts the Content 113 using the Symmetric Key 623 (step 609), and passes the Content 113 and the Transaction Data 642 to the other layers for license watermarking, copy/play coding, scrambling, and further Content 113 processing as described previously for FIG. 5.

Finally, the Clearinghouse(s) 105 on a periodic basis transmits summary transaction reports to the Content Provider(s) 101 and the Electronic Digital Content Store(s) 103 for auditing and tracking purposes (step 610).

V. Secure Container Structure
A. General Structure

A Secure Container (SC) is a structure that consists of several parts which together define a unit of Content 113 or a portion of a transaction, and which also define related information such as Usage Conditions, metadata, and encryption methods. SC(s) are designed in such a way that the integrity, completeness, and authenticity of the information can be verified. Some of the information in SC(s) may be encrypted so that it can only be accessed after proper authorization has been obtained.

SC(s) include at least one bill of materials (BOM) part which has records of information about the SC(s) and about each of the parts included in the SC(s). A message digest is calculated, using a hashing algorithm such as MD-5, for each part and then included in the BOM record for the part. The digests of the parts are concatenated together and another digest is computed from them and then encrypted using the private key of the entity creating the SC(s) to create a digital signature. Parties receiving the SC(s) can use the digital signature to verify all of the digests and thus validate the integrity and completeness of the SC(s) and all of its parts.

The following information may be included as records in the BOM along with the records for each part. The SC(s) type determines which records need to be included:

SC(s) version

SC(s) ID

Type of SC(s) (e.g. Offer, Order, Transaction, Content, Metadata or promotional and License.)

Publisher of the SC(s)

Date that the SC(s) was created

Expiration date of the SC(s)

Clearinghouse(s) URL

Description of the digest algorithm used for the included parts (default is MD-5)

Description of the algorithm used for the digital signature encryption (default is RSA)

Digital signature (encrypted digest of all of the concatenated digests of the included parts)

SC(s) may include more than one BOM. For example, an Offer SC(s) 641 consists of the original Metadata SC(s) 620 parts, including its BOM, as well as additional information added by the Electronic Digital Content Store(s) 103 and a new BOM. A record for the Metadata SC(s) 620 BOM is included in the Offer SC(s) 641 BOM. This record includes a digest for the Metadata SC(s) 620 BOM which can be used to validate its integrity and therefore, the integrity of the parts included from the Metadata SC(s) 620 can also be validated using the part digest values stored in Metadata SC(s) 620 BOM. None of the parts from the Metadata SC(s) 620 have records in the new BOM that was created for the Offer SC(s) 641. Only parts added by the Electronic Digital Content Store(s) 103 and the Metadata SC(s) 620 BOM have records in the new BOM.

SC(s) may also include a Key Description part. Key Description parts include records that contain the following information about encrypted parts in the SC(s):

The name of the encrypted part.

The name to use for the part when it is decrypted.

The encryption algorithm used to encrypt the part.

Either a Key Identifier to indicate the public encryption key that was used to encrypt the part or an encrypted symmetric key that, when decrypted, is used to decrypt the encrypted part.

The encryption algorithm used to encrypt the symmetric key. This field is only present when the record in the Key Description part includes an encrypted symmetric key that was used to encrypt the encrypted part.

A Key Identifier of the public encryption key that was used to encrypt the symmetric key. This field is only present when the record in the Key Description part includes an encrypted symmetric key and the encryption algorithm identifier of the symmetric key that was used to encrypt the encrypted part.

If the SC(s) does not contain any encrypted parts, then there is no Key Description part.

B. Rights Management Language Syntax and Semantics

The Rights Management Language consists of parameters that can be assigned values to define restrictions on the use of the Content 113 by an End-User(s) after the Content 113 purchase. The restrictions on the use of the Content 113 is the Usage Conditions 517. Each Content Provider(s) 101 specifies the Usage Conditions 517 for each of its Content 113 items. Electronic Digital Content Store(s) 103 interpret the Usage Conditions 517 in Metadata SC(s) 620 and use the information to provide select options they wish to offer their customers as well as add retail purchase information for the Content 113. After an End-User(s) has selected a Content 113 item for purchase, the End-User Device(s) 109 requests authorization for the Content 113 based on Store Usage Conditions 519. Before the Clearinghouse(s) 105 sends a License SC(s) 660 to the End-User(s), the Clearinghouse(s) 105 verifies that the Store Usage. Conditions 519 being requested are in agreement with the allowable Usage Conditions 517 that were specified by the Content Provider(s) 101 in the Metadata SC(s) 620.

When an End-User Device(s) 109 receives the Content 113 that was purchased, the Store Usage Conditions 519 are encoded into that Content 113 using the Watermarking Tool or encoded in the securely stored Usage Conditions 519. The End-User Player Application 195 running on End-User Device(s) 109 insures that the Store Usage Conditions 519 that were encoded into the Content 113 are enforced.

The following are examples of Store Usage Conditions 519 for an embodiment where the Content 113 is music:

Song is recordable.

Song can be played n number of times.

C. Overview of Secure Container Flow and Processing

Metadata SC(s) 620 are built by Content Provider(s) 101 and are used to define Content 113 items such as songs. The Content 113 itself is not included in these SC(s) because the size of the Content 113 is typically too large for Electronic Digital Content Store(s) 103 and End-User(s) to efficiently download the containers just for the purpose of accessing the descriptive metadata. Instead, the SC(s) includes an external URL (Uniform Resource Locators) to point to the Content 113. The SC(s) also includes metadata that provides descriptive information about the Content 113 and any other associated data, such as for music, the CD cover art and/or digital audio clips in the case of song Content 113.

Electronic Digital Content Store(s) 103 download the Metadata SC(s) 620, for which they are authorized, and build Offer SC(s) 641. In short, an Offer SC(s) 641 consists of some of the parts and the BOM from the Metadata SC(s) 620 along with additional information included by the Electronic Digital Content Store(s) 103. A new BOM for the Offer SC(s) 641 is created when the Offer SC(s) 641 is built. Electronic Digital Content Store(s) 103 also use the Metadata SC(s) 620 by extracting metadata information from them to build HTML pages on their web sites that present descriptions of Content 113 to End-User(s), usually so they can purchase the Content 113.

The information in the Offer SC(s) 641 that is added by the Electronic Digital Content Store(s) 103 is typically to narrow the selection of Usage Conditions 517 that are specified in the Metadata SC(s) 620 and promotional data such as a graphic image file of the store's logo and a URL to the store's web site. An Offer SC(s) 641 template in the Metadata SC(s) 620 indicates which information can be overridden by the Electronic Digital Content Store(s) 103 in the Offer SC(s) 641 and what, if any, additional information is required by the Electronic Digital Content Store(s) 103 and what parts are retained in the embedded Metadata SC(s) 620.

Offer SC(s) 641 are included in a Transaction SC(s) 640 when an End-User(s) decides to purchase Content 113 from an Electronic Digital Content Store(s) 103. The Electronic Digital Content Store(s) 103 builds a Transaction SC(s) 640 and includes Offer SC(s) 641 for each Content 113 item being purchased and transmits it to the End-User Device(s) 109. The End-User Device(s) 109 receives the Transaction SC(s) 640 and validates the integrity of the Transaction SC(s) 640 and the included Offer SC(s) 641.

An Order SC(s) 650 is built by the End-User Device(s) 109 for each Content 113 item being purchased. Information is included from the Offer SC(s) 641, from the Transaction SC(s) 640, and from the configuration files of the End-User Device(s) 109. Order SC(s) 650 are sent to the Clearinghouse(s) 105 one at a time. The Clearinghouse(s) 105 URL where the Order SC(s) 650 is included as one of the records in the BOM for the Metadata SC(s) 620 and included again in the Offer SC(s) 641.

The Clearinghouse(s) 105 validates and processes Order SC(s) 650 to provide the End-User Device(s) 109 with everything that is required to a License Watermark 527 and access purchased Content 113. One of the functions of the Clearinghouse(s) 105 is to decrypt the Symmetric Keys 623 that are needed to decrypt the watermarking instructions from the Offer SC(s) 641 and the Content 113 from the Content SC(s) 630. An encrypted Symmetric Key 623 record actually contains more than the actual encrypted Symmetric Key 623. Before executing the encryption, the Content Provider(s) 101 may optionally append its name to the actual Symmetric Key 623. Having the Content Provider(s)' 101 name encrypted together with the Symmetric Key 623 provides security against a pirate Content Provider(s) 101 that has built its own Metadata SC(s) 620 and Content SC(s) 630 from legal SC(s). The Clearinghouse(s) 105 verifies that the name of the Content Provider(s) 101 encrypted together with the Symmetric Keys 623 matches the name of the Content Provider(s) 101 in the SC(s) certificate.

If there are any changes required to be made to the watermarking instructions by the Clearinghouse(s) 105, then the Clearinghouse(s) 105 decrypts the Symmetric Key 623 and then modifies the watermarking instructions and encrypts them again using a new Symmetric Key 623. The Symmetric Key 623 is then re-encrypted using the Public Key 661 of the End-User Device(s) 109. The Clearinghouse(s) 105 also decrypts the other Symmetric Keys 623 in the SC(s) and encrypts them again with the Public Key 661 of the End-User Device(s) 109. The Clearinghouse(s) 105 builds a License SC(s) 660 that includes the newly encrypted Symmetric Keys 623 and updated watermarking instructions and sends it to the End-User Device(s) 109 in response to the Order SC(s) 650. If the processing of the Order SC(s) 650 does not complete successfully, then the Clearinghouse(s) 105 returns to the End-User Device(s) 109 an HTML page or equivalent reporting the failure of the authorization process.

A License SC(s) 660 provides an End-User Device(s) 109 with everything that is needed to access a Content 113 item. The End-User Device(s) 109 requests the appropriate Content SC(s) 630 from the Content Hosting Site(s) 111. Content SC(s) 630 are built by Content Provider(s) 101 and include encrypted Content 113 and metadata parts. The End-User Player Application 195 uses the Symmetric Keys 623 from the License SC(s) 660 to decrypt the Content 113, metadata, and watermarking instructions. The watermarking instructions are then affixed into the Content 113 and the Content 113 is scrambled and stored on the End-User Device(s) 109.

D. Metadata Secure Container 620 Format

The following table shows the parts that are included in a Metadata SC(s) 620. Each box in the Parts column is a separate object included in the SC(s) along with the BOM (with the exception of part names that are surrounded by [ ] characters). The BOM contains a record for each part included in the SC(s). The Part Exists column indicates whether the part itself is actually included in the SC(s) and the Digest column indicates whether a message digest is computed for the part. Some parts may not be propagated when a SC(s) is included in other SC(s) (as determined by the associated template), although the entire original BOM is propagated. This is done because the entire BOM is required by the Clearinghouse(s) 105 to verify the digital signature in the original SC(s).

The Key Description Part columns of the following table define the records that are included in the Key Description part of the SC(s). Records in the Key Description part define information about the encryption keys and algorithms that were used to encrypt parts within the SC(s) or parts within another SC(s). Each record includes the encrypted part name and, if necessary, a URL that points to another SC(s) that includes the encrypted part. The Result Name column defines the name that is assigned to the part after it is decrypted. The Encrypt Alg column defines the encryption algorithm that was used to encrypt the part. The Key Id/Enc Key column defines either an identification of the encryption key that was used to encrypt the part or a base64 encoding of the encrypted Symmetric Key 623 bit string that was used to encrypt the part. The Sym Key Alg column is an optional parameter that defines the encryption algorithm that was used to encrypt the Symmetric Key 623 when the previous column is an encrypted Symmetric Key 623. The Sym Key ID column is an identification of the encryption key that was used to encrypt the Symmetric Key 623 when the Key Id/Enc Key column is an encrypted Symmetric Key 623.

|  | BOM | | Key Description Part | | | | |
| --- | --- | --- | --- | --- | --- | --- | --- |
| Parts | Part Exists | Digest | Result Name | Encrypt Alg | Key Id/Enc Key | Sym Key Alg | Sym Key ID |
| [Content URL] | | | Output Part | RC4 | Enc Sym Key | RSA | CH Pub Key |
| [Metadata URL] | | | Outpart Part | RC4 | Enc Sym Key | RSA | CH Pub Key |
| | | SC Version | | | | | |
| | | SC ID | | | | | |
| | | SC Type | | | | | |
| | | SC Publisher | | | | | |
| | | Date | | | | | |
| | | Expiration Date | | | | | |
| | | Clearinghouse(s) URL | | | | | |
| | | Digest Algorithm ID | | | | | |
| | | Digital Signature Alg ID | | | | | |
| Content ID | Yes | Yes | | | | | |
| Metadata | Yes | Yes | | | | | |
| Usage Conditions | Yes | Yes | | | | | |
| SC Templates | Yes | Yes | | | | | |
| Watermarking Instructions | Yes | Yes | Output Part | RC4 | Enc Sym Key | RSA | CH Pub Key |
| Key Description Part | Yes | Yes | | | | | |
| Clearinghouse(s) Certificate(s) | Yes | No | | | | | |
| Certificate(s) | Yes | No | | | | | |
| | | Digital Signature | | | | | |

The following describes the terms that are used in the above Metadata SC(s) table:

[Content URL]—A parameter in a record in the Key Description part. This is a URL that points to the encrypted Content 113 in the Content SC(s) 630 that is associated with this Metadata SC(s) 620. The Metadata SC(s) 620 itself does not contain the encrypted Content 113.

[Metadata URL]—A parameter in a record in the Key Description part. This is a URL that points to the encrypted metadata in the Content SC(s) 630 that is associated with this Metadata SC(s) 620. The Metadata SC(s) 620 itself does not contain the encrypted metadata.

Content ID—A part that defines a unique ID assigned to a Content 113 item. There is more than one Content ID included in this part if the Metadata SC(s) 620 references more than one Content 113 item.

Metadata—Parts that contain information related to a Content 113 item such as the artist name and CD cover art in the case of a song. There may be multiple metadata parts, some of which may be encrypted. The internal structure of the metadata parts is dependent on the type of metadata contained therein.

Usage Conditions—A part that contains information that describes usage options, rules, and restrictions to be imposed on an End-User(s) for use of the Content 113.

SC(s) Templates—Parts that define templates that describe the required and optional information for building the Offer, Order, and License SC(s) 660.

Watermarking Instructions—A part that contains the encrypted instructions and parameters for implementing watermarking in the Content 113. The watermarking instructions may be modified by the Clearinghouse(s) 105 and returned back to the End-User Device(s) 109 within the License SC(s) 660. There is a record in the Key Description part that defines the encryption algorithm that was used to encrypt the watermarking instructions, the output part name to use when the watermarking instructions are decrypted, a base64 encoding of the encrypted Symmetric Key 623 bit string that is was used to encrypt the watermarking instructions, the encryption algorithm that was used to encrypt the Symmetric Key 623, and the identification of the public key that is required to decrypt the Symmetric Key 623.

Clearinghouse(s) Certificate(s)—A certificate from a certification authority or from the Clearinghouse(s) 105 that contains the signed Public Key 621 of the Clearinghouse(s) 105. There may be more than one certificate, in which case a hierarchical level structure is used with the highest level certificate containing the public key to open the next lowest level certificate is reached which contains the Public Key 621 of the Clearinghouse(s) 105.

Certificate(s)—A certificate from a certification authority or from the Clearinghouse(s) 105 that contains the signed Public Key 621 of the entity that created the SC(s). There may be more than one certificate, in which case a hierarchical level structure is used with the highest level certificate containing the public key to open the next level certificate, and so on, until the lowest level certificate is reached which contains the public key of the SC(s) creator.

SC Version—A version number assigned to the SC(s) by the SC Packer Tool.

SC ID—A unique ID assigned to the SC(s) by the entity that created the SC(s).

SC Type—Indicates the type of SC(s) (e.g. Metadata, Offer, Order, etc.)

SC Publisher—Indicates the entity that created the SC(s).
Creation Date—Date that the SC(s) was created.
Expiration Date—Date the SC(s) expires and is no longer valid.
Clearinghouse(s) URL—Address of the Clearinghouse(s) 105 that the End-User Player Application 195 should interact with to obtain the proper authorization to access the Content 113.

CH Pub Key—An identifier that indicates that the Clearinghouse's 105 Public Key 621 was used to encrypt the data.

E. Offer Secure Container 641 Format

The following table shows the parts that are included in the Offer SC(s) 641. The parts, with the exception of some of the metadata parts, and BOM from the Metadata SC(s) 620 are also included in the Offer SC(s) 641.

| | BOM | | Key Description Part | | | | |
|---|---|---|---|---|---|---|---|
| Parts | Part Exists | Digest | Result Name | Encrypt Alg | Key ID/Enc Key | Sym Key Alg | Sym Key ID |
| Metadata SC Parts | | | | | | | |
| [Content URL] | | | Output Part | RC4 | Enc Sym Key | RSA | CH Pub Key |
| [Metadata URL] | | | Output Part | RC4 | Enc Sym Key | RSA | CH Pub Key |
| SC Version | | | | | | | |
| SD ID | | | | | | | |
| SC Type | | | | | | | |
| SC Publisher | | | | | | | |
| Date | | | | | | | |
| Expiration Date | | | | | | | |
| Clearinghouse(s) URL | | | | | | | |
| Digest Algorithm ID | | | | | | | |
| Digital Signature Alg ID | | | | | | | |
| Content ID | Yes | Yes | | | | | |
| Metadata | Some | Yes | | | | | |
| Usage Conditions | Yes | Yes | | | | | |
| SC Templates | Yes | Yes | | | | | |
| Watermarking Instructions | Yes | Yes | Output Part | RC4 | Enc Sym Key | RSA | CH Pub Key |
| Key Description Part | Yes | Yes | | | | | |
| Clearinghouse(s) Certificate(s) | Yes | No | | | | | |
| Certificate(s) | Yes | No | | | | | |
| Digital Signature | | | | | | | |
| Offer SC Parts | | | | | | | |
| SC Version | | | | | | | |
| SC ID | | | | | | | |
| SC Type | | | | | | | |
| SC Publisher | | | | | | | |
| Date | | | | | | | |
| Expiration Date | | | | | | | |
| Digest Algorithm ID | | | | | | | |
| Digital Signature Alg ID | | | | | | | |
| Metadata SC BOM | Yes | Yes | | | | | |
| Additional and Overridden Fields | Yes | Yes | | | | | |
| Electronic Digital Content Store(s) Certificate | Yes | No | | | | | |
| Certificate(s) | Yes | No | | | | | |
| Digital Signature | | | | | | | |

Digest Algorithm ID—An identifier of the algorithm used to compute the digests of the parts.

Digital Signature Alg ID—An identifier of the algorithm used to encrypt the digest of the concatenated part digests. This encrypted value is the digital signature.

Digital Signature—A digest of the concatenated part digests encrypted with the public key of the entity that created the SC(s).

Output Part—The name to assign to the output part when an encrypted part is decrypted.

RSA and RC4—Default encryption algorithms used to encrypt the Symmetric Keys 623 and data parts.

Enc Sym Key—A base64 encoding of an encrypted key bitstring that, when decrypted, is used to decrypt a SC(s) part.

The following describes the terms that are used in the above Offer SC(s) 641 that were not previously described for another SC(s):

Metadata SC(s) BOM—The BOM from the original Metadata SC(s) 620. The record in the Offer SC(s) 641 BOM includes the digest of the Metadata SC(s) 620 BOM.

Additional and Overridden Fields—Usage conditions information that was overridden by the Electronic Digital Content Store(s) 103. This information is validated by the Clearinghouse(s) 105, by means of the received SC(s) templates, to make sure that anything that the Electronic Digital Content Store(s) 103 overrides is within the scope of its authorization.-

Electronic Digital Content Store(s) Certificate—A certificate provided to the Electronic Digital Content Store(s) 103 by the Clearinghouse(s) 105 and signed by the Clearinghouse(s) 105 using its private key. This certificate is used by the End-User Player Application 195 to verify that the Electronic Digital Content Store(s) 103 is a valid distributor of Content 113. The End-User Player Application 195 and Clearinghouse(s) 105 can verify that the Electronic Digital Content Store(s) 103 is an authorized distributor by decrypting the certificate's signature with the Clearinghouse's 105 Public Key 621. The End-User Player Application 195 keeps a local copy of the Clearinghouse's 105 Public Key 621 that it receives as part of its initialization during installation.

F. Transaction Secure Container 640 Format

The following table shows the parts that are included in the Transaction SC(s) 640 as well as its BOM and Key Description parts.

End-User(s). There is an entry for each Offer SC(s) 641.

HTML to Display—One or more HTML pages that the End-User Player Application 195 displays in the Internet browser window upon receipt of the Transaction SC(s) 640 or during the interaction between the End-User Device(s) 109 and the Clearinghouse(s) 105.

When the End-User Device(s) 109 receives a Transaction SC(s) 640, the following steps may be performed to verify the integrity and authenticity of the SC(s):

1. Verify the integrity of the Electronic Digital Content Store(s) 103 certificate using the Public Key 621 of the Clearinghouse(s) 105. The Public Key 621 of the Clearinghouse(s) 105 was stored at the End-User Device (s) 109 after it was received as part of the initialization of the End-User Player Application 195 during its installation process.

| | BOM | | | Key Description Part | | | |
|---|---|---|---|---|---|---|---|
| Parts | Part Exists | Digest | Result Name | Encrypt Alg | Key ID/Enc Key | Sym Key Alg | Sym Key ID |
| SC Version | | | | | | | |
| SC ID | | | | | | | |
| SC Type | | | | | | | |
| SC Publisher | | | | | | | |
| Date | | | | | | | |
| Expiration Date | | | | | | | |
| Digest Algorithm ID | | | | | | | |
| Digital Signature Alg ID | | | | | | | |
| Transaction ID | Yes | Yes | Output Part | RSA | CH Pub Key | | |
| End-User(s) ID | Yes | Yes | Output Part | RSA | CH Pub Key | | |
| End-User(s)' Public Key | Yes | Yes | | | | | |
| Offer SC(s) | Yes | Yes | | | | | |
| Selections of Content Use | Yes | Yes | | | | | |
| HTML to Display | Yes | Yes | | | | | |
| Key Description Part | Yes | Yes | | | | | |
| Electronic Digital Content Store(s) Certificate | Yes | No | | | | | |
| Digital Signature | | | | | | | |

The following describes the terms that are used in the above Transaction SC(s) 640 that were not previously described for another SC(s):

Transaction ID 535—An ID assigned by the Electronic Digital Content Store(s) 103 to uniquely identify the transaction.

End-User(s) ID—An identification of the End-User(s) obtained by the Electronic Digital Content Store(s) 103 at the time the End-User(s) makes the buying selection and provides the credit card information.

End-User(s)' Public Key—The End-User(s)' Public Key 661 that is used by the Clearinghouse(s) 105 to re-encrypt the Symmetric Keys 623. The End-User(s)' Public Key 661 is transmitted to the Electronic Digital Content Store(s) 103 during the purchase transaction.

Offer SC(s)—Offer SC(s) 641 for the Content 113 items that were purchased.

Selections of Content Use—An array of Usage Conditions for each Content 113 item being purchased by the 2. Verify the Digital Signature 643 of the SC(s) using the public key from the Electronic Digital Content Store(s) 103 certificate.

3. Verify the hashes of the SC(s) parts.

4. Verify the integrity and authenticity of each Offer SC(s) 641 included in the Transaction SC(s) 640.

G. Order Secure Container 650 Format

The following table shows the parts that are included in the Order SC(s) 650 as well as its BOM and Key Description parts. These parts either provide information to the Clearinghouse(s) 105 for decryption and verification purposes or is validated by the Clearinghouse(s) 105. The parts and BOM from the Offer SC(s) 641 are also included in the Order SC(s) 650. The Some string in the Part, Exists column of the Metadata SC(s) BOM indicates that the some of those parts are not included in the Order SC(s) 650. The BOM from the Metadata SC(s) 620 is also included without any change so that the Clearinghouse(s) 105 can validate the integrity of the Metadata SC(s) 620 and its parts.

| Parts | BOM Part Exists | BOM Digest | Result Name | Encrypt Alg | Key ID/Enc Key | Sym Key Alg | Sym Key ID |
|---|---|---|---|---|---|---|---|
| *Metadata SC(s) Parts* | | | | | | | |
| [Content URL] | | | Output Part | RC4 | Enc Sym Key | RSA | CH Pub Key |
| [Metadata URL] | | | Output Part | RC4 | Enc Sym Key | RSA | CH Pub Key |
| | SC(s) Version | | | | | | |
| | SC(s) ID | | | | | | |
| | SC(s) Type | | | | | | |
| | SC(s) Publisher | | | | | | |
| | Date | | | | | | |
| | Expiration Date | | | | | | |
| | Clearinghouse(s) URL | | | | | | |
| | Digest Algorithm ID | | | | | | |
| | Digital Signature Alg ID | | | | | | |
| Content ID | Yes | Yes | | | | | |
| Metadata | Some | Yes | | | | | |
| Usage Conditions | Yes | Yes | | | | | |
| SC(s) Templates | Yes | Yes | | | | | |
| Watermarking Instructions | Yes | Yes | Output Part | RC4 | Enc Sym Key | RSA | CH Pub Key |
| Key Description Part | Yes | Yes | | | | | |
| Clearinghouse(s) Certificate(s) | Yes | No | | | | | |
| Certificate(s) | Yes | No | | | | | |
| | Digital Signature | | | | | | |
| *Offer SC(s) Parts* | | | | | | | |
| | SC(s) Version | | | | | | |
| | SC(s) ID | | | | | | |
| | SC(s) Type | | | | | | |
| | SC(s) Publisher | | | | | | |
| | Date | | | | | | |
| | Expiration Date | | | | | | |
| | Digest Algorithm ID | | | | | | |
| | Digital Signature Alg ID | | | | | | |
| Metadata SC(s) BOM | Yes | Yes | | | | | |
| Additional and Overridden Fields | Yes | Yes | | | | | |
| Electronic Digital Content Store(s) Certificate | Yes | No | | | | | |
| Certificate(s) | Yes | No | | | | | |
| | Digital Signature | | | | | | |
| *Transaction SC(s) Parts* | | | | | | | |
| | SC(s) Version | | | | | | |
| | SC(s) ID | | | | | | |
| | SC(s) Type | | | | | | |
| | SC(s) Publisher | | | | | | |
| | Date | | | | | | |
| | Expiration Date | | | | | | |
| | Digest Algorithm ID | | | | | | |
| | Digital Signature Alg ID | | | | | | |
| Transaction ID | Yes | Yes | Output Part | RSA | CH Pub Key | | |
| End-User(s) ID | Yes | Yes | Output Part | RSA | CH Pub Key | | |
| End-User(s)' Public Key | Yes | Yes | | | | | |
| Offer SC(s) | One Offer SC(s) | Yes | | | | | |
| Selections of Content Use | Yes | Yes | | | | | |
| HTML to Display in Browser Wdw | Yes | Yes | | | | | |
| Key Description Part | Yes | Yes | | | | | |
| Electronic Digital Content Store(s) Certificate | Yes | No | | | | | |
| | Digital Signature | | | | | | |
| *Order SC(s) Parts* | | | | | | | |
| | SC(s) Version | | | | | | |
| | SC(s) ID | | | | | | |
| | SC(s) Type | | | | | | |
| | SC(s) Publisher | | | | | | |
| | Date | | | | | | |
| | Expiration Date | | | | | | |
| | Digest Algorithm ID | | | | | | |
| | Digital Signature Alg ID | | | | | | |

-continued

| | BOM | | | Key Description Part | | | |
|---|---|---|---|---|---|---|---|
| Parts | Part Exists | Digest | Result Name | Encrypt Alg | Key ID/Enc Key | Sym Key Alg | Sym Key ID |
| Offer SC(s) BOM | Yes | Yes | | | | | |
| Transaction SC(s) BOM | Yes | Yes | | | | | |
| Encrypted Credit Card Info | Yes | Yes | Output Part | RSA | CH Pub Key | | |
| Key Description Part | Yes | Yes | | | | | |
| | | Digital Signature | | | | | |

The following describes the terms that are used in the above Order SC(s) 650 that were not previously described for another SC(s):

Transaction SC(s) BOM—The BOM in the original Transaction SC(s) 640. The record in the Order SC(s) 650 BOM includes the digest of the Transaction SC(s) 640 BOM.

Encrypted Credit Card Info.—Optional encrypted information from the End-User(s) that is used to charge the purchase to a credit card or debit card. This information is required when the Electronic Digital Content Store(s) 103 that created the Offer SC(s) 641 does not handle the customer billing, in which case the Clearinghouse(s) 105 may handle the billing.

H. License Secure Container 660 Format

The following table shows the parts that are included in the License SC(s) 660 as well as its BOM. As shown in the Key Description part, the Symmetric Keys 623 that are required for decrypting the watermarking instructions, Content 113, and Content 113 metadata have been re-encrypted by the Clearinghouse(s) 105 using the End-User(s)' Public Key 661. When the End-User Device(s) 109 receives the License SC(s) 660 it decrypts the Symmetric Keys 623 and use them to access the encrypted parts from the License SC(s) 660 and the Content SC(s) 630.

The following describes the terms that are used in the above License SC(s) 660 that were not previously described for another SC(s):

EU Pub Key—An identifier that indicates that the End-User(s)' Public Key 661 was used to encrypt the data.

Order SC(s) 650 ID—The SC(s) ID taken from the Order SC(s) 650 BOM.

Certificate Revocation List—An optional list of certificate IDs which were previously issued and signed by the Clearinghouse(s) 105, but are no longer considered to be valid. Any SC(s) that have a signature which can be verified by a certificate that is included in the revocation list are invalid SC(s). The End-User Player Application 195 stores a copy of the Clearinghouse's 105 certificate revocation list on the End-User Device(s) 109. Whenever a revocation list is received, the End-User Player Application 195 replaces its local copy if the new one is more up to date. Revocation lists includes a version number or a time stamp (or both) in order to determine which list is the most recent.

I. Content Secure Container Format

The following table shows the parts that are included in the Content SC(s) 630 as well as the BOM:

| | BOM | | | Key Description Part | | | |
|---|---|---|---|---|---|---|---|
| Parts | Part Exists | Digest | Result Name | Encrypt Alg | Key ID/Enc Key | Sym Key Alg | Sym Key ID |
| [Content URL] | | | Output Part | RC4 | Enc Sym Key | RSA | EU Pub Key |
| [Metadata URL] | | | Output Part | RC4 | Enc Sym Key | RSA | EU Pub Key |
| | | SC(s) Version | | | | | |
| | | SC(s) ID | | | | | |
| | | SC(s) Type | | | | | |
| | | SC(s) Publisher | | | | | |
| | | Date | | | | | |
| | | Expiration Date | | | | | |
| | | Digest Algorithm ID | | | | | |
| | | Digital Signature Alg ID | | | | | |
| Content ID | Yes | Yes | | | | | |
| Usage Conditions | Yes | Yes | | | | | |
| Transaction Data | Yes | Yes | | | | | |
| Watermarking Instructions | Yes | Yes | Output Part | RC4 | Enc Sym Key | RSA | EU Pub Key |
| Key Description Part | Yes | Yes | | | | | |
| Certificate(s) | Yes | No | | | | | |
| | | Digital Signature | | | | | |

| BOM | | |
|---|---|---|
| Parts | Part Exists | Digest |
| | | SC(s) Version |
| | | SC(s) ID |
| | | SC(s) Type |
| | | SC(s) Publisher |
| | | Date |
| | | Expiration Date |
| | | Clearinghouse(s) 105 URL |
| | | Digest Algorithm ID |
| | | Digital Signature Alg ID |
| Content ID | Yes | Yes |
| Encrypted Content | Yes | Yes |
| Encrypted Metadata | Yes | Yes |
| Metadata | Yes | Yes |
| Certificate(s) | Yes | No |
| | | Digital Signature |

The following describes the terms used in the above Content SC(s) 630 that were not previously described for another SC(s):

Encrypted Content—Content 113 that was encrypted by a Content Provider(s) 101 using a Symmetric Key 623.

Encrypted Metadata—Metadata associated with the Content 113 that was encrypted by a Content Provider(s) 101 using a Symmetric Key 623.

There is no Key Description part included in the Content SC(s) 630 since the keys required to decrypt the encrypted parts are in the License SC(s) 660 that is built at the Clearinghouse(s) 105.

VI. Secure Container Packing and Unpacking

A. Overview

The SC(s) Packer is a 32-bit Windows's program with an API (Application Programming Interface) that can be called in either a multiple or single step process to create a SC(s) with all of the specified parts. The SC(s) Packer 151, 152, 153 variety of hardware platforms supporting Windows's program at the Content Provider(s) 101, Clearinghouse(s) 105, Electronic Digital Content Store(s) 103 and other sites requiring SC(s) Packing. A BOM and, if necessary, a Key Description part are created and included in the SC(s). A set of packer APIs allows the caller to specify the information required to generate the records in the BOM and Key Description parts and to include parts in the SC(s). Encryption of parts and Symmetric Keys 623 as well as computing the digests and the digital signature is also be performed by the packer. Encryption and digest algorithms that are supported by the packer are included in the packer code or they are called through an external interface.

The interface to the packer for building a SC(s) is done by an API that accepts the following parameters as input:

A pointer to a buffer of concatenated structures. Each structure in the buffer is a command to the packer with the information that is required to execute the command. Packer commands include adding a part to the SC(s) with an associated BOM record, adding a record to the BOM, and adding records to the Key Description part.

A value indicating the number of concatenated structures contained in the above described buffer.

Name and location of the BOM part.

A value with each bit being a defined flag or a reserved flag for future use. The following flags are currently defined:

Indication as to whether all of the parts of the SC(s) should be bundled together into a single file after all of the structures in the buffer have been processed. Bundling the parts into a single object is the last step that is performed when building a SC(s).

Indication as to whether the digital signature is omitted from the BOM part. If this flag is not set, then the digital signature is computed right before the SC(s) is bundled into a single object.

In an alternate embodiment, the interface to the packer for building a SC(s) is done by APIs that accept the following parameters as input:

First, an API is called to create a Bill of Materials (BOM) part by passing in pointer to a structure that consists of information that is used to initialize SC(s) settings that are denoted as IP records in the SC(s) BOM part, the name to use for the BOM part, a default location to look for parts that will be added, and a flags value. This API returns a SC(s) handle that is used in subsequent Packer APIs.

The Packer has an API that is used whenever a part is added to a SC(s). This API accepts a SC(s) handle, which was previously returned by a previous Packer API, a pointer to a structure that consists of information about the part that is being added, and a flags value. Information about the part being added includes the name and location of the part, the name to use in the BOM for the part, the type of part that is being added, a hash value for the part, flags, etc.

After all of the parts have been added to the SC(s) a Packer API is called to pack all of the parts, including the BOM part, into a single SC(s) object, which is typically a file. This API accepts a SC(s) handle, which was previously returned by a previous Packer API, the name to use for the packed SC(s), a pointer to a structure with information for signing the SC(s), and a flags value.

Either the packer or the entity calling the packer can use a SC(s) template to build a SC(s). SC(s) templates have information that define parts and records that are required in the SC(s) that is being built. Templates can also define encryption methods and key references to use for encrypting Symmetric Keys 623 and encrypted parts.

The packer has an API that is used to unpack a SC(s). Unpacking a SC(s) is the process of taking a SC(s) and separating it into its individual parts. The packer can then be called to decrypt any of the encrypted parts that were unpacked from the SC(s).

B. Bill of Materials (BOM) Part

The BOM part is created by the packer when a SC(s) is being built. The BOM is a text file that contains records of information about the SC(s) and about the parts that are included in the SC(s). Each record in the BOM is on a single line with a new line indicating the start of a new record. The BOM usually includes digests for each part and a digital signature that can be used to validate the authenticity and integrity of the SC(s).

The record types within a BOM are as follows:

IP An IP record contains a set of Name=Value pairs pertaining to the SC(s). The following Names are reserved for specific properties of SC(s):

V major.minor.fix

The V property specifies the version of the SC(s). This is the version number of the SC(s) specification that the SC(s) was created under. The string that follows should be of the form major.minor.fix, where major, minor, and fix are the major release number, minor release number, and fix level, respectively.

ID value

The ID property is a unique value that is assigned to this specific SC(s) by the entity that is creating this SC(s). The format of the value is defined in a later version of this document.

T value

The T property specifies the type of the SC(s), which should be one of:
ORD—An Order SC(s) 650.
OFF—An Offer SC(s) 641.
LIC—A License SC(s).
TRA—A Transaction SC(s) 640.
MET—A Metadata SC(s) 620.
CON—A Content SC(s) 630.

A value

The A property identifies the author or publisher of the SC(s). Author/publisher identities should be unambiguous and/or registered with the Clearinghouse(s) 105.

D value

The D property identifies the date, and optionally, the time that the SC(s) was created. The value should be of the form yyyy/mm/dd[@hh:mm[:ss[.fsec]][(TZ)]] representing year/month/day@hour:minute:second.decimal-fraction-of-second (time-zone). Optional parts of the value are enclosed in [ ] characters.

E value

The E property identifies the date, and optionally, the time that the SC(s) expires. The value should be the same form used in the D property that was previously defined. The expiration date/time should be compared, whenever possible, with the date/time at the Clearinghouse(s) 105.

CCURL value

The CCURL property identifies the URL of the Clearinghouse(s) 105. The value should be of the form of a valid external URL.

H value

The H property identifies the algorithm that was used to calculate the message digests for the parts included in the SC(s). An example digest algorithm is MD5.

D A D record is a data or part entry record that contains information that identifies the type of part, the name of the part, the (optional) digest of the part, and an (optional) indication that the part is not included in the SC(s). A − sign immediately after the type identifier is used to indicate that the part is not included in the SC(s). The following are reserved types of data or part records:

K part_name [digest]

Specifies the Key Description part.

W part_name [digest]

Specifies the watermarking instructions part.

C part_name [digest]

Specifies the certificate(s) used to validate the digital signature.

T part_name [digest]

Specifies the Usage Conditions part.

YF part_name [digest]

Specifies the Template part for the Offer SC(s) 641.

YO part_name [digest]

Specifies the Template part for the Order SC(s) 650.

YL part_name [digest]

Specifies the Template part for the License SC(s) 660.

ID part_name [digest]

Specifies the ID(s) of the Content 113 of the item(s) of Content 113 being referenced.

CH part_name [digest]

Specifies the Clearinghouse(s) 105 certificate part.

SP part_name [digest]

Specifies the Electronic Digital Content Store(s) 103 certificate part.

B part_name [digest]

Specifies a BOM part for another SC(s) that has its parts or a subset of its parts included in this SC(s).

BP part_name sc_part_name [digest]

Specifies a BOM part for another SC(s) that is included as a single part in this SC(s). The sc_part_name parameter is the name of the SC(s) part that is included in this SC(s) and that this BOM part defines. A BOM that is identical to this one is also included in the SC(s) that is defined by the sc_part_name parameter.

D part_name [digest]

Specifies a data (or metadata) part.

S An S record is a signature record the is used to define the digital signature of the SC(s). The digital signature is specified as follows:

S key_identifier signature_string signature_algorithm

The S record contains the key_identifier to indicate the encryption key of the signature, the signature_string, which is the base64 encoding of the digital signature bitstring, and the signature algorithm that was used to encrypt the digest to create the digital signature.

C. Key Description Part

The Key Description part is created by the packer to provide information about encryption keys that are needed for decryption of SC(s) encrypted parts. The encrypted parts may be included in the SC(s) being built or may be in other SC(s) which are referred to by the SC(s) being built. The Key Description part is a text file that contains records of information about the encryption keys and the parts for which the encryption keys are used. Each record in the Key Description part is on a single line with a new line indicating the start of a new record.

The following record type is used within a Key Description part and is defined as follows:

K encrypted_part_name; result_part_name; part_encryption_algorithm_identifier; public_key_identifier key_encryption-algorithm and encrypted-symmetric-key.

A K record specifies an encrypted part that may be included in this SC(s) or may be included in another SC(s) that is referred to by this record. The encrypted_part_name is either the name of a part in this SC(s) or a URL pointing to the name of the encrypted part in another SC(s). The result_part_name is the name that is given to the decrypted part. The part_encryption_algorithm_identifier indicates the encryption algorithm that was used to encrypt the part. The public key identifier is an identifier of the key that was used to encrypt the Symmetric Key 623.

The key_encryption_algorithm_identifier indicates the encryption algorithm that was used to encrypt the Symmetric Key 623. The encrypted symmetric key is a base64 encoding of the encrypted Symmetric Key 623 bit string that was used to encrypt the part.

VII. Clearinghouse(s) 105

A. Overview

The Clearinghouse(s) 105 is responsible for the rights management functions of the Secure Digital Content Electronic Distribution System 100. Clearinghouse(s) 105 functions include enablement of Electronic Digital Content Store(s) 103, verification of rights to Content 113, integrity and authenticity validation of the buying transaction and related information, distribution of Content encryption keys or Symmetric Keys 623 to End-User Device(s) 109, tracking the distribution of those keys, and reporting of transaction summaries to Electronic Digital Content Store(s) 103 and Content Provider(s) 101. Content encryption keys are used by End-User Device(s) 109 to unlock Content 113 for which they have obtained rights, typically by a purchase transaction from an authorized Electronic Digital Content Store(s) 103. Before a Content encryption key is sent to an End-User Device(s) 109, the Clearinghouse(s) 105 goes through a verification process to validate the authenticity of the entity that is selling the Content 113 and the rights that the End-User Device(s) 109 has to the Content 113. This is called the SC Analysis Tool 185. In some configurations the Clearinghouse(s) 105 may also handle the financial settlement of Content 113 purchases by co-locating a system at the Clearinghouse(s) 105 that performs the Electronic Digital Content Store(s) 103 functions of credit card authorization and billing. The Clearinghouse(s) 105 uses OEM packages such as ICVerify and Taxware to handle the credit card processing and local sales taxes.

Electronic Digital Content Store(s) Embodiment

An Electronic Digital Content Store(s) 103 that wants to participate as a seller of Content 113 in the Secure Digital Content Electronic Distribution System 100 makes a request to one or more of the Digital Content Provider(s) 101 that provide Content 113 to the Secure Digital Content Electronic Distribution System 100. There is no definitive process for making the request so long as the two parties come to an agreement. After the digital content label such as a Music Label e.g. Sony, Time-Warner, etc. decides to allow the Electronic Digital Content Store(s) 103 to sell its Content 113, the Clearinghouse(s) 105 is contacted, usually via E-mail, with a request that the Electronic Digital Content Store(s) 103 be added to the Secure Digital Content Electronic Distribution System 100. The digital content label provides the name of the Electronic Digital Content Store(s) 103 and any other information that may be required for the Clearinghouse(s) 105 to create a digital certificate for the Electronic Digital Content Store(s) 103. The digital certificate is sent to the digital content label in a secure fashion, and then forwarded by the digital content label to the Electronic Digital Content Store(s) 103. The Clearinghouse(s) 105 maintains a database of digital certificates that it has assigned. Each certificate includes a version number, a unique serial number, the signing algorithm, the name of the issuer (e.g., the name of Clearinghouse(s) 105), a range of dates for which the certificate is considered to be valid, the name Electronic Digital Content Store(s) 103, the public key of the Electronic Digital Content Store(s) 103, and a hash code of all of the other information signed using the private key of the Clearinghouse(s) 105. Entities that have the Public Key 621 of the Clearinghouse(s) 105 can validate the certificate and then be assured that a SC(s) with a signature that can be validated using the public key from the certificate is a valid SC(s).

After the Electronic Digital Content Store(s) 103 has received its digital certificate that was created by the Clearinghouse(s) 105 and the necessary tools for processing the SC(s) from the digital content label, it can begin offering Content 113 that can be purchased by End-User(s). The Electronic Digital Content Store(s) 103 includes its certificate and the Transaction SC(s) 640 and signs the SC(s) using its Digital Signature 643. The End-User Device(s) 109 verifies that the Electronic Digital Content Store(s) 103 is a valid distributor of Content 113 on the Secure Digital Content Electronic Distribution System 100 by first checking the digital certificate revocation list and then using the Public Key 621 of the Clearinghouse(s) 105 to verify the information in the digital certificate for the Electronic Digital Content Store(s) 103. A digital certificate revocation list is maintained by the Clearinghouse(s) 105. The revocation list may be included as one of the parts in a License SC(s) 660 that is created by the Clearinghouse(s) 105. End-User Device(s) 109 keep a copy of the revocation list on the End-User Device(s) 109 so they can use it as part of the Electronic Digital Content Store(s) 103 digital certificate validation. Whenever the End-User Device(s) 109 receives a License SC(s) 660 it determines whether a new revocation list is included and if so, the local revocation list on the End-User Device(s) 109 is updated.

B. Rights Management Processing

Order SC(s) Analysis

The Clearinghouse(s) 105 receives an Order SC(s) 650 from an End-User(s) after the End-User(s) has received the Transaction SC(s) 640, which include the Offer SC(s) 641, from the Electronic Digital Content Store(s) 103. The Order SC(s) 650 consists of parts that contain information relative to the Content 113 and its use, information about the Electronic Digital Content Store(s) 103 that is selling the Content 113, and information about the End-User(s) that is purchasing the Content 113. Before the Clearinghouse(s) 105 begins processing the information in the Order SC(s) 650, it first performs some processing to insure that the SC(s) is in fact valid and the data it contains has not been corrupted in any way.

Validation

The Clearinghouse(s) 105 begins the validation of Order SC(s) 650 by verifying the digital signatures, then the Clearinghouse(s) 105 verifies the integrity of the Order SC(s) 650 parts. To validate the digital signatures, first the Clearinghouse(s) 105 decrypts the Contents 631 of the signature itself using the Public Key 661 of the signing entity included if signed. (The signing entity could be the Content Provider(s) 101, the Electronic Digital Content Store(s) 103, the End User Device(s) 109 or any combination of them.) Then, the Clearinghouse(s) 105 calculates the digest of the concatenated part digests of the SC(s) and compares it with the digital signature's decrypted Content 113. If the two values match, the digital signature is valid. To verify the integrity of each part, the Clearinghouse(s) 105 computes the digest of the part and compares it to the digest value in the BOM. The Clearinghouse(s) 105 follows the same process to verify the digital signatures and part integrity for the Metadata and Offer SC(s) 641 parts included within the Order SC(s) 650.

The process of verification of the Transaction and Offer SC(s) 641 digital signatures also indirectly verifies that the Electronic Digital Content Store(s) 103 is authorized by the Secure Digital Content Electronic Distribution System 100. This is based on the fact that the Clearinghouse(s) 105 is the issuer of the certificates. Alternately, the Clearinghouse(s) 105 would be able to successfully verify the digital signatures of the Transaction SC(s) 640 and Offer SC(s) 641 using the public key from the Electronic Digital Content Store(s)

103, but only if the entity signing the SC(s) has ownership of the associated private key. Only the Electronic Digital Content Store(s) 103 has ownership of the private key. Notice that the Clearinghouse(s) 105 does not need to have a local database of the Electronic Digital Content Store(s) 103. Since the store uses the Clearinghouse Public Key to sign the Transaction SC(s) 640 Offer SC(s) 641 public keys.

Then, the Store Usage Conditions 519 of the Content 113 which the End-User(s) is purchasing are validated by the Clearinghouse(s) 105 to insure that they fall within the restrictions that were set in the Metadata SC(s) 620. Recall that the Metadata SC(s) 620 is included within the Order SC(s) 650.

Key Processing

Processing of the encrypted Symmetric Keys 623 and of the watermarking instructions are done by the Clearinghouse (s) 105 after authenticity and the integrity check of the Order SC(s) 650, the validation of the Electronic Digital Content Store(s) 103, and the validation of the Store Usage Conditions 519 have been completed successfully. The Metadata SC(s) 620 portion of the Order SC(s) 650 typically has several Symmetric Keys 623 located in the Key Description part that were encrypted using the Public Key 621 of the Clearinghouse(s) 105. Encryption of the Symmetric Keys 623 are done by the Content Provider(s) 101 when the Metadata SC(s) 620 was created.

One Symmetric Key 623 are used for decrypting the watermarking instructions and the others for decrypting the Content 113 and any encrypted metadata. Since Content 113 can represent a single song or an entire collect of songs on a CD, a different Symmetric Key 623 may be used for each song. The watermarking instructions are included within the Metadata SC(s) 620 portion in the Order SC(s) 650. The Content 113 and encrypted metadata are in the Content SC(s) 630 at a Content Hosting Site(s) 111. The URL and part_names of the encrypted Content 113 and metadata parts, within the Content SC(s) 630, are included in the Key Description part of the Metadata SC(s) 620 portion of the Order SC(s) 650. The Clearinghouse(s) 105 uses its private key to decrypt the Symmetric Keys 623 and then encrypts each of them using the Public Key 661 of the End-User Device(s) 109. The Public Key 661 of the End-User Device (s) 109 is retrieved from the Order SC(s) 650. The new encrypted Symmetric Keys 623 are included in the Key Description part of the License SC(s) 660 that the Clearinghouse(s) 105 returns to the End-User Device(s) 109.

During the time of processing the Symmetric Keys 623, the Clearinghouse(s) 105 may want to make modifications to the watermarking instructions. If this is the case, then after the Clearinghouse(s) 105 decrypts the Symmetric Keys 623, the watermarking instructions are modified and re-encrypted. The new watermarking instructions are included as one of the parts within the License SC(s) 660 that gets returned to the End-User Device(s) 109.

If all of the processing of the Order SC(s) 650 is successful, then the Clearinghouse(s) 105 returns a License SC(s) 660 to the End-User Device(s) 109. The End-User Device(s) 109 uses the License SC(s) 660 information to download the Content SC(s) 630 and access the encrypted Content 113 and metadata. The watermarking instructions are also executed by the End-User Device(s) 109.

If the Clearinghouse(s) 105 is not able to successfully process the Order SC(s) 650, then an HTML page is returned to the End-User Device(s) 109 and displayed in an Internet browser window. The HTML page indicates the reason that the Clearinghouse(s) 105 was unable to process the transaction.

In an alternate embodiment, if the user has purchased a copy of the Content 113 prior to the release date set for the sale, the License(s) SC 660 is returned without the Symmetric Keys 623. The License(s) SC 660 is returned to the Clearinghouse(s) 105 on or after the release date to receive the Symmetric Keys 623. As an example, the Content Provider(s) 101 allow users to download a new song prior to the release date for the song to enable customers to download the song and be prepared to play the song before a date set by the Content Provider(s) 101. This allows immediate opening of the Content 113 on the release date without having to content for bandwidth and download time on the release date.

C. Country Specific Parameters

Optionally, the Clearinghouse(s) 105 uses the domain name of the End-User Device(s) 109 and, whenever possible, the credit card billing address to determine the country location of the End-User(s). If there are any restrictions for the sale of Content 113 in the country where the End-User(s) resides, then the Clearinghouse(s) 105 insures that the transaction being processed is not violating any of those restrictions before transmitting License SC(s) 660 to the End-User Device(s) 109. The Electronic Digital Content Store(s) 103 is also expected to participate in managing the distribution of Content 113 to various countries by performing the same checks as the Clearinghouse(s) 105. The Clearinghouse(s) 105 does whatever checking that it can in case the Electronic Digital Content Store(s) 103 is ignoring the country specific rules set by the Content Provider(s) 101.

D. Audit Logs and Tracking

The Clearinghouse(s) 105 maintains a Audit Logs 150 of information for each operation that is performed during Content 113 purchase transactions and report request transactions. The information can be used for a variety of purposes such as audits of the Secure Digital Content Electronic Distribution System 100, generation of reports, and data mining.

The Clearinghouse(s) 105 also maintains account balances in Billing Subsystem 182 for the Electronic Digital Content Store(s) 103. Pricing structures for the Electronic Digital Content Store(s) 103 is provided to the Clearinghouse(s) 105 by the digital content labels. This information can include things like current specials, volume discounts, and account deficit limits that need to be imposed on the Electronic Digital Content Store(s) 103. The Clearinghouse(s) 105 uses the pricing information to track the balances of the Electronic Digital Content Store(s) 103 and insure that they do not exceed their deficit limits set by the Content Provider(s) 101.

The following operations are typically logged by the Clearinghouse(s) 105:

End-User Device(s) 109 requests for License SC(s) 660

Credit card authorization number when the Clearinghouse (s) 105 handles the billing Dispersement of License SC(s) 660 to End-User Device (s) 109

Requests for reports

Notification from the End-User(s) that the Content SC(s) 630 and License SC(s) 660 were received and validated The following information is typically logged by the Clearinghouse(s) 105 for a License SC(s) 660:

Date and time of the request

Date and time of the purchase transaction

Content ID of the item being purchased

Identification of the Content Provider(s) 101

Store Usage Conditions 519

Watermarking instruction modifications

Transaction ID 535 that was added by the Electronic Digital Content Store(s) 103

Identification of the Electronic Digital Content Store(s) 103

Identification of the End-User Device(s) 109

End-User(s) credit card information (if the Clearinghouse(s) 105 is handling the billing)

The following information is typically logged by the Clearinghouse(s) 105 for an End-User's credit card validation:

Date and time of the request

Amount charged to the credit card

Content ID of the item being purchased

Transaction ID 535 that was added by the Electronic Digital Content Store(s) 103

Identification of the Electronic Digital Content Store(s) 103

Identification of the End-User(s)

End-User(s) credit card information

Authorization number received from the clearer of the credit card

The following information is typically logged by the Clearinghouse(s) 105 when a License SC(s) 660 is sent to an End-User Device(s) 109:

Date and time of the request

Content ID of the item being purchased

Identification of Content Provider(s) 101

Usage Conditions 517

Transaction ID 535 that was added by the Electronic Digital Content Store(s) 103

Identification of the Electronic Digital Content Store(s) 103

Identification of the End-User(s)

The following information is typically logged when a report request is made:

Date and time of the request

Date and time the report was sent out

Type of report being requested

Parameters used to generate the report

Identifier of the entity requesting the report

E. Reporting of Results

Reports are generated by the Clearinghouse(s) 105 using the information that the Clearinghouse(s) 105 logged during End-User(s) purchase transactions. Content Provider(s) 101 and Electronic Digital Content Store(s) 103 can request transaction reports from the Clearinghouse(s) 105 via a Payment Verification Interface 183 so they can reconcile their own transaction databases with the information logged by the Clearinghouse(s) 105. The Clearinghouse(s) 105 can also provide periodic reports to the Content Provider(s) 101 and Electronic Digital Content Store(s) 103.

The Clearinghouse(s) 105 defines a secure electronic interface which allows Content Provider(s) 101 and Electronic Digital Content Store(s) 103 to request and receive reports. The Report Request SC(s) includes a certificate that was assigned by the Clearinghouse(s) 105 to the entity initiating the request. The Clearinghouse(s) 105 uses the certificate and the SC's digital signature to verify that the request originated from an authorized entity. The request also includes parameters, such as time duration, that define the scope of the report. The Clearinghouse(s) 105 validates the request parameters to insure that requesters can only receive information for which they are permitted to have.

If the Clearinghouse(s) 105 determines that the Report Request SC(s) is authentic and valid, then the Clearinghouse(s) 105 generates a report and pack it into a Report SC(s) to be sent to the entity that initiated the request. Some reports may be automatically generated at defined time intervals and stored at the Clearinghouse(s) 105 so they can be immediately sent when a request is received. The format of the data included in the report is defined in a later version of this document.

F. Billing and Payment Verification

Billing of Content 113 can be handled either by the Clearinghouse(s) 105 or by the Electronic Digital Content Store(s) 103. In the case where the Clearinghouse(s) 105 handles the billing of the electronic Content 113, the Electronic Digital Content Store(s) 103 separates the End-User (s)' order into electronic goods and, if applicable, physical goods. The Electronic Digital Content Store(s) 103 then, notifies the Clearinghouse(s) 105 of the transaction, including the End-User(s)' billing information, and the total amount that needs to be authorized. The Clearinghouse(s) 105 authorizes the End-User(s)' credit card and returns a notification back to the Electronic Digital Content Store(s) 103. At the same time the Clearinghouse(s) 105 is authorizing the End-User(s)' credit card, the Electronic Digital Content Store(s) 103 can charge the End-User(s)' credit card for any physical goods that are being purchased. After each electronic item is downloaded by the End-User Device(s) 109, the Clearinghouse(s) 105 is notified so the End-User(s)' credit card can be charged. This occurs as the last step by the End-User Device(s) 109 before the Content 113 is enabled for use at the End-User Device(s) 109.

In the case where the Electronic Digital Content Store(s) 103 handles the billing of the electronic Content 113, the Clearinghouse(s) 105 is not notified about the transaction until the End-User Device(s) 109 sends the Order SC(s) 650 to the Clearinghouse(s) 105. The Clearinghouse(s) 105 is still notified by the End-User Device(s) 109 after each electronic item is downloaded. When the Clearinghouse(s) 105 is notified it sends a notification to the Electronic Digital Content Store(s) 103 so that the Electronic Digital Content Store(s) 103 can charge the End-User(s)' credit card.

G. Retransmissions

The Secure Digital Content Electronic Distribution System 100 provides the ability to handle retransmissions of Content 113. This is typically performed by a Customer Service Interface 184. Electronic Digital Content Store(s) 103 provides a user interface that the End-User(s) can step through in order to initiate a retransmissions. The End-User(s) goes to the Electronic Digital Content Store(s) 103 site where the Content 113 item was purchased in order to request a retransmissions of the Content 113.

Retransmissions of Content 113 are done when an End-User(s) requests a new copy of a previously purchased Content 113 item because the Content 113 could not be downloaded or the Content 113 that was downloaded is not usable. The Electronic Digital Content Store(s) 103 determines whether the End-User(s) is entitled to do a retransmissions of the Content 113. If the End-User(s) is entitled to a retransmissions, then the Electronic Digital Content Store(s) 103 builds a Transaction SC(s) 640 that includes the Offer SC(s) 641 of the Content 113 item(s) being retransmitted. The Transaction SC(s) 640 is sent to the End-User Device(s) 109 and the identical steps as for a purchase transaction are performed by the End-User(s). If the End- User Device(s) 109 has a scrambled key(s) in the key library for the Content 113 item(s) undergoing retransmissions, then the Transaction SC(s) 640 includes information that instructs the End-User Device(s) 109 to delete the scrambled key(s).

In the case where the Clearinghouse(s) 105 handles the financial settlement of Content 113 purchases, the Electronic Digital Content Store(s) 103 includes a flag in the Transaction SC(s) 640 that is carried forward to the Clearinghouse(s) 105 in the Order SC(s) 650. The Clearinghouse(s) 105 interprets the flag in the Order SC(s) 650 and proceed with the transaction without charging the End-User(s) for the purchase of the Content 113.

VIII. Content Provider

A. Overview

The Content Provider(s) 101 in the Secure Digital Content Electronic Distribution System 100 is the digital content label or the entity who owns the rights to the Content 113. The role of the Content Provider(s) 101 is to prepare the Content 113 for distribution and make information about the Content 113 available to Electronic Digital Content Store(s) 103 or retailers of the downloadable electronic versions of the Content 113. To provide the utmost security and rights control to the Content Provider(s) 101, a series of tools are provided to enable the Content Provider(s) 101 to prepare and securely package their Content 113 into SC(s) at their premises so that the Content 113 is secure when it leaves the Content Provider(s)' 101 domain and never exposed or accessible by unauthorized parties. This allows Content 113 to be freely distributed throughout a non-secure network, such as the Internet, without fear of exposure to hackers or unauthorized parties.

The end goal of the tools for the Content Provider(s) 101 is to prepare and package a Content 113 such as a song or series of songs into Content SC(s) 630 and to package information describing the song, approved uses of the song (content Usage Conditions 517), and promotional information for the song into a Metadata SC(s) 620. To accomplish this, the following set of tools are provided:

- Work Flow Manager 154—Schedules processing activities and manages the required synchronization of processes.
- Content Processing Tools 155—A collection of tools to control Content 113 file preparation including Watermarking, Preprocessing (for an audio example any required equalization, dynamics adjustment, or re-sampling) encoding and compression.
- Metadata Assimilation and Entry Tool 161—A collection of tools used to gather Content 113 description information from the Database 160 of the Content Provider(s) and/or third party database or data import files and/or via operator interaction and provides means for specifying content Usage Conditions 517. Also provided is an interface for capturing or extracting content such as digital audio content for CDS or DDP files. A Quality Control Tool enables to preview of prepared content and metadata. Any corrections needed to the metadata or resubmission of the content for further processing can be conducted.
- SC(s) Packer Tool 152—Encrypts and packages all Content 113 and information and calls the SC(s) Packer to pack into SC(s).
- Content Dispersement Tool (not shown)—Disperses SC(s) to designated distribution centers, such as Content Hosting Site(s) 111 and Electronic Digital Content Store(s) 103.
- Content Promotions Web Site 156—stores Metadata SC(s) 620 and optionally additional promotional material for download by authorized Electronic Digital Content Store(s) 103.

B. Work Flow Manager 154

The purpose of this tool is to schedule, track, and manage Content 113 processing activities. This application enables multi-user access as well as allowing scheduling of Content 113 and status checking from remote locations within the Intranet or extranet of the Content Provider(s) 101. This design also allows for collaborative processing where multiple individuals can be working on multiple pieces of Content 113 in parallel and different individuals can be assigned specific responsibilities and these individuals can be spread throughout the world.

Figure 7:
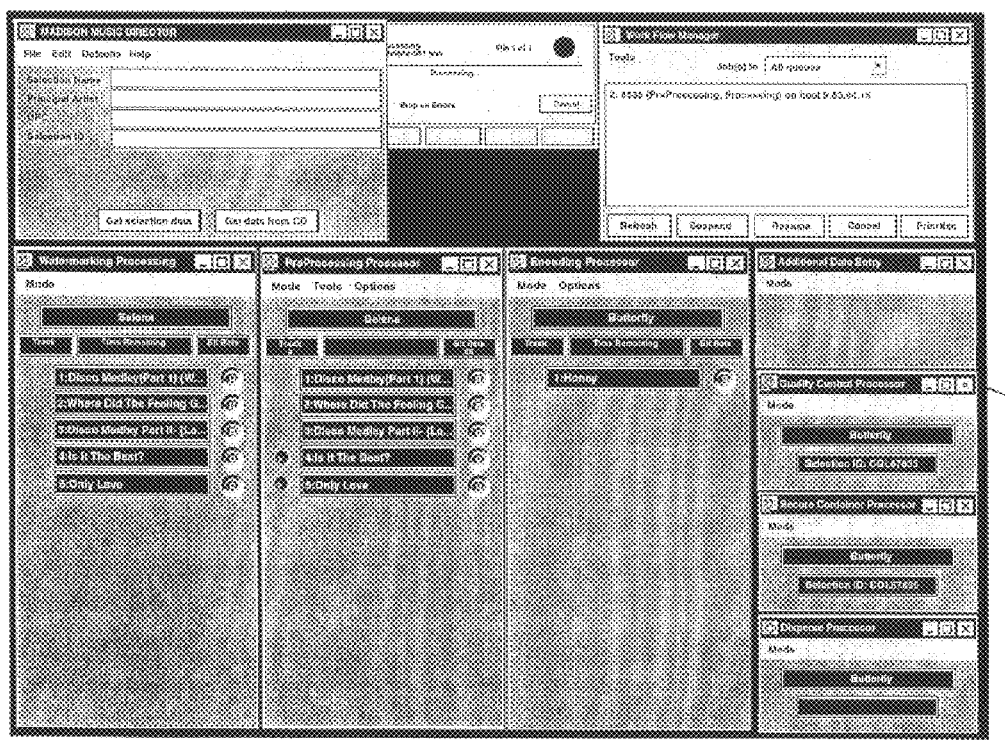
FIG. 7 is an illustration of an example user interface for the Work Flow Manager Tool of FIG. 1 according to the present invention.
Figure 8:
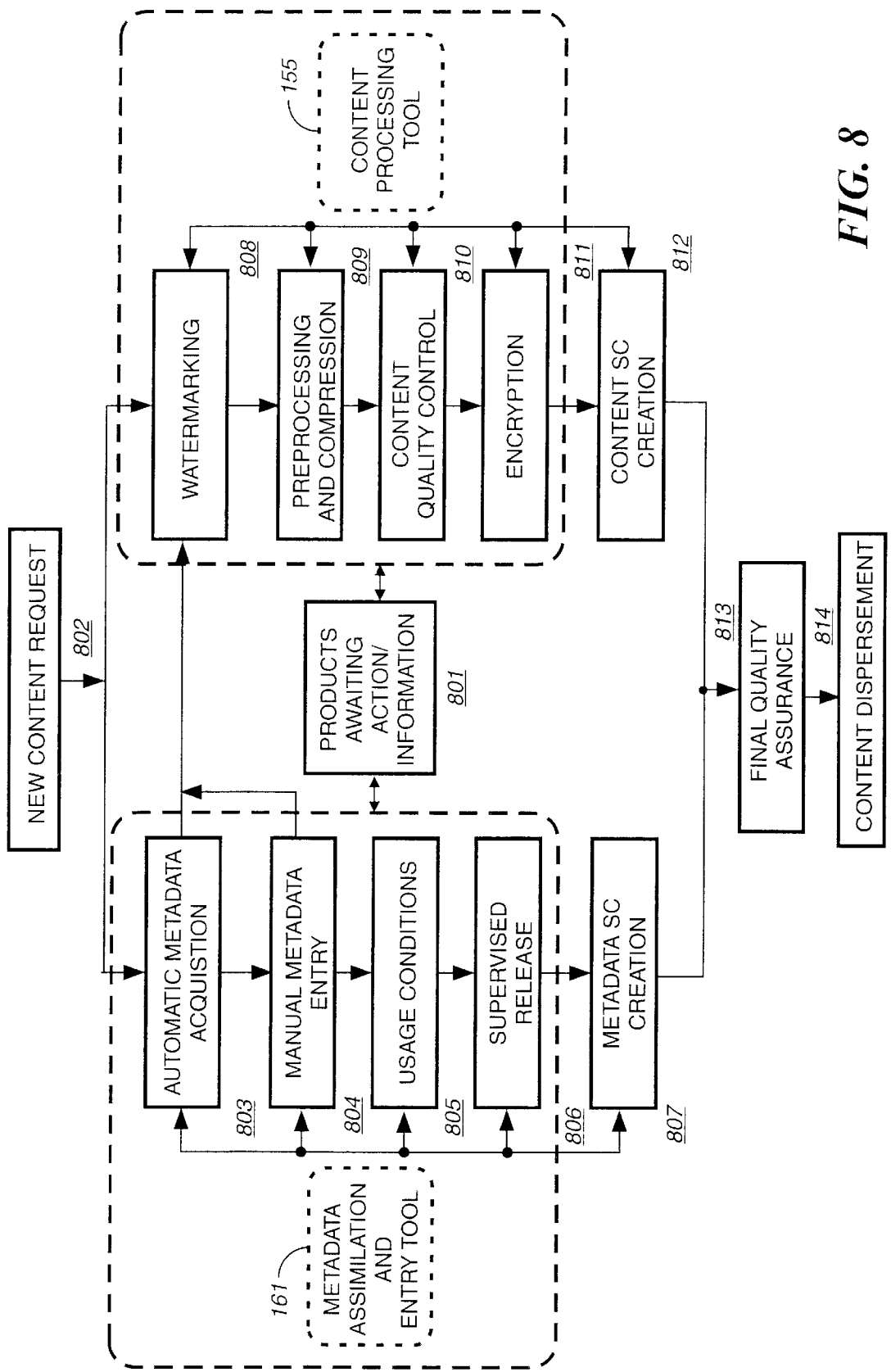
FIG. 8 is a block diagram of the major tools, components and processes of the Work Flow Manager corresponding to the user interface in FIG. 7 according to the present invention.

Turning now to FIG. 8 is a block diagram of the major processes of the Work Flow Manager 154 corresponding to FIG. 7. The major processes in FIG. 8 summarizes the Content 113 processing functions provided by the tools described in this section. The Work Flow Manager 154 is responsible for feeding jobs to these processes and directing jobs to the next required process upon completion of its current process. This is accomplished through a series of Application Programming Interfaces (APIs) which each processing tool calls to:

- retrieve the next job to process
- indicate successful completion of a process
- indicate unsuccessful completion of a process and reason for the failure
- provide interim status of a process (to allow initiation of processes that require only partial completion of a dependent process)
- add comments to a product which are made available to the designated processes The Work Flow Manager 154 also has a user interface, an example Work Flow Manager User Interface 700 is illustrated in FIG. 7 which provides the following functions:

- a configuration panel to allow specification of default values and conditions to be assigned and performed during various stages of processing
- customization of the work flow rules and automated processing flows
- job scheduling
- status queries and reports
- add comments or instructions for a job associated to one or more processes
- job management (i.e. suspend, release, remove, change priority (order of processing))

Each process has a queue associated with it managed by the Work Flow Manager 154. All processes requesting jobs from the Work Flow Manager 154 results in the Work Flow Manager 154 either suspending the process (tool) in a wait state if there are no jobs currently in its associated queue or returning to the process all information about the job needed to perform its respective process. If a process is suspended in a wait state, it resumes processing when a job is placed on its queue by the Work Flow Manager 154.

The Work Flow Manager 154 also manages the flow or order of processing based on a set of defined rules. These rules can be customized by the Content Provider(s) 101 if it has special processing requirements or configures specific defaults rules. When a process reports completion of its assigned task, it notifies the Work Flow Manager 154 of this status and the Work Flow Manager 154 decides what queue the job gets placed on next based on the defined rules.

Comments indicating special handling instructions or notices may also be attached to the product at any of the processing steps via either the programming API or manually through the Work Flow Manager User Interface 700 or processor interfaces.

The processes in the Work Flow Manager 154 are implemented in Java in the preferred embodiment but other programming languages such as C/C++, Assembler and equivalent can be used. It should be understood that the processes described below for the Work Flow Manager 154 can run on a variety of hardware and software platforms. The Work Flow Manager 154 as a complete system or as any of it's constitute processes may be distributed as an application program in a computer readable medium including but not limited to electronic distribution such as the web or on floppy diskettes, CD ROMS and removable hard disk drives.

Turning now to FIG. 8 is a block diagram of the major processes of the Work Flow Manager 154 corresponding to FIG. 7. The following sections summarize each process and describes the information or action required by each process.

1. Products Awaiting Action/Information Process 801

Jobs are placed on specific processes queues once all information required by that process is available and the job has already successfully completed all dependent processing. A special queue exists in the Work Flow Manager 154 which is used to hold jobs that are not currently available for processing due to missing information or a failure that prevent further processing. These jobs are placed in the Products Awaiting Action/Information Process 801 queue. Each job in this queue has associated status to indicate the action or information it is waiting on, the last process that worked on this job, and the next process(es) this job is queued to once the missing or additional information is provided or the required action is successfully completed.

Completion of any process causes the Work Flow Manager 154 to check this queue and determine if any job in this queue was awaiting the completion of this process (action) or information provided by this process. If so, that job is queued to the appropriate process queue.

2. New Content Request Process 802

The Content Provider(s) 101 determines those products (for example, a product may be a song or a collection of songs) it wishes to sell and deliver electronically. The initial function of the Work Flow Manager 154 is to enable an operator to identify these products and to place them on the queue of the New Content Request Process 802. The Content Provider(s) 101 may specify through configuration options, what information is prompted for on the product selection interface. Enough information is entered to uniquely identify the product. Optionally, additional fields may be included to request manual entry of the information required to initiate the audio processing phase in parallel with the metadata acquisition. If not provided manually, this information can optionally be retrieved from default configuration settings or from the Database 160 of the Content Provider(s), obtained in the first stage of Metadata Processing as in Automatic Metadata Acquisition Process 803. The makeup and capabilities of the Content 113 in the Database 160 of the Content Provider(s) determines the Content selection process.

If the required information needed to perform a query to the Database 160 of the Content Provider(s) 101 is specified, the job is processed by the Automatic Metadata Acquisition Process 803. In a music embodiment, to properly schedule the product for audio processing, the product's genre and the desired compression levels are specified as well as the audio PCM or WAV filename(s). This information may be entered as part of the product selection process or selected via a customized query interface or Web browser function. Specification of this information enables the product to be scheduled for content processing.

The product selection user interface provides an option enabling the operator to specify whether the product can be released for processing or whether it are held pending further information entry. If held, the job is added to the queue of the New Content Request Process 802 awaiting further action to complete data entry and/or release the product for processing. Once the product is released, the Work Flow Manager 154 evaluates the information specified and determines which processes the job is ready to be passed to.

If adequate information is provided to enable an automated query to the Database 160 of the Content Provider(s)' 101, the job is queued for Automatic Metadata Acquisition Process 803. If the database mapping table has not been configured for the Automatic Metadata Acquisition Process 803, the job is queued for Manual Metadata Entry Process 804 (see Automatic Metadata Acquisition Process 803 section for details on the Database Mapping Table).

If the required general information for audio processing and the specific information required for watermarking is specified, the job is queued for Watermarking Process 808 (the first phase of content processing). If any of the required information is missing when the job is released, the job is queued to the queue of the Products Awaiting Action/Information Process 801 along with status indicating the information that is missing.

If the status indicates that the filename of the Content 113, for example where the Content 113 is audio and the PCM or WAV file is missing, this may indicate that a capture (or digital extraction from digital media) is required. The audio processing functions require that the song files be accessible via a standard file system interface. If the songs are located on external media or a file system that is not directly accessible to the audio processing tools, the files are first be copied to an accessible file system. If the songs are in digital format but on CD or Digital Tape, they are extracted to a file system accessible to the audio processing tools. Once the files are accessible, the Work Flow Manager User Interface 700 is used to specify or select the path and filename for the job so that it can be released to the watermarking process, assuming all other information required for watermarking has also been specified.

3. Automatic Metadata Acquisition Process 803

The Automatic Metadata Acquisition Process 803 performs a series of queries to the Database 160 of the Content Provider(s) 101 or a staging database where data has been imported, in an attempt to obtain as much of the product information as possible in an automated fashion. The Automatic Metadata Acquisition Process 803 requires the following information prior to allowing items to be placed on its queue:

database mapping table with adequate information to generate queries to the Database 160 of the Content Provider(s) 101 product information required to perform queries adequate product information to uniquely define product An automated query is performed to the Database 160 of the Content Provider(s) 101 to obtain the information necessary to process this Content 113. For example, if the Content 113 is music, the information needed to perform this query could be the album name or may be a UPC or a specific album or selection ID as defined by the Content Provider(s) 101. Of the information to be obtained, some is designated as required (see the section on Automatic Metadata Acquisition Process 803 for details). If all required information is obtained, the job is next queued for Usage Conditions Process 805. If any required information is missing, the song is queued for Manual Metadata Entry Process 804. If any jobs in the Products Awaiting Action/information Process 801 queue are waiting for any of the information obtained in this step, the jobs status is updated to indicate that it is no longer waiting for this information. If that job no longer has any outstanding requirements, it is queued to the next defined queue.

4. Manual Metadata Entry Process 804

The Manual Metadata Entry Process 804 provides a means for an operator to enter missing information. It has no dependencies. Once all required information is specified, the job is queued for Usage Conditions Process 805.

5. Usage Conditions Process 805

The Usage Conditions Process 805 allows specification of product uses and restrictions. The Usage Conditions Process 805 may require some metadata. Upon completion of Usage Conditions specifications, the job is eligible to be queued for Metadata SC(s) Creation Process 807 unless the Supervised Release Process 806 option has been requested or is configured as the default in the Work Flow Manager 154 rules. In that case, the job is queued for Supervised Release Process 806. Before queuing to Metadata SC(s) Creation Process 807, the Work Flow Manager 154 will first assure that all dependencies for that process have been met (see below). If not, the job is queued to the Products Awaiting Action/Information Process 801.

6. Supervised Release Process 806

The Supervised Release Process 806 allows a quality check and validation of information specified for the digital content product. It does not have any dependencies. Comments previously attached to the job at any stage of the processing for this product can be reviewed by the Supervisor and appropriate action taken. After reviewing all information and comments, the Supervisor has the following options:

approve release and queue the product for Metadata SC(s) Creation Process 807 modify and/or add information and queue the product for Metadata SC(s) Creation Process 807 add comments to the job and re-queue for Manual Metadata Entry Process 804 add comments and queue the job to the queue for Products Awaiting Action/Information Process 801

7. Metadata SC(s) Creation Process 807

The Metadata SC(s) Creation Process 807 gathers together all the information collected above as well as other information required for the Metadata SC(s) 620 and calls the SC(s) Packer Process to create the Metadata SC(s) 620. This tool requires the following as input:

the required metadata the usage conditions the encryption keys used in the encryption stage of all quality levels for this product This last dependency requires that the associated audio objects completed the audio processing phase before the Metadata SC(s) 620 can be created. Upon completion of the Metadata SC(s) Creation Process 807, the job is queued to either the queue for Final Quality Assurance Process 813 or Content Dispersement Process 814 based on defined work flow rules.

8. Watermarking Process 808

The Watermarking Process 808 adds copyright and other information to the Content 113. For an embodiment where the Content 113 is a song, this tool requires the following as input:

song filename(s) (multiple filenames if album)

watermarking instructions watermarking parameters (information to be included in the watermark)

Upon completion of the Watermarking Process 808, the job is queued for Preprocessing and Compression Process 809 if its required input is available or otherwise queued to the Products Awaiting Action/Information Process 801.

9. Preprocessing and Compression Process 809

The Preprocessing and Compression Process 809 encodes the Content 113 to the specified compression level performing any required preprocessing first. Queuing a job to this queue actually create multiple queue entries. A job is created for each compression level of the product desired. The encoding processes can be performed in parallel on multiple systems. This tool requires the following input:

watermarked content filename(s) (multiple filenames if Content 113 is an album)

quality levels for product (could be preconfigured)

compression algorithm (could be preconfigured)

product genre (if required by preprocessor)

Upon completion of the encoding process, the jobs are queued to the Content Quality Control Process 810 if configured by the work flow rules. If not, the jobs are queued for Encryption Process 811.

Figure 11:
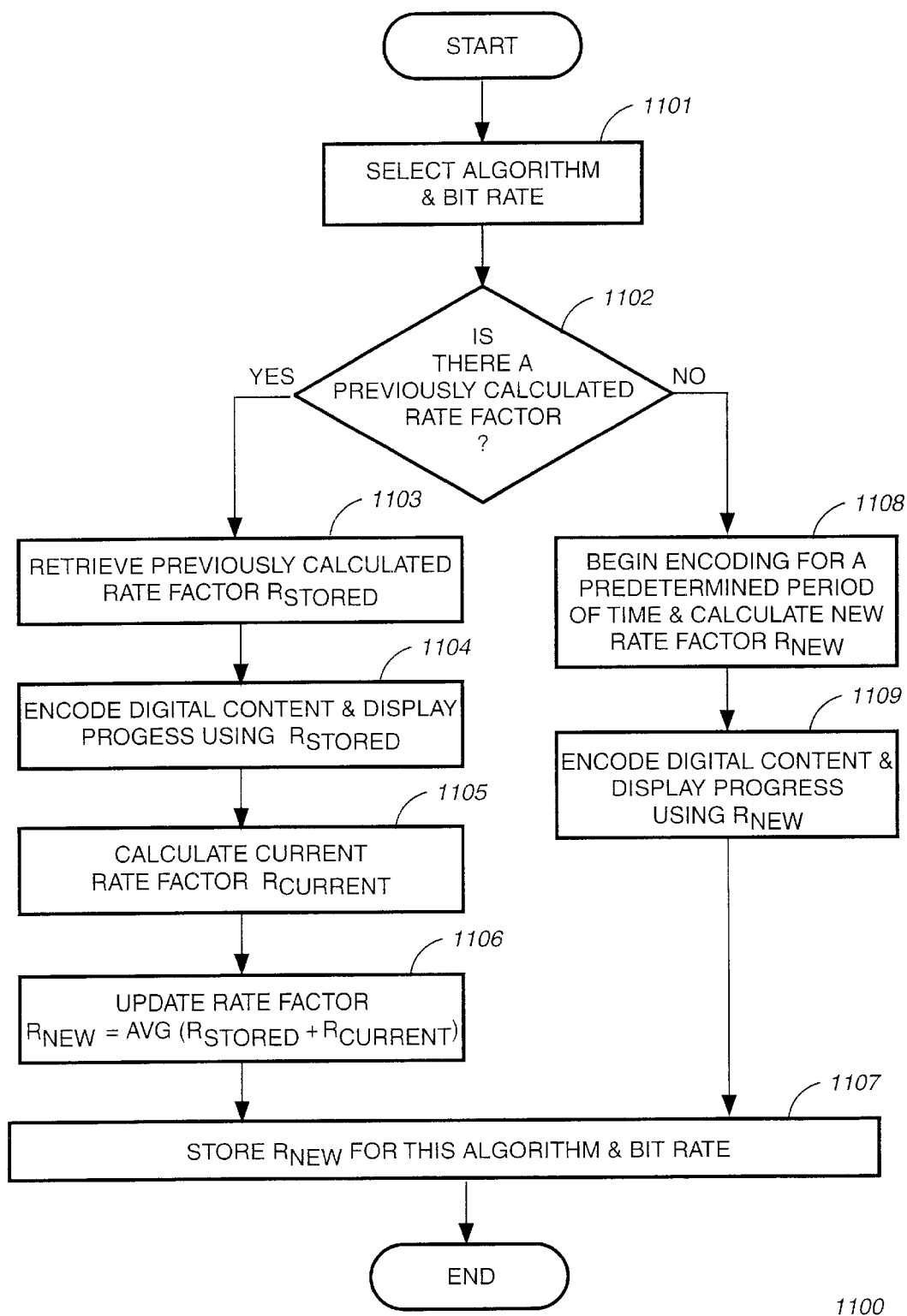
FIG. 11 is a flow diagram of a method to calculate an encoding rate factor for the Content Preprocessing and Compression tool of FIG. 8 according to the present invention.

If third party providers of encoding tools do not provide a method to display the percentage of the Content 113, such as audio, that has been processed or a method to indicate the amount of Content 113 that has been encoded as a percentage of the entire selection of Content 113 selected, in FIG. 11 there is shown a flow diagram 1100 of a method to determine the encoding rate of Digital Content for the Content Preprocessing and Compression tool of FIG. 8. The method begins with the selection of the desired encoding algorithm and a bit rate, step 1101. Next, a query is made to determine if this algorithm and encoding rate has a previously calculated rate factor, step 1102. The rate factor is the factor used to determine the rate of compression for a specific encoding algorithm and a specific bit rate. If no previously calculated rate factor is stored, a sample of the Content 113 is encoded for a predetermined amount of time. The predetermined period of time in the preferred embodiment is a few seconds. This rate of encoding for a predetermined period of time is used to calculate a new rate factor $R_{NEW}$. Calculating a new rate factor $R_{NEW}$ knowing the amount of time and the amount of Content 113 encoded is $R_{NEW}$=(length of Digital Content encoded)/(amount of time), step 1108. The Content 113 is encoded and the encoding status is displayed using the previously calculate rate factor $R_{NEW}$, step 1109. This encoding rate factor $R_{NEW}$ is then stored, step 1107, for future use for this encoding algorithm and encoding bit rate. If the selected algorithm has a previously calculated rate factor $R_{STORED}$, step 1103. The Content 113 is encoded and the progression displayed using the previously calculated rate factor $R_{STORED}$, step 1104. In the meantime, a current rate factor, $R_{current}$ is calculated for this selected algorithm and bit rate, step 1105. This current rate factor $R_{current}$ is used to update the stored rate factor $R_{NEW}$=AVERAGE OF ($R_{STORED}$+$R_{CURRENT}$) step 1106. The iterative update of the rate factor enables the determination of the encoding rate to become more and more accurate with each subsequent use for a particular encoding algorithm and bit rate. The new rate $R_{NEW}$ is then stored for future use, step 1107. The updating of $R_{STORED}$ may not be made if the current rate factor $R_{current}$ is out range for the previously stored rate factor $R_{STORED}$ by a given range or threshold.

The display of the encoding status can then be presented. The encoding status includes along with the current encoding rate, the display of the percentage of the total Content 113 displayed as a progression bar based on the encoding rate and the total length of the file for the Content 113. The encoding status can also include the time remaining for the encoding. The time remaining for the encoding can be calculated by dividing the encoding rate calculated $R_{CURRENT}$ by the total length of the file for Content 113. The encoding status can be transferred to another program that may invoke the calling process. This can help supervisory programs to encoding or co-dependent programs on encoding be operated and be batched for processing more efficiently. It should be understood, in an alternative embodiment, that encoding can include the step of watermarking.

10. Content Quality Control Process 810

The Content Quality Control Process 810 is similar in function to the Supervised Release Process 806. It is an optional step allowing someone to validate the quality of the content processing performed thus far. This has no dependencies other than completion of the Watermarking Process 808 and the encoding portion of the Preprocessing and Compression Process 809. Upon completion of the Content Quality Control Process 810 the following options are available:

the jobs can be released and queued for Encryption Process 811.

comments can be attached and one or more of the jobs re-queued for Preprocessing and Compression Process 809.

The last option requires that the unencoded watermarked version of the song file remain available until after Content Quality Control Process 810.

11. Encryption Process 811

The Encryption Process 811 calls the appropriate Secure Digital Content Electronic Distribution Rights Management function to encrypt each of the watermarked/encoded song files. This process has no dependencies other than completion of all other audio processing. Upon completion of the Encryption Process 811 process, the job is queued for Content SC(s) Creation Process 812.

12. Content SC(s) Creation Process 812

The Content SC(s) Creation Process 812 Process may require some metadata files to be included in the Content SC(s) 630. If files other than the Content 113 are required, the files are gathered and the SC(s) Packer Process is called to create a Content SC(s) 630 for each compression level of the Content 113 (e.g. a song) created. Upon completion of the Content SC(s) Creation Process 812, the song is queued to either the Final Quality Assurance Process 813 or Content Dispersement Process 814 queue based on defined work flow rules.

13. Final Quality Assurance Process 813

Final Quality Assurance Process 813 is an optional step that allows a cross reference check between the associated Metadata and Content SC(s) 630 to verify that they match up correctly and that all information and Content 113 contained therein are correct. Upon completion of Final Quality Assurance Process 813, the jobs are queued for Content Dispersement Process 814. If a problem is found, the job in most cases has to be re-queued to the failing stage. Rework at this stage is much more costly since the product has to go through re-encryption and repacking in addition to the reprocessing required to correct the problem. It is highly recommended that the prior assurance stages be used to assure the quality of the Content 113 and accuracy and completeness of the information.

14. Content Dispersement Process 814

The Content Dispersement Process 814 Process is responsible for transferring the SC(s) to the appropriate hosting sites. After the successful transfer of the SC(s), the job completion status is logged and the job is deleted from the queue. If a problem occurs in transferring the SC(s), after a defined number of retries, the job is flagged in the Workflow Manager Tool 154 as having failed along with the error encountered.

15. Work Flow Rules

The Work Flow Rules for FIG. 8 operate in three major systems as follows:

A: Work Flow Manager Tool 154
1. New Content Request Process 802
2. Products Awaiting Action/Information Process 801
3. Final Quality Assurance Process 813
4. Content Dispersement (and Notification) Process 814

B: Metadata Assimilation and Entry Tool 161
1. Automatic Metadata Acquisition Process 803
2. Manual Metadata Entry Process 804
3. Supervised Release Process 806
4. Metadata SC(s) Creation Process 807

C: Content Processing Tools 155
1. Watermarking Process 808 (requires copyright data)
2. Preprocessing and Compression Process 809
3. Content Quality Control Process 810
4. Encryption Process 811
5. Content SC(s) Creation Process 812

Work Flow

The Content 113 selection operator inputs a new product and it starts out queued onto A1 (New Content Request Process 802).

A1: When the Content 113 selection operator releases it to the Work Flow Manager Tool 154, then it gets queued onto B1 (the Automatic Metadata Acquisition Process 803).

A2: coming from step B1 (the Automatic Metadata Acquisition Process 803), or step B2 (Manual Metadata Entry Process 804), or step B3 (Supervised Release Process 806) on its way to step Before (the Metadata SC(s) Creation Process 807) [needs the encryption keys].

coming from step Before (the Metadata SC(s) Creation Process 807) on its way to either step A3 (the Final Quality Assurance Process 813) or step A4 (the Content Dispersement Process 814) [needs the Content SC(s) 630].

coming from step C1 (the Watermarking Process 808) on its way to step C2 (the Preprocessing and Compression Process 809) [needs the metadata for Preprocessing and Compression Process 809].

coming from step C4 (the Encryption Process 811) on its way to step C5 (the Content SC(s) Creation Process 812) [needs the metadata for Content SC(s) 630 Packing].

coming from step C5 (the Content SC(s) Creation Process 812) on its way to either step A3 (the Final Quality Assurance Process 813) or step A4 (the Content Dispersement Process 814) [needs the Metadata SC(s) 620].

A3: After step A3 (the Final Quality Assurance Process 813), place onto queue B2 (Manual Metadata Entry Process 804), or place onto queue B3 (Supervised Release Process 806), or place into queue as required by the quality assurance operator.

A4: After step A4 (Content Dispersement Process 814), the Work Flow Manager Tool 154 is done for this product.

B1: After step B1 (the Automatic Metadata Acquisition Process 803), if the metadata needed for step C1 (the Watermarking Process 808) is present, then place an entry representing this product onto queue C1. (do the following logic also)
- if either 1—any required metadata is missing, or 2—there are comments directed to the manual metadata providers, then also place the product onto queue B2 (Manual Metadata Entry Process 804),
- else if supervised release was requested for this product, then place the product onto queue B3 (Supervised Release Process 806).
- else if the product has all the information from the Content Processing Tools 155 for all of the requested quality levels, then place the product onto queue Before (the Metadata SC(s) Creation Process 807),
- else flag the product as needs the encryption keys and place the product onto queue A2 (Products Awaiting Action/Information Process 801).

B2: During step B2 (Manual Metadata Entry Process 804), if step C1 (the Watermarking Process 808) has not been done and the metadata needed for step C1 is present, then place an entry representing this product onto queue C1. (do the following logic also)
- if metadata needed for step C2 (the Preprocessing and Compression Process 809) just been provided, then (do the following logic also)
- if all the metadata that can be gathered by the Metadata Assimilation and Entry Tool 161 is present, then
  - if supervised release was requested for this product, then place the product onto queue B3 (Supervised Release Process 806) else
    - if all the information from step C4 (the Encryption Process 811) of the Content Processing Tools 155 is present, then place this product onto queue Before (the Metadata SC(s) Creation Process 807)
    - else flag the product as needs the encryption keys and place this product onto queue A2 (Products Awaiting Action/Information Process 801). else
  - if the metadata provider requested a forced supervised release, then place the product onto queue B3 (Supervised Release Process 806) else do nothing (keep the product on queue B2 (Manual Metadata Entry Process 804)).

B3: During step B3 (Supervised Release Process 806),
- if this operator is sending the product back to step B2 (Manual Metadata Entry Process 804), then place the product on queue B2.
- else if this operator released the product, then
  - if all the information from step C4 (the Encryption Process 811) of the Content Processing Tools 155 is present, then place this product onto queue Before (the Metadata SC(s) Creation Process)
  - else flag the product as needs the encryption keys and place this product onto queue A2 (Products Awaiting Action/Information Process 801).
- else the product remains on queue B3 (Supervised Release Process 806).

Before: After step Before (the Metadata SC(s) Creation Process 807), flag the product Metadata has been packed.
- if all the (product/quality level) tuples have been packed, then
  - if the Content Provider(s)' 101 configuration specifies Quality Assure the SC(s), then place this product onto queue A3 (the Final Quality Assurance Process 813)
  - else place this product onto queue A4 (the Content Dispersement Process 814).
- else flag the product as needs the Content 113 SC(s) and place this product onto queue A2 (Products Awaiting Action/Information Process 801).

C1: After step C1 (the Watermarking Process 808),
- if the metadata needed for step C2 (the Preprocessing and Compression Process 809) is present, then create an entry for each (product/quality level) tuple and place them onto queue C2,
- else flag the product as needs the metadata for Preprocessing/Compression and place this product onto queue A2 (Products Awaiting Action/Information Process 801).

C2: After step C2 (the Preprocessing and Compression Process 809),
- if the Content Provider(s)' 101 configuration specifies Content Quality Control Process 810, then place this (product/quality level) tuple onto queue C3 (the Content Quality Control Process 810),
- else place this (product/quality level) tuple onto queue C4 (the Encryption Process 811).

C3: After step C3 (the Content Quality Control Process 810), then place this (product/quality level) tuple onto queue C4 (the Encryption Process 811).

C4: After step C4 (the Encryption Process 811),
- provide the needed information (i.e., the Symmetric Key 623 generated by the Process and used to encipher the Content 113) to the Metadata Assimilation and Entry Tool 161.
- if all the metadata that's required for the Content SC(s) 630 is present, then place this (product/quality level) tuple onto queue C5 (the Content SC(s) Creation Process 812),
- else flag the product as needs the metadata for Content SC(s) 630 Packing and place this (product/quality level) tuple onto A2 (Products Awaiting Action/Information Process 801).

C5: After step C5 (the Content SC(s) Creation Process 812), flag the quality level the Content 113 at this quality level has been packed.
- if all the (product/quality level) tuples have been packed, then
  - if the product is flagged Metadata has been packed, then
    - if the Content Provider(s)' 101 configuration specifies Quality Assure the SC(s), then place this product onto queue A3 (the Final Quality Assurance Process 813)
    - else place this product onto queue A4 (the Content Dispersement Process 814)
  - else flag the product as needs the Metadata SC(s) 620 and place this product onto queue A2 (Products Awaiting Action/Information Process 801).
- else (all the (product/quality level) tuples have not been packed) do nothing (another (product/quality level) tuple triggers an action).

C. Metadata Assimilation and Entry Tool

Metadata consists of the data describing the Content 113 for example in music, title of the recording, artist, author/composer, producer and length of recording. The following description is based upon Content 113 being music but it should be understood by those skilled in the art that other content types e.g., video, programs, multimedia, movies, and equivalent, are within the true scope and meaning of the present invention.

This Subsystem brings together the data the Content Provider(s) 101 provides to the Electronic Digital Content Store(s) 103 to help promote the sale of the product (e.g., for music, sample clips by this artist, history of this artist, list of albums on which this recording appears, genres associated with this artist and/or product), the data the Content Provider(s) 101 provides to the End-User(s) with the purchased product (e.g., artist, producer, album cover, track length), and the different purchase options (the Usage Conditions 5 17) the Content Provider(s) 101 wants to offer the End-User (s). The data is packaged into a Metadata SC(s) 620 and made available to the Electronic Digital Content Store(s) 103. To accomplish this, the following tools are provided:

Automatic Metadata Acquisition Tool
  Manual Metadata Entry Tool
  Usage Conditions Tool
  Supervised Release Tool These tools enable Content Provider(s) 101 to implement the processes described above for Work Flow Manager 154. Tools described here are a toolkit based on Java in the preferred embodiment but other programming languages such as C/C++, Assembler and equivalent can be used.

1. Automatic Metadata Acquisition Tool

The Automatic Metadata Acquisition Tool provides a user the ability to implement the Automatic Metadata Acquisition Process 803 described above. The Automatic Metadata Acquisition Tool is used to access the Database 160 of the Content Provider(s) 101 and to retrieve as much data as possible without operator assistance. Configuration methods are available to automate this process. The Content Provider(s) 101 can tailor the default metadata template to identify the types of data this Content Provider(s) 101 wants to provide to End-User(s) (e.g., composer, producer, sidemen, track length) and the types of promotional data the Content Provider(s) 101 provides to the Electronic Digital Content Store(s) 103 (e.g., for a music example, sample clips by this artist, a history of this artist,.the list of albums on which this recording appears, genres associated with this artist). The default metadata template includes data fields which are required by the End-User Device(s) 109, data fields which can be optionally provided to the End-User Device(s) 109 and a sample set of data fields, targeted to the Electronic Digital Content Store(s) 103, that promote the artist, album, and/or single.

To extract the template data fields from the Database 160 of the Content Provider(s) 101 the Automatic Metadata Acquisition Tool uses a table that maps the type of data (e.g., composer, producer, a biography of the artist) to the location within the database where the data can be found. Each of the Content Provider(s) 101 help specify that mapping table for their environment.

The Automatic Metadata Acquisition Tool uses a metadata template of the Content Provider(s) 101 and mapping table to acquire whatever data is available from the Databases 160 of the Content Provider(s) 101. The status of each product is updated with the result of the Automatic Metadata Acquisition Process 803. A product which is missing any required data is queued for Manual Metadata Entry Process 804, otherwise it is available for packing into a Metadata SC(s) 620.

2. Manual Metadata Entry Tool

The Manual Metadata Entry Tool provides a user the ability to implement the Manual Metadata Entry Process 804 described above. The Manual Metadata Entry Tool allows any properly authorized operator to provide the missing data. If the operator determines that the missing data is unavailable, the operator can attach a comment to the product and request supervised release. The Content Provider(s) 101 may require, for quality assurance reasons, that the product undergo supervised release. Once all the required data is present, and if supervised release has not been requested, then the product is available for packing into a Metadata SC(s) 620.

3. Usage Conditions Tool

The Usage Conditions Tool provides a user the ability to implement the Usage Conditions Process 805 described above. The process of offering Content 113 for sale or rent (limited use), using electronic delivery, involves a series of business decisions. The Content Provider(s) 101 decides at which compression level(s) the Content 113 is made available. Then for each compressed encoded version of the Content 113, one or more usage conditions are specified. Each usage condition defines the rights of the End-User(s), and any restrictions on the End-User(s), with regard to the use of the Content 113.

As part of Content Processing Tools 155, a set of usage conditions (End-User(s) rights and restrictions) is attached to the product.

A usage condition defines:

1. the compression encoded version of the Content 113 to which this usage condition applies.
2. the type of user covered by this usage condition (e.g., business, private consumer)
3. whether this usage condition allows for the purchase or the rental of the Content 113.
  For a rental transaction:
   the measurement unit which is used to limit the term of the rental (e.g., days, plays).
   the number of the above units after which the Content 113 will no longer play.
  For a purchase transaction:
   the number of playable copies the End-User(s) is allowed to make.
   onto what kinds of media can he/she make those copies (e.g., CD-Recordable (CD-R), MiniDisc, Personal Computer).
4. the period of time during which the purchase/rental transaction is allowed to occur (i.e., an End-User(s) can purchase/rent under the terms of this usage condition only after the beginning availability date and before the last date of availability).
5. the countries from which an End-User(s) can transact this purchase (or rental).
6. the price of the purchase/rental transaction under this usage condition
7. the watermarking parameters.
8. the types of events which require notification of the Clearinghouse(s) 105.

An Example of a Set of Usage Conditions

The Content Provider(s) 101 may decide to test the North American market's acceptance to the re-release of the children's song by a popular children's vocalist during the fourth quarter 1997. The test will make the song available in two different compression encoding versions: 384 Kbps and 56 Kbps. The 384 Kbps version can be bought (and one copy made onto MiniDisc) or rented (for two weeks), while the 56 Kbps version can only be bought (and no copies made). The watermarking instructions is the same for any purchase/rental, and the Content Provider(s) 101 wants the Clearinghouse(s) 105 to count every copy made. This would create Usage Conditions as follows:

|  | Usage Condition 1 | Usage Condition 2 | Usage Condition 3 |
| --- | --- | --- | --- |
| compressed encoded version | 384 Kbps | 384 Kbs | 56 Kbps |
| type of user | private consumer | private consumer | private consumer |
| type of transaction | purchase | rental | purchase |
| availability dates | 1 Oct 1997–31 Dec 1997 | 1 Oct 1997–31 Dec 1997 | 1 Oct 1997–31 Dec 1997 |
| countries | USA and Canada | USA and Canada | USA and Canada |
| watermarking | std. | std. | std. |
| notifying events | copy action | none | none |
| number of copies | 1 | 0 | 0 |
| onto what media | MiniDisc | not applicable | not applicable |
| term of rental | not applicable | 14 days | not applicable |
| price | Price 1 | Price 2 | Price 3 |

4. Parts of the Metadata SC(s) 620

Below are some of the kinds of data that the Metadata Assimilation and Entry Tool 161 gathers for inclusion into the Metadata SC(s) 620. An attempt has been made to group the data into SC(s) parts by function and destination.

| | |
| --- | --- |
| product ID | [src:content provider;] [dest:everybody;] |
| licensor label company | [dest:EMS; end-user;] |
| licensee label company | [dest:EMS; end-user;] |
| source (publisher) of this object (sublicensee label company) | [dest:everybody;] |
| type of object (i.e., a single object or an array of objects) | |
| object ID | [dest:everybody;] |
| International Standard Recording Code (ISRC) | |
| International Standard Music Number (ISMN) | | usage conditions (src: content provider; dest: EMS, end-user, Clearinghouse(s) 105)
purchased usage conditions (src: EMS; dest: end-user, Clearinghouse(s) 105)
    the set of usage conditions (consumer restrictions and rights) for the use of the object (sound recording)
        an individual entry in the array of usage conditions
            the compression encoded version of the Content 113 to which this usage condition applies
            whether this usage condition allows for the purchase or the rental of the Content 113
            for a rental transaction:
                the measurement unit which is used to limit the term of the rental (e.g., days, plays).
                the number of the above units after which the Content 113 will no longer play.
            for a purchase transaction:
                the number of playable copies the End-User(s) is allowed to make onto what kinds of media can (s)he make those copies (e.g., CD-Recordable (CD-R), MiniDisc, personal computer).
            the period of time during which the purchase/rental transaction is allowed to occur (i.e., an End-User(s) can purchase/rent under the terms of this usage condition only after the beginning availability date and before the last date of availability)
            a pointer to the countries from which an End-User(s) can transact this purchase (or rental)
            the price of the purchase/rental transaction under this usage condition
            a pointer to the encrypted watermarking instructions and parameters
            a pointer to the types of events which require notification of the Clearinghouse(s) 105
purchase data (encrypted; optional info; src: EMS; dest: end-user, Clearinghouse(s) 105)

purchase date
    purchase price
    bill to name and address
    consumer name and address
    country of the consumer (best guess)
metadata 1 (src: content provider; dest: EMS, end-user)
    an array of {
        copyright information
            for the composition
            for the sound recording
        title of song
        principal artist(s)
    }
    a pointer to {
        the artwork (e.g., album cover);
        the format of the artwork (e.g., GIF, JPEG);
    }
    optional info:
    an array of additional information {
        composer
        publisher
        producer
        sidemen
        date of recording -continued

```
        date of release
        lyrics
        track name (description) / track length
        list of albums on which this recording appears
        genre(s)
    }
metadata 2 (src: content provider; dest: EMS)
    an array of structures, each representing different quality levels of the same sound
    recording {
        the sound recording;
        the quality level of the sound recording;
        the size (in bytes) of the (probably compressed) sound recording;
    }
metadata 3 (src: content provider; dest: EMS, end-user)
    optional info:
    promotional material:
        a pointer to artist promotion material {
            a URL to the artist's web site;
            background description(s) of the artist(s);
            artist-related interviews (along with format of the interview (e.g., text, audio,
                video));
            reviews (along with format of the reviews (e.g., text, audio, video));
            sample clips (and its format and compression level);
            recent and upcoming concerts/appearances/events - their dates and locations;
        }
        a pointer to album promotion material {
            sample clip (and its format and compression level);
            background description(s) of the producer, and/or the composer, and/or the
                movie/play/cast, and/or the making of the album, etc.;
            non-artist-related interviews (along with format of the interview (e.g., text, audio,
                video));
            reviews (along with format of the reviews (e.g., text, audio, video));
            genre(s);
        }
    single promotions:
        sample clip (and its format and compression level)
        background description(s) of the producer, and/or the composer, and/or the
            movie/play/cast, and/or the making of the single, etc.
        reviews (along with format of the reviews (e.g., text, audio, video))
```

5. Supervised Release Tool Supervised Release Tool provides a user the ability to implement the Supervised Release Process 806 described above. An individual designated by the Content Provider(s) 101 as having supervised release authority, may call up a product awaiting supervised release (i.e., a product on the queue of the Supervised Release Process 806), examine its Contents 113 and its accompanying comments, and either approve its Contents 113 and release the product for packing into a Metadata SC(s) 620, or make any necessary corrections and release the product for packing into a Metadata SC(s) 620 or add a comment specifying the corrective action to take and resubmit the product to the Manual Metadata Entry Process 704

In another embodiment, after the creation of the SC(s), there is another optional quality assurance step where the Content 113 of the SC(s) can be opened and examined for completeness and accuracy, and, at that time, final approval can be given or denied for the product's release to the retail channel.

D. Content Processing Tools

The Content Processing Tools 155 is actually a collection of software tools which are used to process the digital content file to create watermarked, encoded, and encrypted copies of the content. The tools makes use of industry standard digital content processing tools to allow pluggable replacement of watermarking, encoding and encryption technologies as they evolve. If the selected industry tool can be loaded via a command line system call interface and passed parameters or provides a toolkit wherein functions can be called via a DLL interface, the content processing can be automated to some degree. A front end application to each tool queries the appropriate queue in the Content Processing Tools 155 for the next available job, retrieves the required files and parameters and then loads the industry standard content processing tool to perform the required function. Upon completion of the task, manual update to the queue may be required if the tool does not report terminating status.

A generic version of the Content Processing Tools 155 is described, but customization is possible. The Content Processing Tools 155 can be written in Java, C/C++ or any equivalent software. The Content Processing Tools 155 can be delivered by any computer readable means including diskettes, CDS or via a Web site.

1. Watermarking Tool

The Watermarking Tool provides a user the ability to implement the Watermarking Process 808 as described above. This tool applies copyright information of the Content 113 owner to the song file using audio Watermarking technology. The actual information to be written out is determined by the Content Provider(s) 101 and the specific watermarking technology selected. This information is available to the front end Watermarking Tool so that it can properly pass this information to the watermarking function. This imposes a synchronization requirement on the Metadata Assimilation and Entry Tool 161 to assure that it has acquired this information prior to, for example, allowing the song's audio file to be processed. This song will not be available for audio processing until the watermarking information has been obtained.

The watermark is applied as the first step in audio processing since it is common to all encodings of the song created. As long as the watermark can survive the encoding technology, the watermarking process need only occur once per song.

Various watermarking technologies are known and commercially available. The front end Watermarking Tool though is capable of supporting a variety of industry Watermarking Tools.

2. Preprocessing and Compression Tool

The Preprocessing and Compression Tool provides a user the ability to implement the Preprocessing and Compression Process 809 as described above. Audio encoding involves two processes. Encoding is basically the application of a lossy compression algorithm against, for a music content example, a PCM audio stream. The encoder can usually be tuned to generate various playback bit stream rates based on the level of audio quality required. Higher quality results in larger file sizes and since the file sizes can become quite large for high quality Content 113, download times for high quality Content 113 can become lengthy and sometimes prohibitive on standard 28,800 bps modems.

The Content Provider(s) 101 may, therefore, choose to offer a variety of digital content qualities for download to appease both the impatient and low bandwidth customers who don't want to wait hours for a download and the audiophile or high bandwidth customers who either only buys high quality Content 113 or has a higher speed connection.

Compression algorithms vary in their techniques to generate lower bit rate reproductions of Content 113. The techniques vary both by algorithm (i.e. MPEG, AC3, ATRAC) and by levels of compression. To achieve higher levels of compression, typically the data is re-sampled at lower sampling rates prior to being delivered to the compression algorithm. To allow for more efficient compression with less loss of fidelity or to prevent drastic dropout of some frequency ranges, the digital content may sometimes require adjustments to equalization levels of certain frequencies or adjustments to the dynamics of the recording. The content preprocessing requirements are directly related to the compression algorithm and the level of compression required. In some cases, the style of Content 113 (e.g. musical genre) can be successfully used as a base for determining preprocessing requirements since songs from the same genre typically have similar dynamics. With some compression tools, these preprocessing functions are part of the encoding process. With others, the desired preprocessing is performed prior to the compression.

Besides the downloadable audio file for sale, each song also has a Low Bit Rate (LBR) encoded clip to allow the song to be sampled via a LBR streaming protocol. This LBR encoding is also the responsibility of the Content Processing Tools 155. This clip is either provided by the Content Provider(s) 101 as a separate PCM file or as parameters of offset and length.

As with watermarking, it is hoped that the encoding tools can be loaded via a DLL or command line system call interface and passed all the required parameters for preprocessing and compression. The front end Encoding Tool may have a synchronization requirement with the Metadata Assimilation and Entry Tool 161, for example if the content is music, and if it is determined that the song's genre is acquired from the Database 160 of the Content Provider(s) prior to performing any audio preprocessing. This depends on the encoding tools selected and how indeterminate the genre for the song is. If the Content Provider(s) 101 varies the choice of encoded quality levels per song, this information is also be provided prior to the encoding step and agrees with the metadata being generated by the Metadata Assimilation and Entry Tool 161.

A variety of high quality encoding algorithms and tools are known today. The front end Encoding Tool though is capable of supporting a variety of industry encoding tools.

Figure 12:
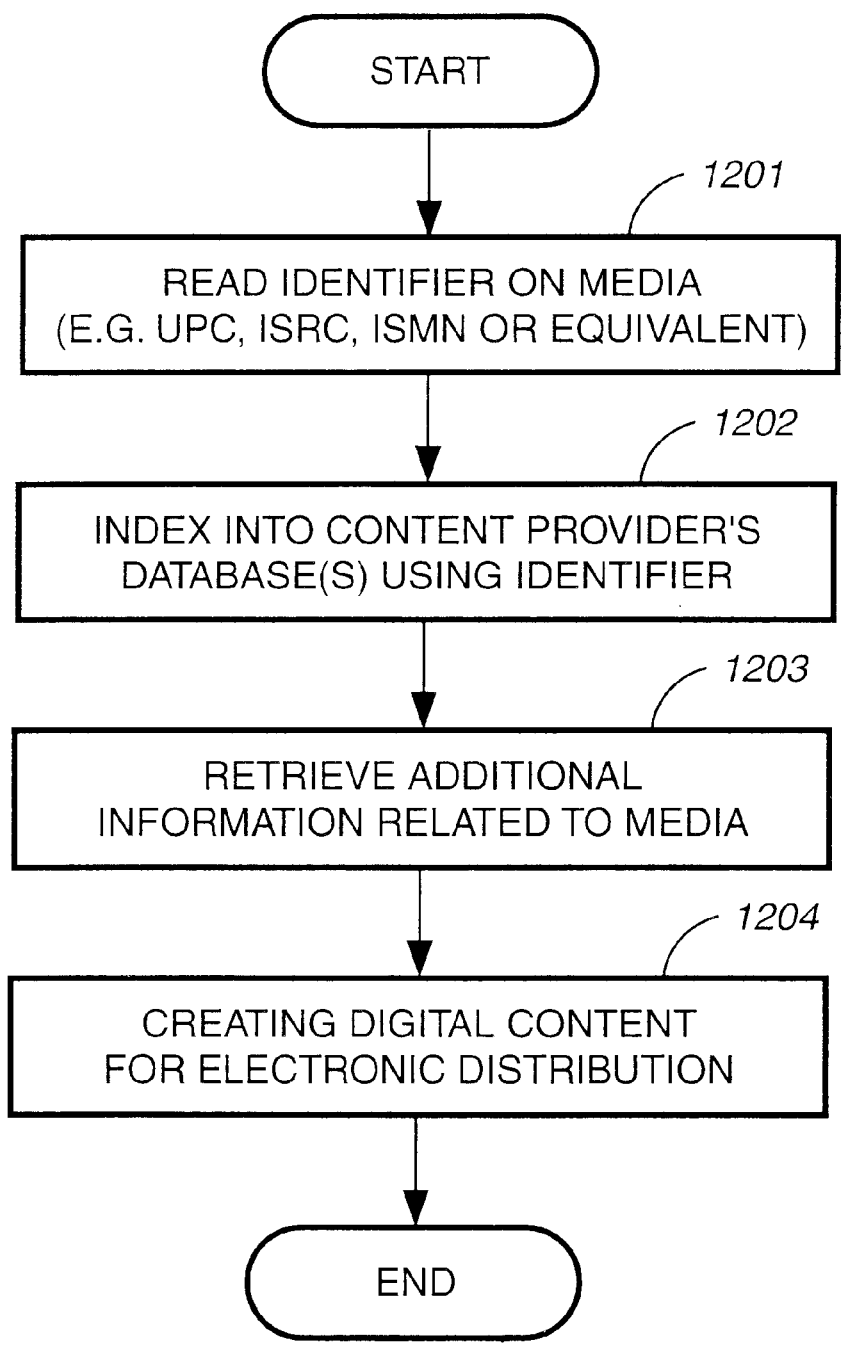
FIG. 12 is a flow diagram of a method to automatically retrieve additional information for the Automatic Metadata Acquisition Tool of FIG. 8 according to the present invention.

Turning now to FIG. 12 is shown a flow diagram of one embodiment for the Automatic Metadata Acquisition Tool of FIG. 8 according to the present invention. The process starts with reading an identifier from the media the Content Provider(s) 101 is examining. One example of content in an audio CD embodiment. In an audio CD embodiment, the following codes may be available Universal Price Code (UPC), International Standard Recording Code (ISRC), International Standard Music Number (ISMN). This identifier is read in the appropriate player for the content, for example an audio CD Player for audio CD, DVD player for DVD movie, DAT recorder for DAT recording and equivalent, step 1201. Next this Identifier is used to index a Database 160 for the Content Provider(s) 101, step 1202. Some or all of the information required by the Work Flow Manager Process as described in FIG. 8 is retrieved in Database 160 and any other related sources, step 1203. This information can include the Content 113 and the metadata related to it. In step 1204, the additional information retrieved is used to start the Work Flow Manager 154 for creating electronic Content 113. It should be understood, that several selections of media, such as several audio CDS, can be queued up so as to enable the Automatic Metadata Acquisition Tool to create a series of Content 113 for electronic distribution. For example, all the Content 113 could be created from a series of CDS or even selected tracks from one or more CDS examined by the Content Provider(s) 101.

Figure 13:
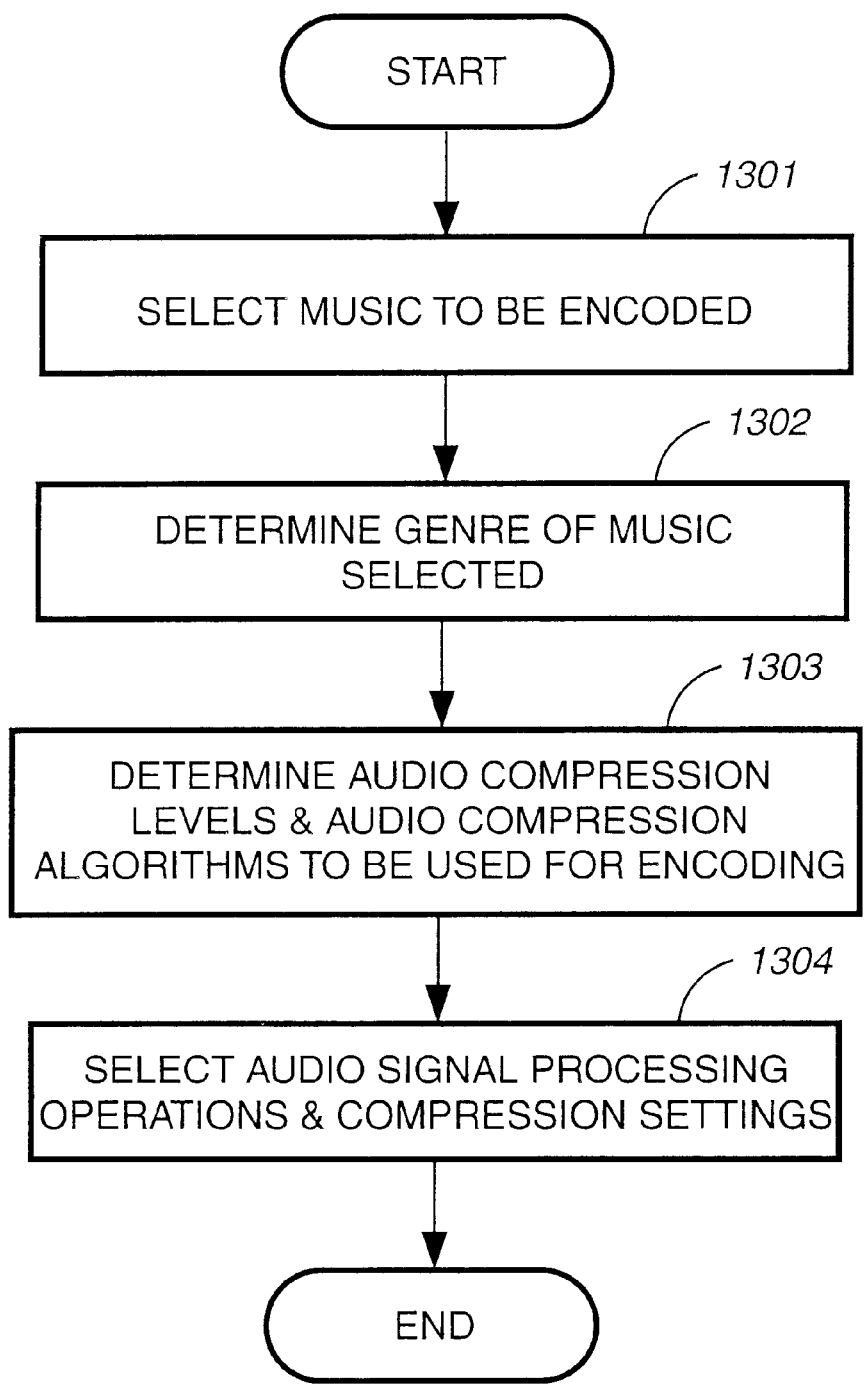
FIG. 13 is a flow diagram of a method to automatically set the Preprocessing and Compression parameters of the Preprocessing and Compression Tool of FIG. 8 according to the present invention.

In an alternate embodiment, the preprocessing parameters can be retrieve from the Database 160 of the Content Provider(s) automatically. Referring now to FIG. 13 is a flow diagram of a method to automatically set the Preprocessing and Compression parameters of the Preprocessing and Compression Tool of FIG. 8 according to the present invention. In this embodiment the Content 113 is music. In step 1301, music (Content 113) is selected to be encoded in Content Processing Tools 155. The genre of the music selected is determined, step 1302. This can be entered manually or by using other meta data available, such as the additional data retrieved from the process described in FIG. 12. The audio compression level and audio compression algorithms selected are than examined, step 1303. Next, a lookup is made by genre, compression settings and compression algorithms of what compression parameters should be used in the Preprocessing and Compression Process 809, 1304.

3. Content Quality Control Tool

The Content Quality Control Tool provides a user the ability to implement the Content Quality Control Process 810 as described above. This is an optional Content Processing Tool and provides an opportunity for a quality control technician to review the encoded and watermarked content files and approve or reject the content files based on quality judgments. He can re-encode the content making manual preprocessing adjustments until the quality is adequate or can flag the song for reprocessing and attach a note describing the problem.

This process step can be configured by the Content Provider(s) 101 as an optional or required step of the content processing work flow. An additional optional Final Quality Assurance Process 813 step is provided after packaging of all the SC(s) for this content (e.g. each SC(s) for songs on a CD) at which time the quality of the content encoding can be tested but catching a problem early prior to encryption and packaging allows for more efficient content processing. It is, therefore, highly desirable that the content quality be assured at this step as opposed to waiting until final completion of all processing.

4. Encryption Tool

The Encryption Tool provides a user the ability to implement the Encryption Process 811 as described above. Content encryption is the final step of the Content Processing Tools 155. Each of the versions of the content that were created by the Encoding Tool is now encrypted. The encryption tool is a function of the SC(s) Packer. The SC(s) Packer is called to encrypt the song and returns the generated encryption key used. This key is later passed into the SC(s) Packer for use in creation of the Metadata SC(s) 620.

E. Content SC(s) Creation Tool

Once all metadata has been gathered the Content SC(s) Creation Tool groups the metadata into categories based on their intended use. These groups of metadata are written into files to be passed in to the SC(s) Packer Tool as Metadata parts for the Metadata SC(s) 620. Each part (file) has unique processing requirements. Once the associated songs have been processed and encrypted and the target destination (URL of Content Hosting Site(s) 111) has been determined, the Content SC(s) 630 for the Content 113 are ready to be created. The Content 113 which have completed processing and have met all the requirements described above, are queued for packing in the packer queue of the Work Flow Manager 154.

The Content SC(s) Creation Tool now retrieves all the required files created by the previous steps of the Metadata Assimilation and Entry Tool 161 and calls the SC(s) Packer functions to create the Metadata SC(s) 620 and Content SC(s) 630. This process creates a single Metadata SC(s) 620 and multiple Content SC(s) 630 for each song. For example, if the content is music, each of the audio files created during audio processing for the various quality levels of the full song is packed into separate Content SC(s) 630. The audio file created for the sample clip is passed as a metadata file to be included in the Metadata SC(s) 620.

F. Final Quality Assurance Tool

The Final Quality Assurance Tool provides a user the ability to implement the Final Quality Assurance Process 813 as described above. Once all the SC(s) have been built for a content file, the content is available for a final quality assurance check. Quality assurance can be performed at various stages of the Content 113 preparation process. The Content Provider(s) 101 can choose to perform quality assurance as each major step is completed to prevent excessive rework later or may choose to wait until all audio preparation processes are complete and perform quality assurance on everything at once. If the latter is chosen, quality assurance is performed at this point upon completion of the creation of the SC(s). This tool allows each SC(s) for the song to be opened, examined, and the audio played.

Any problem discovered, even minor text changes requires that the SC(s) be rebuilt due to internal security features of SC(s). To avoid unnecessary re-processing time, it is highly recommended that the interim quality assurance steps be utilized to assure accuracy of the metadata and that this specific quality assurance step be reserved for validating appropriate cross references between the SC(s) associated with this song. If problems are found, the assurer can enter a problem description to be attached to the song and have it re-queued to the appropriate processing queue for reprocessing. Status is updated appropriately in the Work Flow Manager 154 to indicate the status of all related components of the song. If no problems are discovered, the Content 113 is marked or flagged as ready for release.

G. Content Dispersement Tool

The Content Dispersement Tool provides a user the ability to implement the Content Dispersement Process 814 as described above. Once the Content 113 has been approved for release, the SC(s) for the Content 113 are placed in the queue of the Content Dispersement Process. The Content Dispersement Tool monitors the queue and performs immediate transfer of the SC(s) files or batch transfer of a group of SC(s) files based on the configuration settings provided by the Content Provider(s) 101. The Content Provider(s) 101 can also optionally configure the Content Dispersement Tool to automatically hold all SC(s) in this queue until they are manually flagged for release. This allows the Content Provider(s) 101 to prepare content in advance of their scheduled release date and hold them until they wish to release them e.g., a new song, movie or game. The SC(s) can also control access to Content 113 based on a defined release date so there is no requirement for the Content Provider(s) 101 to actually hold up delivery of the SC(s) but this manual release option can still be used for this purpose or used to manage network bandwidth required to transfer these large files.

When flagged for release, the Content SC(s) 630 for the Content 113 are transferred via FTP to the designated Content Hosting Site(s) 111. The Metadata SC(s) 620 is transferred via FTP to the Content Promotions Web Site 156. Here the SC(s) are staged to a new Content 113 directory until they can be processed and integrated into the Content Promotions Web Site 156.

Figure 17:
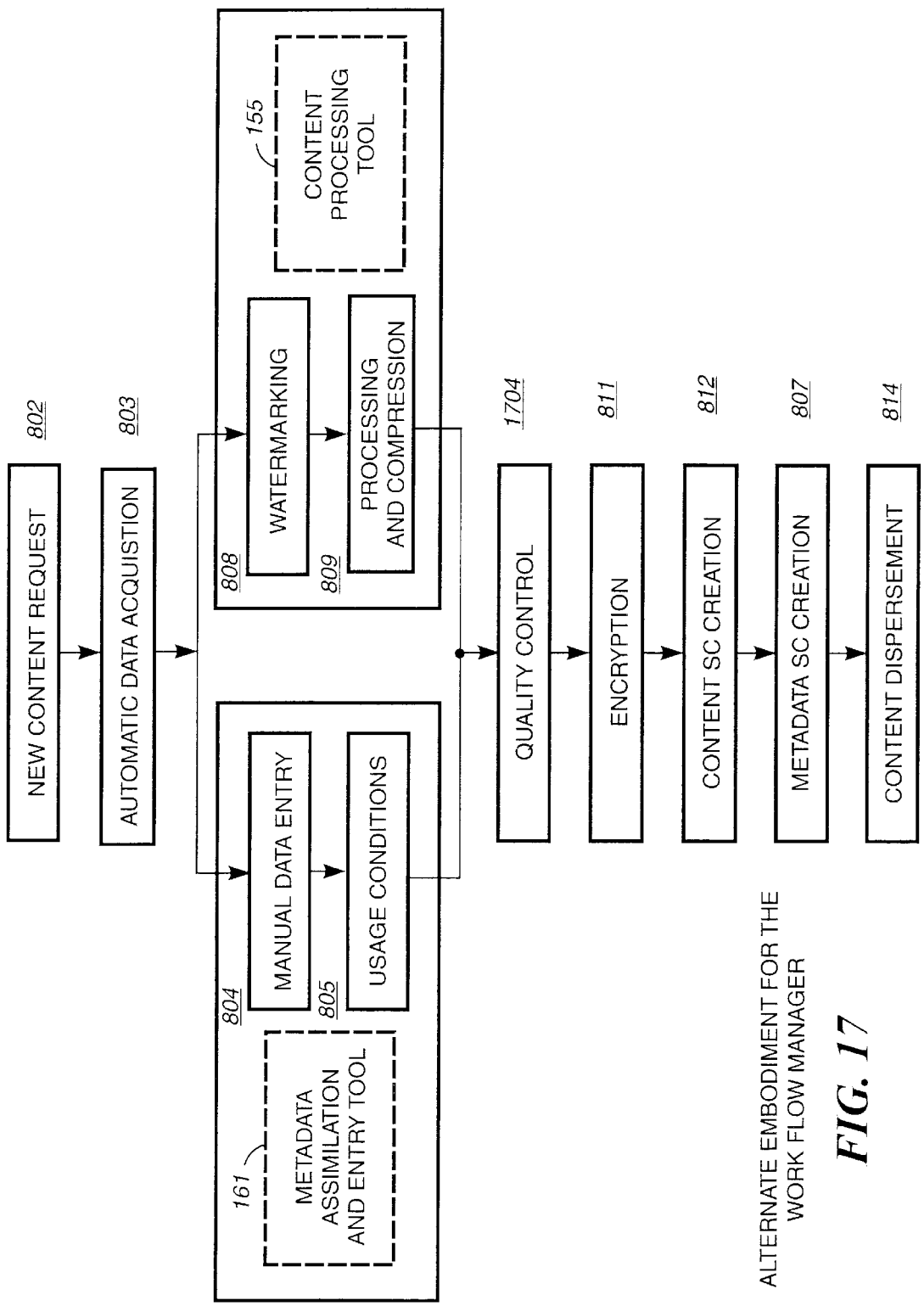
FIG. 17 is a flow diagram of an alternate embodiment to automatically retrieve additional information for the Automatic Metadata Acquisition Tool of FIG. 8 according to the present invention.

FIG. 17 is a flow diagram of an alternate embodiment to automatically retrieve additional information for the Automatic Metadata Acquisition Tool of FIG. 8 according to the present invention. The process is similar for that described in FIG. 8 above. However, the quality checks of Supervised Release 806 and Content Quality Control 809 are combined into one quality check called Quality Control 1704. Performing quality checks prior to Metadata SC Creation 807 and Content SC Creation 812. Performing quality check prior to SC creation, eliminates the steps of unpacking the Content 113 and the associated Metadata SC(s) 620. In addition, in this embodiment, the queue of Products Awaiting Action/Information 801 have been eliminated. The jobs are placed on the specific process queues depending on what action is being requested. For example, if the job requires Manual Metadata, i.e. additional Metadata to be entered, the job is place on the Manual Metadata entry queue. Also the Automatic Metadata Acquisition 803 has been merged with New Content Request to occur up front prior to the Metadata Assimilation and Entry Tool 161 and the Content Processing Tool 155. Finally, it is important to point out that the Usage Conditions 804 are entered both at the Automatic Metadata Acquisition 803 and during the Manual Metadata Entry 803. Since, many of the usage conditions can be automatically filled-in during the Automatic Metadata Acquisition 803 step.

H. Content Promotions Web Site

To most effectively disperse information on what the Content Provider(s) 101 is making available for sale via digital download, and to get the necessary files to the Electronic Digital Content Store(s) 103 to enable it to make this Content 113 available for download to its customers, each Content Provider(s) 101 should have a secure web site housing this information. This is similar to the method used today by some Content Provider(s) 101 to make promotional content available to their retailers and others with a need for this information. In the case where this type of service already exists, an additional section can be added to the web site where Electronic Digital Content Store(s) 103 can go to see a list of the content available for sale via download.

The Content Provider(s) 101 has complete control over the design and layout of this site or can choose to use a turnkey web server solution provided as part of the toolkit for Secure Digital Content Electronic Distribution System 100. To implement their own design for this service, the Content Provider(s) 101 need only provide links to the Metadata SC(s) 620 for Electronic Digital Content Store(s) 103 who access their site. This is accomplished using the toolkit for the Secure Digital Content Electronic Distribution System 100. The selection process and what information is shown is the discretion of the Content Provider(s) 101.

Metadata SC(s) 620 received into a new content directory via FTP from the Content Dispersement Tool is processed by the Content Promotions Web Site 156. These containers can be opened with the SC(s) Preview Tool to display or extract information from the container. This information can then be used to update HTML Web pages and/or add information to a searchable database maintained by this service. The SC(s) Preview Tool is actually a subset of the Content Acquisition Tool used by the Electronic Digital Content Store(s) 103 to open and process Metadata SC(s) 620. See the Content Acquisition Tool section for more details. The Metadata SC(s) 620 file should then be moved to a permanent directory maintained by the Content Promotions Web Site 156.

Once the Metadata SC(s) 620 has been integrated into the Content Promotions Web Site 156, its availability is publicized. The Content Provider(s) 101 can send a notification to all subscribing Electronic Digital Content Store(s) 103 as each new Metadata SC(s) 620 is added to the site or can perform a single notification daily (or any defined periodicity) of all Metadata SC(s) 620 added that day (or period). This notification is performed via a standard HTTP exchange with the Electronic Digital Content Store(s) 103 Web Server by sending a defined CGI string containing parameters referencing the Metadata SC(s) 620 added. This message is handled by the Notification Interface Module of the Electronic Digital Content Store(s) 103 which is described later.

I. Content Hosting

The Entertainment Industry produces thousands of content titles, such as CDS, movies and games every year, adding to the tens of thousands of content titles that are currently available. The Secure Digital Content Electronic Distribution System 100 is designed to support all of the content titles available in stores today.

The numbers of content titles that the Secure Digital Content Electronic Distribution System 100 may eventually download to customers on a daily basis is in the thousands or tens of thousands. For a large number of titles, this requires a large amount of bandwidth. The computer disk space and bandwidth needs call for a distributed, scalable implementation with multiple Content Hosting Site(s) 111. The system also supports customers all over the world. This requires overseas sites to speed delivery to the global customers.

Content hosting on the Secure Digital Content Electronic Distribution System 100 is designed to allow the Content Provider(s) 101 to either host their own Content 113 or share a common facility or a set of facilities.

Content hosting on the Secure Digital Content Electronic Distribution System 100 consists of multiple Content Hosting Site(s) 111 that collectively contain all of the Content 113 offered by the Secure Digital Content Electronic Distribution System 100 and several Secondary Content Sites (not shown) that contain the current hot hits offered by the Content Provider(s) 101. The number of Content Hosting Site(s) 111 changes depending on the number of End-User(s) using the system. The Secondary Content sites host a limited number of songs, but they will represent a large percentage of the bandwidth used on the system. The secondary sites are brought on line as the volume on the primary sites increases to the point of maximum capacity. The secondary sites can be located close to Network Access Points (NAPs) which helps speed up download times. They may also be placed in different geographic areas around the world to speed up download times.

Should the Content Provider(s) 101 choose to host all of their Content 113 in their own system, they can act as a single Content Hosting Site 111 with or without additional Secondary Content Sites. This allows them to build their own scalable distributed system. In another embodiment, Electronic Digital Content Store(s) 103 can also act as Content Hosting Site(s) 111 for certain Content 113. This embodiment requires a special financial agreement between the Electronic Digital Content Store(s) 103 and the Content Provider(s) 101.

1. Content Hosting Sites

Content 113 is added to the Content Hosting Site(s) 111 via FTP or HTTP by the Content Disbursement Tool described in the Content Provider(s) Section of this specification or via offline means such as content delivery on tape, CD Rom, flash, or other computer readable media. The Metadata SC(s) 620 created by the Content Provider(s) 101 contain a field that indicates the URL locating the Content SC(s) 630 for this Content 113. This URL corresponds to a Content Hosting Site(s) 111. Electronic Digital Content Store(s) 103 can override this URL if allowed by the Content Provider(s) 101 in the Offer SC(s) 641. The End-User Device(s) 109 communicates to this Content Hosting Site(s) 111 when it wants to download the Content SC(s) 630.

The End-User Device(s) 109 initiates the request for a Content SC(s) 630 by sending the License SC(s) 660 to the Content Hosting Site(s) 111. This is the same License SC(s) 660 returned by the Clearinghouse(s) 105. The Digital Signature of the License SC(s) 660 can be verified to determine if it is a valid License SC(s) 660. If it is a valid License SC(s) 660 either the download is initiated, or the download request may be redirected to another Content Hosting Site(s) 111.

2. Content Hosting Site(s) 111 Provided by the Secure Digital Content Electronic Distribution System 100

For the Secure Digital Content. Electronic Distribution System 100 the decision of which site should be used to download the Content 113 is made by the primary content site that received the initial request for a Content SC(s) 630. This site uses the following information to make this decision:

Are there secondary content sites that host the Content 113 requested? (The majority of Content 113 offered by the Secure Digital Content Electronic Distribution System 100 is only located at primary sites);

Where is the End-User Device(s) 109 geographically located? (This information can be obtained from the End-User Device(s) 109 when the request is initiated at the End-User Device(s) 109, this is passed up to the Clearinghouse(s) 105 in the Order SC(s) 650;

Is the appropriate secondary site up and operational? (Sometimes the secondary sites may be off-line);

What is the load of the secondary sites? (In some cases where a secondary site is swamped with activity another site that is less busy may be selected.

Before transmitting the Content SC(s) 630 to the End-User Device(s) 109, analysis and verifications are performed on the End-User's request. A database is kept of all of the License SC IDs that have been used to download Content 113. This database can be checked to ensure that the End-User Device(s) 109 only makes one request for each piece of Content 113 purchased. This prevents malicious users from repeatedly accessing the Content Hosting Site(s) 111 in hopes of slowing down the Content Hosting Site(s) 111 and prevents unauthorized download of the Content SC(s) 630.

The promotion and demotion of Content 113 to the Secondary Content sites is done periodically based on customer demand for the individual pieces of Content 113.

Content Hosting Router

The Content Hosting Router (not shown) resides in the Content Hosting Site(s) 111 and receives all requests from End-User(s) wanting to download Content 113. It performs validation checks on the End-User(s) request to ensure they indeed bought the Content 113. A database is maintained on the status of the Secondary Content Sites that includes what Content 113 is on them and their current status. This current status includes the amount of activity on the sites and whether a site is down for maintenance.

The only interface to the Content Hosting Router is the License SC(s) 660 that is sent by the End-User Device(s) 109 when Content 113 is required to be downloaded. The License SC(s) 660 includes information that indicates the user is allowed to download the Content 113.

Secondary Content Sites

The Secondary Content Sites (not shown) host the popular Content 113 of the Secure Digital Content Distribution System 100. These sites are geographically dispersed across the world and are located near Network Access Points (NAPs) to improve download times. These sites are added to the system as demand on the primary Content Hosting Site(s) 111 nears maximum capacity

IX. Electronic Digital Content Store(s)

A. Overview—Support for Multiple Electronic Digital Content Store(s) 103

Electronic Digital Content Store(s) 103 are essentially the retailers. They are the entities who market the Content 113 to be distributed to the customer. For distribution of Content 113, this would include Digital Content Retailing Web Sites, Digital Content Retail Stores, or any business who wishes to get involved in marketing electronic Content 113 to consumers. These businesses can market the sale of electronic Content 113 only or can choose to just add the sale of electronic goods to whatever other merchandise they currently offer for sale. Introduction of downloadable electronic goods into the service offering of the Electronic Digital Content Store(s) 103 is accomplished via a set of tools developed for the Electronic Digital Content Store(s) 103 as part of the Secure Digital Content Electronic Distribution System 100.

These tools are used by the Electronic Digital Content Store(s) 103 to:

acquire the Metadata SC(s) 620 packaged by the Content Provider(s) 101 extract Content 113 from these SC(s) to be used as input to building their service offering create Offer SC(s) 641 describing the downloadable Content 113 they are offering for sale handle the acknowledgment of the sale and initiation of the download by creating and sending Transaction SC(s) 640 to the End-User Device(s) 109 manage a transaction log of sales of downloadable Content 113 and the status of each download handle status notifications and transaction authentication requests perform account reconciliation The tools are designed to allow flexibility in how the Electronic Digital Content Store(s) 103 wishes to integrate sale of downloadable electronic Content 113 into its service. The tools can be used in such a way as to request that all financial settlements for downloadable Content 113 purchased be handled by the Clearinghouse(s) 105 although this is not required. These tools also enable Electronic Digital Content Store(s) 103 to completely service their customers and handle the financial transactions themselves, including providing promotions and special offers. The tools enable the Electronic Digital Content Store(s) 103 to quickly integrate the sale of downloadable Content 113 into its existing services. In addition, the Electronic Digital Content Store(s) 103 is not required to host the downloadable Content 113 and does not have to manage its dispersement. This function is performed by the Content Hosting Site(s) 111 selected by the Content Provider(s) 101.

The tools for the Electronic Digital Content Stores(s) 103 are implemented in Java in the preferred embodiment but other programming languages such as C/C++, Assembler and equivalent can be used. It should be understood that the tools described below for the Electronic Digital Content Stores(s) 103 can run on a variety of hardware and software platforms. The Electronic Digital Content Stores(s) 103 as a complete system or as any of it's constitute components may be distributed as an application program in a computer readable medium including but not limited to electronic distribution such as the web or on floppy diskettes, CD ROMS and removable hard disk drives.

In another embodiment, the components of the Electronic Digital Content Stores(s) 103 is part of a programmer's software toolkit. This toolkit enables predefined interfaces to the components of the generic Electronic Digital Content Stores(s) 103 components and tools discussed below. These predefined interfaces are in the form of APIs or Application Programming Interfaces. A developer using these APIs can implement any of the functionality of the components from a high level application program. By providing APIs to these components, a programmer can quickly develop a customized Electronic Digital Content Stores(s) 103 without the need to re-created these functions and resources of any of these components.

Electronic Digital Content Store(s) 103 are not limited to Web based service offerings. The tools provided are used by all Electronic Digital Content Store(s) 103 wishing to sell downloadable electronic Content 113 regardless of the transmission infrastructure or delivery mode used to deliver this Content 113 to End-User(s). Broadcast services offered over satellite and cable infrastructures also use these same tools to acquire, package, and track electronic Content 113 sales. The presentation of electronic merchandise for sale and the method in which these offers are delivered to the End-User (s) is the main variant between the broadcast based service offering and the point-to-point interactive web service type offering.

B. Point-to-Point Electronic Digital Content Distribution Service

Figure 9:
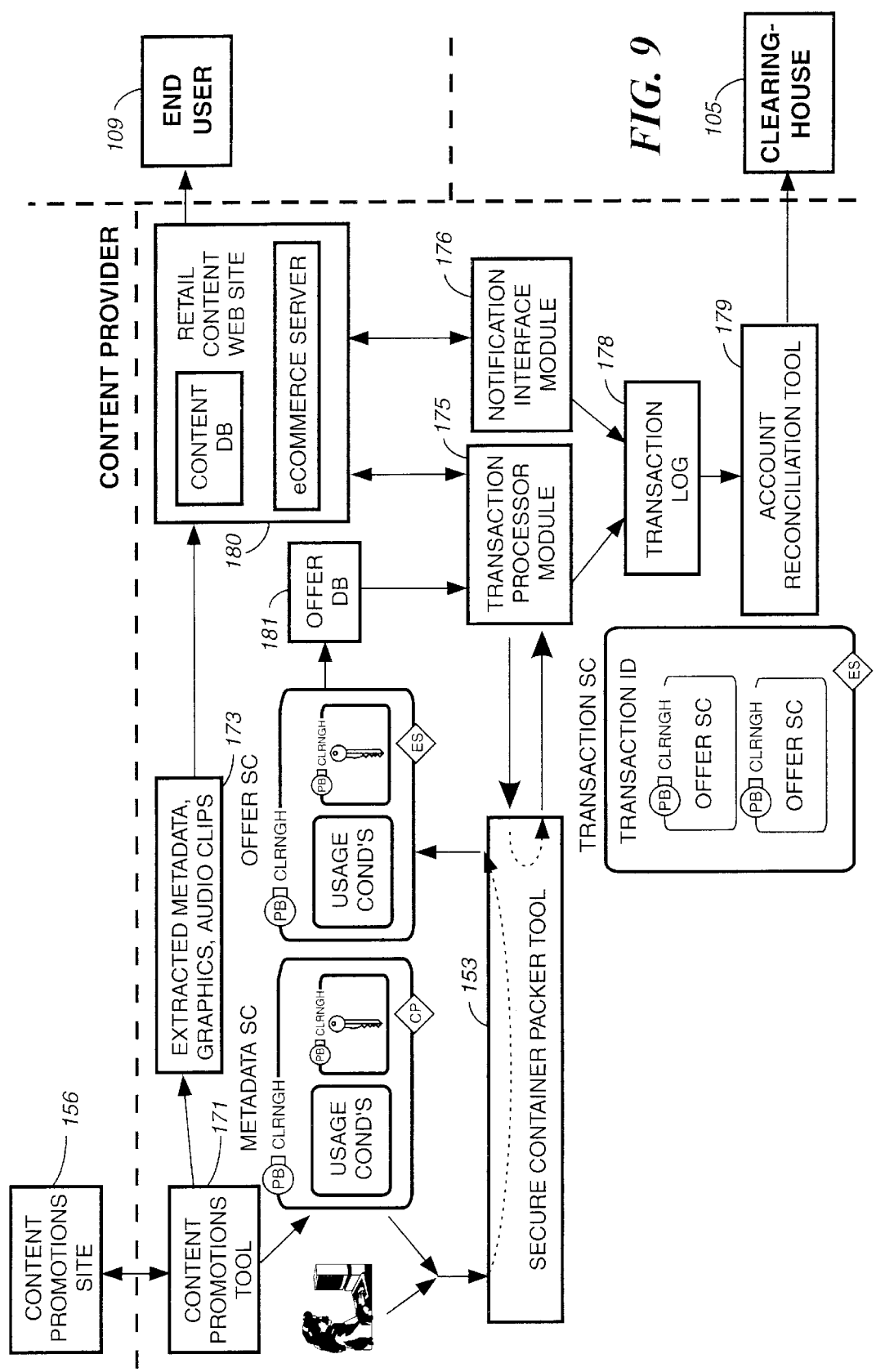
FIG. 9 is a block diagram illustrating the major tools, components and processes of an Electronic Digital Content Store of FIG. 1 according to the present invention.

Point-to-Point primarily means a one-to-one interactive service between the Electronic Digital Content Store(s) 103 and the End-User Device(s) 109. This typically represents an Internet web based service provided via telephone or cable modem connection. Networks other than the Internet are supported in this model as well, as long as they conform to the Web Server/Client Browser model. FIG. 9 is a block diagram illustrating the major tools, components and processes of an Electronic Digital Content Store(s) 103.

1. Integration Requirements

The Secure Digital Content Electronic Distribution System 100 not only creates new online businesses but provides a method for existing businesses to integrate the sale of downloadable electronic Content 113 to their current inventory. The suite of tools provided to the Electronic Digital Content Store(s) 103 simplify this integration effort. The Content Acquisition Tool 171 and SC(s) Packer Tool 153 provides a method for the Electronic Digital Content Store(s) 103 to acquire information from the participating Content Provider(s) 101 on what they have available for sale and to create the files required to reference these downloadable objects as items in their own inventory. This process is batch driven and can be largely automated and is executed only to integrate new Content 113 into the site.

The tools for the Secure Digital Content Electronic Distribution have been designed to allow integration of sale of electronic downloadable Content 113 into typical implementations of web based Electronic Digital Content Store(s) 103 (i.e. Columbia House online, Music Boulevard, @Tower) and equivalent with minimal change to their current Content 113 retailing paradigm. Several methods of integration are possible and in the preferred embodiment, the Electronic Digital Content Store(s) 103 provides support for all product searches, previews, selections (shopping cart), and purchases. Each Electronic Digital Content Store(s) 103 establishes customer loyalty with its customers and continues to offer its own incentives and market its products as it does today. In the Secure Digital Content Electronic Distribution System 100, it would simply need to indicate which products in its inventory are also available for electronic download and allow its customers to select the electronic download option when making a purchase selection. In another embodiment, the customer's shopping cart could contain a mixture of electronic (Content 113) and physical media selections. After the customer checks out, and the Electronic Digital Content Store(s) 103 has completed the financial settlement and logged or notified its shipping and handling functions to process the physical merchandise purchased, the commerce handling function of the Electronic Digital Content Store(s) 103 then calls the Transaction Processor Module 175 to handle all electronic downloads. It simply passes the required information and all processing from that point on is handled by the toolset for the Secure Digital Content Electronic Distribution System 100. In another embodiment, other methods of transaction handling are also possible using tools for the Secure Digital Content Electronic Distribution System 100 to handle the financial settlement should the Electronic Digital Content Store(s) 103 wish to sell downloadable merchandise only or to segregate the financial settlement of physical and downloadable merchandise.

To handle the downloading of merchandise, the Electronic Digital Content Store(s) 103 is given a Product ID (not shown) for each downloadable product that it acquires from the Content Promotions Web Site 156 for the Content Provider(s) 101. This Product ID is associated to a customer's purchase selection to the downloadable product. The Product ID is what the Electronic Digital Content Store(s) 103 passes to the Transaction Processor Module 175 to identify the product that the user has purchased. The SC(s) (Offer SC(s) 641) that were created to describe the products, are isolated from the Electronic Digital Content Store(s) 103 and kept in an Offer Database 181 in an effort to simplify management of these objects and make their existence transparent to the Electronic Digital Content Store(s) 103.

The Transaction Processor Module 175 and other additional functions are provided as web server side executables (i.e. CGI and NSAPI, ISAPI callable functions) or simply APIs into a DLL or C object library. These functions handle run time processing for End-User(s) interactions and optional interactions with the Clearinghouse(s) 105. These functions interact with the web server's commerce services to create and download to the End-User Device(s) 109 the files necessary to initiate the Content 113 download process. They also handle optional interactions to provide authorizations and accept notifications of completion of activities.

An Accounting Reconciliation Tool 179 is also provided to assist the Electronic Digital Content Store(s) 103 in contacting the Clearinghouse(s) 105 to reconcile accounts based on its own and the transaction logs of the Clearinghouse(s) 105.

2. Content Acquisition Tool 171

The Content Acquisition Tool 171 is responsible for interfacing with the Content Promotions Web Site 156 to preview and download Metadata SC(s) 620. Since the Content Promotions site is a standard web site, a web browser is used by the Electronic Digital Content Store(s) 103 to navigate this site. The navigation features varies based on the site design of the Content Provider(s) 101. Some sites may provide extensive search capabilities with many screens of promotional information. Others may have a simple browser interface with lists of titles, performers or new releases to select from. All sites include the selection of Metadata SC(s) 620 containing all the promotional and descriptive information of a song or album.

Alternatively, the Electronic Store(s) 103 may subscribe to content updates and receive updates automatically via FTP.

Viewing Metadata

The Content Acquisition Tool 171 is a web browser helper application which launches whenever a Metadata SC(s) 620 link is selected at the Content Promotions Web Site 156. Selection of the SC(s) causes it to be downloaded to the Electronic Digital Content Store(s) 103, and launch the helper application. The Content Acquisition Tool 171 opens the Metadata SC(s) 620 and display the non-encrypted information contained therein. Displayed information includes Extracted Metadata 173, for a music example, the graphic image(s) associated with the song and the information describing the song, a preview clip of the song can also be listened to if included in the Metadata SC(s) 620. In an example where the Content 113 is music, promotional information about the song or album, the album title, and the artist is also shown if provided by the Content Provider(s) 101. This information is displayed as a series of linked HTML pages in the browser window. Purchasable Content 113 such as the song and the lyrics and whatever other metadata the Content Provider(s) 101 wishes to protect, is not accessible to the Retail Content Web Site 180.

In another embodiment, the Content Provider(s) 101 provides optional promotional content for a fee. In this embodiment such promotional content is encrypted in the Metadata SC(s) 620. Financial settlement to open this data can be handled via the Clearinghouse(s) 105 with the account for the Electronic Digital Content Store(s) 103 being charged the designated fee.

Extracting Metadata

Besides the preview capabilities, this tool provides two additional features: metadata extraction and preparation of an Offer SC(s) 641. Selection of the metadata extraction option prompts the Electronic Digital Content Store(s) 103 to enter the path and filenames to where the metadata is to be stored. Binary metadata such as graphics and the audio preview clip is stored as separate files. Text metadata is stored in an ASCII delimited text file which the Retail Content Web Site 180 can then import into its database. A table describing the layout of the ASCII delimited file is also be created in a separate TOC file. Additional options is available to allow extraction into other National Language Support (NLS) supported formats.

One important piece of information provided in the extracted data is the Product ID. This Product ID is what the commerce handling function for the Electronic Digital Content Store(s) 103 needs to identify to the Transaction Processor Module 175 (for more information refer to Transaction Processing section), the Content 113 that the user has purchased. The Transaction Processor Module 175 uses this Product ID to properly retrieve the appropriate Offer SC(s) 641 from the Offer Database 181 for subsequent download to the End-User Device(s) 109. The Electronic Digital Content Store(s) 103 has full control over how it presents the offer of downloadable Content 113 on its site. It only needs to retain a cross reference of the Content 113 being offered to this Product ID to properly interface with the tools for the Secure Digital Content Electronic Distribution System 100. Providing this information here, allows the Electronic Digital Content Store(s) 103 to integrate this product or Content 113 into its inventory and sales pages (database) in parallel with the Offer SC(s) 641 creation process since both processes uses the same Product ID to reference the product. This is described further below.

Offer SC(s) Creation Packer 153

The Electronic Digital Content Store(s) 103 is required to create an Offer SC(s) 641 describing the downloadable Content 113 that is for sale. Most of the information that goes into the Offer SC(s) 641 is derived from the Metadata SC(s) 620. The Content Acquisition Tool 171 creates the Offer SC(s) 641 by:

removing parts from the Metadata SC(s) 620 that are not required to be included in the Offer SC(s) 641 as defined by the Offer SC(s) Template in the Metadata SC(s) 620 adding additional required parts as defined by defaults specified by the configuration options in this tool for the Electronic Digital Content Store(s) 103 prompting for additional required inputs or selections as defined by the Offer SC(s) Template in the Metadata SC(s) 620 calling the SC(s) Packer 153 to pack this information into the SC(s) format

Metadata to be displayed by the Player Application 195 (further described later) on the End-User Device(s) 109 is kept in the Metadata SC(s) 620. Other promotional metadata that was only used by the Electronic Digital Content Store(s) 103 as input to his web service database is removed from the Metadata SC(s) 620. Rights management information provided by the Content Provider(s) 101, such as watermarking instructions, encrypted Symmetric Keys 623, and Usage Conditions 517 defining the permitted uses of the object, are also retained.

This stripped down Metadata SC(s) 620 is then included in the Offer SC(s) 641. The Electronic Digital Content Store(s) 103 also attaches its own Usage Conditions called Store Usage Conditions 519 or purchase options to the Offer SC(s) 641. This can be accomplished interactively or automatically through a set of defaults. If configured to be processed interactively, the Electronic Digital Content Store (s) 103 is prompted with the set of permitted object Usage Conditions 517 as defined by the Content Provider(s) 101. He then selects the option(s) he wishes to offer to his customers. These now become the new Usage Conditions or Store Usage Conditions 519. To process automatically, the Electronic Digital Content Store(s) 103 configures a set of default purchase options to be offered for all Content 113. These default options are automatically checked against the permitted Usage Conditions 517 defined by the Content Provider(s) 101 and is set in the Offer SC(s) 641 if there are no discrepancies.

Once the Offer SC(s) 641 is created, it is stored in an Offer Database 181 and is indexed with the Product ID pre-assigned in the Metadata SC(s) 620. This Product ID is used later by the Electronic Digital Content Store(s) 103 to identify the downloadable Content 113 being purchased by a customer when interfacing with the Offer Database 181 to retrieve the Offer SC(s) 641 for packaging and transmittal to the End-User(s). See the Transaction Processor Module 175 section for more details.

In another embodiment, the Electronic Digital Content Store(s) 103 hosts the Content SC(s) 641 at his site. This embodiment requires changes to the Offer SC(s) 641 such as the replacement of the URL of the Content Hosting Site(s) 111 with the URL of the Electronic Digital Content Store(s) 103.

3. Transaction Processing Module 175

Electronic Digital Content Store(s) 103 directs billing to Clearinghouse(s) 105. Alternatively, the Electronic Digital Content Store(s) 103 may request financial clearance direct from the Clearinghouse(s) 105. There are two basic modes for processing End-User(s) purchase requests for downloadable Content 113. If the Electronic Digital Content Store(s) 103 does not wish to handle the financial settlement of the purchase and has no special promotions or incentives governing the sale of the merchandise and does not use a shopping cart metaphor for batching the purchase requests, it may opt to provide links on its Content 113 download pages directly to the Offer SC(s) 641 files. These Offer SC(s) 641 would have to have been built with retail pricing information included in the metadata. Also included in the Offer SC(s) 641 is a special HTML offer page presenting the purchase options with terms and conditions of the sale. This page is built from a template created when the Offer SC(s) 641 was built. When the End-User(s) clicks on the direct link to the Offer SC(s) 641, the Offer SC(s) 641 is downloaded to the browser End-User Device(s) 109 launching a helper application which opens the container and present the offer page included in the Offer SC(s) 641. This page contains a form to collect customer information including credit card information and purchase option selection. The form then gets submitted directly to the Clearinghouse(s) 105 for financial settlement and processing. Optionally, this form may contain the fields needed to use the End-User(s)' credit information or industry standard local transaction handler.

An embodiment where the Electronic Digital Content Store(s) 103 handles billing is now described. The more typical mode of handling purchase requests is to allow the Electronic Digital Content Store(s) 103 to process the financial settlement and then submit the download authorization to the End-User(s). This method allows the Electronic Digital Content Store(s) 103 to integrate sale of downloadable Content 113 with other merchandise offered for sale at his site, allows batch processing of purchase requests with only one consolidated charge to the customer (via a shopping cart metaphor) instead of individual charges for each download request, and allows the Electronic Digital Content Store(s) 103 to directly track his customers buying patterns and offer special promotions and club options. In this environment, the offer of downloadable Content 113 is included in his shopping pages which get added to a shopping cart when selected by the End-User(s) and get processed and financially settled as is done in the Electronic Digital Content Store(s)' 103 current shopping model. Once the financial settlement is completed, the commerce handling process of the Electronic Digital Content Store(s) 100 then calls the Transaction Processor Module 175 to complete the transaction.

Transaction Processor Module 175

The role of the Transaction Processor Module 175 is to put together the information needed by the End-User Device(s) 109 to initiate and process the download of the Content 113 purchased. This information is packaged into a Transaction SC(s) 640 which is sent back to the End-User Device(s) 109 by the, Web Server as the response to the purchase submission. The Transaction Processor Module 175 requires three pieces of information from the commerce handling process of the Electronic Digital Content Store(s) 103: the Product IDs for the Content 113 purchased, Transaction Data 642, and an HTML page or CGI URL acknowledging the purchase settlement.

The Product ID is the value provided to the Electronic Digital Content Store(s) 103 in the Metadata SC(s) 620 associated to the Content 113 just sold. This Product ID is used to retrieve the associated Offer SC(s) 641 from the Offer Database 181.

The Transaction Data 642 is a structure of information provided by the transaction processing function of the Electronic Digital Content Store(s) 103 which is later used to correlate the Clearinghouse(s) 105 processing with the financial settlement transaction performed by the Electronic Digital Content Store(s) 103 and to provide user identity information to be included in the watermark of the Content 113 downloaded to the End-User Device(s) 109. When the Clearinghouse(s) 105 receives a valid Order SC(s) 650, it logs a transaction indicating the Content 113 that was sold, which Electronic Digital Content Store(s) 103 sold it and the associated Transaction Data 642 including the End-User's Name and a Transaction ID 535. The Transaction ID 535 provides a reference to the financial settlement transaction. This information is later returned by the Clearinghouse(s) 105 to the Electronic Digital Content Store(s) 103 for use in reconciling its accounts with the billing statements received from the Content Provider(s) 101 (or his agent). The Clearinghouse Transaction Log 178 can be used by the Content Provider(s) 101 to determine what Content 113 of his has been sold and enables him to create a bill to each Electronic Digital Content Store(s) 103 for royalties owed him. Other electronic means besides billing can alternatively be used to settle accounts between the Content Provider(s) 101 and Electronic Digital Content Store(s) 103.

The information provided in the Transaction SC(s) 640 and the security and integrity of the Transaction SC(s) 640 provide sufficient authenticity to the Clearinghouse(s) 105 that the purchase transaction is valid and thus no further validation is required prior to the logging of this sale by the Clearinghouse(s) 105. The Electronic Digital Content Store(s) 103, however, has the option to request authentication before its accounts are charged (transaction logged at the Clearinghouse(s) 105 indicating to the Content Provider(s) 101 that this Electronic Digital Content Store(s) 103 has collected money for the sale of this Content 113). This request for authentication/notification is indicated by a flag in the Transaction Data 642. In this scenario, the Clearinghouse(s) 105 contacts the Electronic Digital Content Store(s) 103 and receive authorization from the Electronic Digital Content Store(s) 103 before the charge to his account and the release of the encryption Key 623. The Transaction ID 535 is passed to the Electronic Digital Content Store(s) 103 from the Clearinghouse(s) 105 as part of this authentication request to enable the Electronic Digital Content Store(s) 103 to associate this request to a prior transaction performed with the End-User(s). This Transaction ID 535 can be any unique value the Electronic Digital Content Store(s) 103 wishes to use and is solely for its benefit.

The Transaction Data 642 also contains a customer name. This name can be from the user name field of the purchase form filled out by the user when making his purchase, or from information logged previously during some user registration process with the Electronic Digital Content Store(s) 103, or the official name obtained from credit card information associated with the card used in this transaction. This name is later included in the License Watermark 527.

The Transaction Data 642 also contains the Store Usage Conditions 519 purchased by the End-User(s). This information is included in the License Watermark 527 and used by the End-User Device(s) 109 in Copy and Play Control.

The final parameter required by the Transaction Processor.Module 175 is the HTML page or CGI URL acknowledging the purchase settlement. The purpose of this is to allow the Electronic Digital Content Store(s) 103 to respond to the End-User(s) with an acknowledgment of the financial settlement and whatever other information he wishes to include in the response. This HTML page or CGI URL is included in the Transaction SC(s) 640 and is displayed in the browser window of the End-User Device(s) 109 when the Transaction SC(s) 640 is received and processed.

The Transaction SC(s) 640 is the HTTP response to the End-User(s) from the Electronic Digital Content Store(s) 103 after processing the purchase submission. Sending a SC(s) as the direct HTTP response forces the automatic loading on the End-User Device(s) 109 of a SC(s) Processor Helper Application thus allowing automatic completion of the transaction without depending on further End-User(s) initiated actions. This process is described in more detail in the End-User Device(s) 109 and Player Application 195 section later.

When the Transaction Processor Module 175 is called with the required parameters, it builds a Transaction SC(s) 640 containing the Transaction Data 642, the transaction acknowledgment HTML page or reference URL other required security features of the SC(s), and retrieves and imbeds the Offer SC(s) 641 associated with the purchase. It also logs information about this transaction for later use by the Notification Interface Module 176 and the Account Reconciliation Tool 179.

4. Notification Interface Module 176

The Notification Interface Module 176 is a Web Server side executable routine (CGI or function callable by NSAPI, ISAPI or equivalent). It handles optional requests and notifications from the Clearinghouse(s) 105, the End-User Device(s) 109, the Content Hosting Site(s) 111, and the Content Provider(s) 101. The events that the Electronic Digital Content Store(s) 103 can optionally request notification for are:

- Notification from the Clearinghouse(s) 105 that the End-User Device(s) 109 requested an encryption Key 623 and the Clearinghouse(s) 105 is releasing the encryption Key 623 for the specified Content 113. This notification can optionally be configured to require authentication from the Electronic Digital Content Store(s) 103 prior to the encryption Key 623 being sent to the End-User Device(s) 109.
- Notification from the Content Hosting Site(s) 111 that the Content SC(s) 630 has been sent to the End-User Device(s) 109.
- Notification from the End-User Device(s) 109 that the Content SC(s) 630 and the License SC(s) 660 have been received and successfully used to process the Content 113 or was found to be corrupt.
- Notification from the Content Provider(s) 101 that new Content 113 has been placed in the Content Promotions Web Site 156.

None of these notifications are a required step in the Secure Digital Content Electronic Distribution System flows 100 but are provided as options to allow the Electronic Digital Content Store(s) 103 the opportunity to close its records on the satisfaction of completion of the sale. It also provides information that may be needed to handle customer service requests by letting the Electronic Digital Content Store(s) 103 know what functions have transpired since financial settlement of the transaction or what errors occurred during an attempt to complete the sale. Alternatively, much of this status can be obtained from the Clearinghouse(s) 105 through the Customer Service Interface 184 as needed.

Frequency of notification of new Content 113 available at the Content Promotions Web Site 156 is determined by the Content Provider(s) 101. Notification may be provided as each new Metadata SC(s) 620 is added or just daily with all new Metadata SC(s) 620 added that day.

All of these notifications result in entries being made to the Transaction Log 178. If the Electronic Digital Content Store(s) 103 wishes to perform his own processing on these notifications, he can intercept the CGI call, perform his unique function and then optionally pass the request on to the Notification Interface Module 176.

5. Account Reconciliation Tool 179

This Account Reconciliation Tool 179 contacts the Clearinghouse(s) 105 to compare the Transaction Log 178 with the log of the Clearinghouse(s) 105. This is an optional process which is available to help the Electronic Digital Content Store(s) 103 feel comfortable with the accounting for the Secure Digital Content Electronic Distribution System 100.

In another embodiment, this tool can be updated to provide electronic funds transfers for automated periodic payments to the Content Provider(s) 101 and the Clearinghouse(s) 105. It can also be designed to automatically process payments upon reception of an electronic bill from the Clearinghouse(s) 105 after reconciling the bill against the Transaction Log 178.

C. Broadcast Electronic Digital Content Distribution Service

Broadcast primarily refers to a one to many transmission method where there is no personal interaction between the End-User Device(s) 109 and the Electronic Digital Content Store(s) 103 to customize on-demand viewing and listening. This is typically provided over a digital satellite or cable infrastructure where the Content 113 is preprogrammed so that all End-User Device(s) 109 receive the same stream.

A hybrid model can also be defined such that an Electronic Digital Content Store(s) 103 provides a digital content service organized in such a way that it can offer both a web distribution interface via an Internet connection as well as a higher bandwidth satellite or cable distribution interface via a broadcast service, with a great deal of commonalty to the site design. If the IRD backchannel serial interface were connected to the web, and the IRD supported web navigation, the End-User(s) could navigate the digital content service in the usual way via the backchannel Internet interface, previewing and selecting Content 113 to purchase. The user can select high quality downloadable Content 113, purchase these selections, and receive the required License SC(s) 660 all via an Internet connection and then request delivery of the Content 113 (Content SC(s) 630) over the higher bandwidth broadcast interface. The Web service can indicate which Content 113 would be available for download in this manner based on the broadcast schedule or could build the broadcast streams based totally on purchased Content 113. This method would allow a Web based digital content service to contract with a broadcast facility to deliver high quality Content 113 to users equipped with the proper equipment making a limited number of specific Content 113 (e.g. songs or CDS) available daily in this manner and the entire catalog available for download in lower quality via the web interface.

Other broadcast models can be designed where there is no web interface to the End-User Device(s) 109. In this model, promotional content is packaged in specially formatted digital streams for broadcast delivery to the End-User Device(s) 109 (i.e. IPD) where special processing is performed to decode the streams and present the End-User(s) with the promotional content from which purchase selections can be made.

The actual purchase selections would still be initiated via backchannel communications from the End-User Device(s) 109 to the Clearinghouse(s) 105 and would utilize SC(s) to perform all data exchange. The toolset provided to the Electronic Digital Content Store(s) 103 has been architected and developed in such a way that most of the tools apply to both a point-to-point Internet service offering as well as a broadcast satellite or cable offering. The tools used by a Digital Content Web Site Electronic Digital Content Store(s) 103 to acquire and manage Content 113 as well as prepare SC(s) is also used by a satellite based Electronic Digital Content Store(s) 103 to manage and prepare Content 113 for distribution on a broadcast infrastructure. The SC(s) distributed over a Web service are the same as those distributed over a broadcast service.

X. End-User Device(s) 109

The applications in the End-User Device(s) 109 for the Secure Digital Content Electronic Distribution System 100 perform two main functions: first the SC(s) processing and copy control; and second playback of encrypted Content 113. Whether the End-User Device(s) 109 is a Personal Computer or a specialized electronic consumer device, it has to be capable of performing these base functions. The End-User Device(s) 109 also provides a variety of additional features and functions like creating play lists, managing the digital content library, displaying information and images during content playback, and recording to external media devices. These functions vary based on the services these applications are supporting and the type of devices the applications are designed for.

A. Overview

Figure 10:
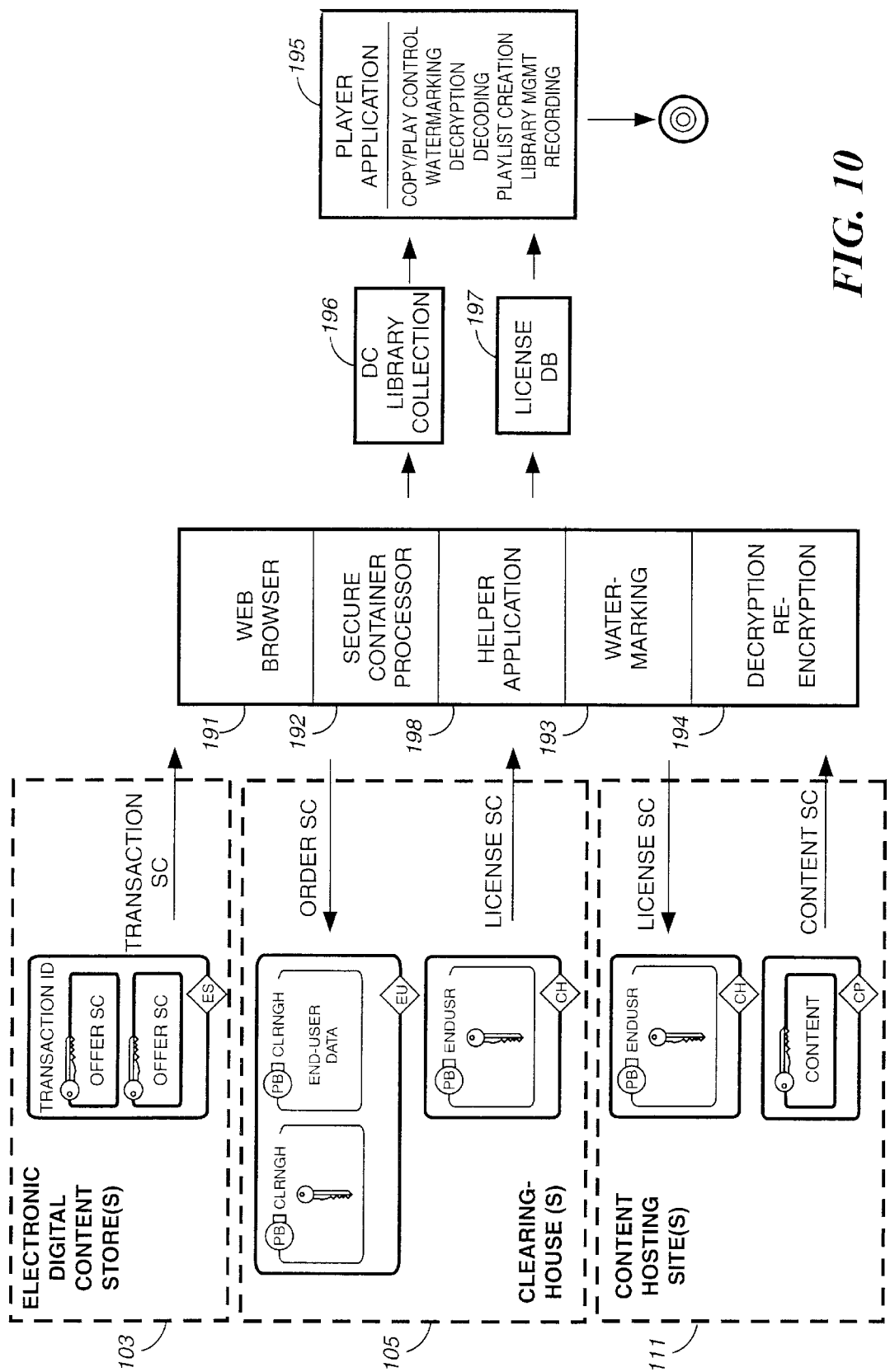
FIG. 10 is a block diagram illustrating the major components and processes of an End-User Device(s) of FIG. 1 according to the present invention.

Referring now to FIG. 10, shown is the major components and processes and End-User Device(s) 109 Functional Flow. The applications designed to support a PC based web interface Content 113 service consists of two executable software applications: the SC(s) Processor 192 and the Player Application 195. The SC(s) Processor 192 is an executable application which is configured as a Helper Application into the End-User(s) Web Browser 191 to handle SC(s) File/MIME Types. This application is launched by the Browser whenever SC(s) are received from the Electronic Digital Content Store(s) 103, the Clearinghouse (s) 105, and the Content Hosting Site(s) 111. It is responsible for performing all required processing of the SC(s) and eventually adding Content 113 to the Digital Content Library 196 of the End-User(s).

The Player Application 195 is a stand alone executable application which the End-User(s) loads to perform Content 113 in his Digital Content Library 196, manage his Digital Content Library 196 and create copies of the Content 113 if permitted. Both the Player Application 195 and SC(s) Processor 192 applications can be written in Java, C/C++ or any equivalent software. In the preferred embodiment, the applications can be downloaded from computer readable means such as website. However, other delivery mechanisms are also possible such as being delivered on computer readable media such as diskettes or CDS.

The searching and browsing of Content 113 information, previewing of, for example, song clips, and selecting songs for purchase is all handled via the End-User(s) Web Browser 191. Electronic Digital Content Store(s) 103 provides the shopping experience in the same way that is offered today by many Content 113 retailing web sites. The difference to the End-User(s) over today's web based Content 113 shopping is that they may now select downloadable Content 113 objects to be added to their shopping cart. If the Electronic Digital Content Store(s) 103 has other merchandise available for sale in addition to the downloadable objects, the End-User(s) may have a combination of physical and electronic downloadable merchandise in his shopping cart. The Secure Digital Content Electronic Distribution End-User Device(s) 109 are not involved until after the End-User(s) checks out and submits his final purchase authorization to the Electronic Digital Content Store(s) 103. Prior to this point, all interaction is between the Web Server for the Electronic Digital Content Store(s) 103 and the Browser 191 on the End-User Device(s) 109. This includes preview of sample Digital Content clips. Digital Content clips are not packaged into SC(s) but instead are integrated into the web service of the Electronic Digital Content Store(s) 103 as downloadable files or fed from a streaming server. The format of the Content 113 clip is not dictated by the system architecture. In another embodiment, the Player Application 195 could interact directly with the Electronic Digital Content Store(s) 103 or Clearinghouse(s) 105 or offline using a promotional CD.

B. Application Installation

The Player Application 195 and the Helper Application 1981 are packaged into a self installing executable program which is available for download from many web sites. The Clearinghouse(s) 105 acts as a central location which hosts the master download page at a public web site. It contains links to the locations from which the installation package can be downloaded. The installation package is available at all Content Hosting Site(s) 111 to provide geographic dispersal of the download requests. Each participating Electronic Digital Content Store(s) 103 can also make the package available for download from their site or may just provide a link to the master download page at the public web site of the Clearinghouse(s) 105.

Any End-User(s) wishing to purchase downloadable Content 113, downloads and install this package. The installation is self contained in this downloadable package. It unpacks and installs both the Helper Application 198 and the Player Application 195 and also configure the Helper Application 198 to the installed Web Browser(s).

As part of the installation, a Public/Private Key 661 pair is created for the End-User Device(s) 109 for use in processing Order and License SC(s) 660. A random Symmetric Key (Secret User Key) is also generated for use in protecting song encryption keys in the License Database 197. The Secret User Key (not shown) is protected by breaking the key into multiple parts and storing pieces of the key in multiple locations throughout the End-User(s)' computer. This area of the code is protected with Tamper Resistant Software technology so as not to divulge how the key is segmented and where it is stored. Preventing access to this key by even the End-User(s) helps to prevent piracy or sharing of the Content 113 with other computers. See the SC(s) Processor 192 section for more details on how these keys are used.

Tamper-resistant software technology is a method to deter unauthorized entry into a computer software application by a hacker. Typically a hacker wants to understand and/or modify the software to remove the restrictions on the usage. In practicality, no computer program exists that cannot be hacked; that is why tamper-resistant software is not called "tamper-proof". But the amount of effort required to hack a tamper-resistance protect application usually deters most hackers because the effort is not worth the possible gain. Here the effort would be to gain access to a key to one piece of Content 113, perhaps a single song on a CD.

One type of tamper-resistant software technology is from IBM. One product this code was introduced is in the IBM ThinkPad 770 laptop computer. Here, the tamper-resistant software was used to protect the DVD movie player in the computer. Digital Content Provider(s) such as Hollywood studios, concerned about the advent of digital movies and the ease at which perfect copies can be made, have insisted that movies on DVD disc(s) contain copy protection mechanisms. IBM's tamper-resistant software made it difficult to circumvent these copy protection mechanisms. This is a very typical application for tamper-resistant software; the software is used to enforce rules on the usage of some protected type of Content 113.

IBM's tamper-resistant software puts several types of obstacles in the path of the attacker. First, it contains techniques to defeat, or at least reduce the effectiveness of, the standard software tools that the hacker uses: debuggers and disassemblers. Second it contains self-integrity checking, so that single modifications, or even small handfuls of modifications, will be detected and cause incorrect operation. Finally, it contains obfuscations to mislead hackers regarding its true operation. The latter technique is largely ad hoc, but the first two build upon well-known tools in cryptography: encryption and digital signatures.

C. Secure Container Processor 192

When the End-User(s) submits the final purchase authorization to the Electronic Digital Content Store(s) 103 for the merchandise he has collected in his shopping cart, his Web Browser remains active waiting for a response from the Web Server. The Web Server at the Electronic Digital Content Store(s) 103 processes the purchase and performs the financial settlement and then returns a Transaction SC(s) 640 to the End-User Device(s) 109. The SC(s) Processor 192 (Helper Application 198) is launched by the Web Browser to process the SC(s) mime type associated with the Transaction SC(s) 640. FIG. 14 is an example of user interface screens of the Player Application 195 downloading content to a local library as described in FIG. 10 according to the present invention.

The SC(s) Processor 192 opens the Transaction SC(s) 640 and extract the Response HTML page and Offer SC(s) 641 contained within. The Response HTML page is displayed in the Browser window acknowledging the End-User(s)' purchase. The Offer SC(s) 641 are then opened and the Content 113 (e.g. song or album) names along with the projected download times are extracted from them, step 1401. A new window is then displayed with this information and the End-User(s) is presented with options to schedule the download(s) of the Content 113 (e.g. for music, songs or entire albums), step 1402. The End-User(s) can select immediate download or can schedule the download to occur at a later time. If a later time is selected, the download schedule information is saved in a log and the download is initiated at the scheduled time if the End-User Device(s) 109 is powered on at that time. If the computer is not active at the scheduled download time or the communication link is not active, the End-User(s) is prompted to reschedule the download when the computer is next powered up.

When the scheduled download time occurs or if immediate download was requested, the SC(s) Processor 192 creates Order SC(s) 650 from information in the Transaction SC(s) 640, Offer SC(s) 641, and the Public Key 661 of the End-User(s) generated at install time. This Order SC(s) 650 is sent via HTTP request to the Clearinghouse(s) 105. When the Clearinghouse(s) 105 returns the License SC(s) 660, the Helper Application 198 is re-invoked to process the License SC(s) 660. The License SC(s) 660 is then opened and the URL of the Content Hosting Site(s) 111 is extracted from the referenced Order SC(s) 650. The License SC(s) 660 is then sent to the specified Content Hosting Site 111, via http request through the Browser, requesting download of the Content SC(s) 630. When the Content SC(s) 630 comes back to the Browser, the Helper Application 198 is re-invoked again. The SC(s) Processor 192 displays the name of the Content 113 being downloaded along with a download progress indicator and an estimated time to completion.

As the Content 113 is being received by the SC(s) Processor 192, it loads the Content 113 data into memory buffers for decryption. The size of the buffers depends on the requirements of the encryption algorithm and watermarking technology 193 and is the minimum size possible to reduce the amount of unencrypted Content 113 exposed to hacker code. As a buffer is filled, it is decrypted using the Key 623 (corresponding to the Public Key 661) of the End-User(s) extracted from the License SC(s) 660, which itself is first decrypted using the Private Key. The decrypted buffer is then passed to the watermarking function.

The watermarking 193 extracts the watermarking instructions from the License SC(s) 660 and decrypt the instructions using the Private Key of the End-User(s). The watermarking data is then extracted from the License SC(s) 660 which includes transaction information such as the purchaser's name as registered with the Electronic Digital Content Store(s) 103 from which this Content 113 was purchased or derived from the credit card registration information if the Electronic Digital Content Store(s) 103 does not provide a registration function. Also included in the watermark is the purchase date and the Transaction ID 535 assigned by the Electronic Digital Content Store(s) 103 to reference the specific records logged for this transaction. The Store Usage Conditions 519 are also included to be used by the Copy Control of the Player Application 195.

The Watermarking 193 is protected with Tamper Resistant Code technology so as not to divulge the watermarking instructions thus preventing a hacker from discovering the location and technique of the watermark. This prevents removal or modification of the watermark by a hacker.

After inscribing any required watermark to this content buffer, the buffer is passed to the scrambling function for Re-Encryption 194. A processor efficient secure encryption algorithm such as IBM's SEAL encryption technology is used to re-encrypt the Content 113 using a random Symmetric Key. Once the download and Decryption and Re-Encryption 194 process is complete, the encryption Key 623 used by the Content Provider(s) 101 to originally encrypt the Content 113 is now destroyed and the new SEAL key is itself encrypted using the Secret User Key created and hidden at installation time. This new encrypted Seal Key is now stored in the License Database 107.

Unlike source performed at the Content Provider(s) 101 and user watermarking performed at the End User Device(s) 109 may need to become an industry standard to be effective. These standards are still evolving. The technology is available to allow control information to be embedded in the music and updated a number of times. Until such time as the copy control standards are more stable, alternative methods of copy control have been provided in the Secure Digital Content Electronic Distribution System 100 so that it does not rely on the copy control watermark in order to provide rights management in the consumer device. Storage and play/record usage conditions security is implemented utilizing encrypted DC Library Collections 196 that are tied to the End User Device(s) 109 and protected via the Tamper Resistant Environment. Software hooks are in place to support copy control watermarking when standards have been adopted. Support exists today for watermarking AAC and other encoded audio streams at a variety of compression levels but this technology is still somewhat immature at this time to be put to use as a sole method of copy control.

The Decryption and Re-Encryption 194 process is another area of the code that is protected with Tamper Resistant Code technology so as not to divulge the original Content 113 encryption key, the new SEAL key, the Secret User Key, and where the Secret User Key segments are stored and how the key is segmented.

The process of Decryption and Re-Encryption 194 serves two purposes. Storing the Content 113 encrypted with an algorithm like SEAL enables faster than real-time decryption and requires much less processor utilization to perform the decryption than does a more industry standard type algorithm like DES. This enables the Player Application 195 to perform a real-time concurrent decryption-decode-playback of the Content 113 without the need to first decrypt the entire file for the Content 113 prior to decode and playback. The efficiency of the SEAL algorithm and a highly efficient decode algorithm, allows not only concurrent operation (streaming playback from the encrypted file) but also allows this process to occur on a much lower powered system processor. Thus this application can be supported on a End-User Device(s) 109 as low end as a 60 MHz Pentium system and perhaps lower. Separating the encryption format in which the Content 113 is finally stored from the original encryption format, allows for greater flexibility in the selection of the original content encryption algorithm. Thus use of widely accepted and proven industry standard algorithms can be used thus further enhancing Digital Content Industry acceptance of the Secure Digital Content Electronic Distribution System 100.

The second purpose of this Decryption and Re-Encryption 194 process is to remove the requirement that the original master encryption Key 623, used by the Content Provider(s) 101 to encrypt this Content 113, be stored on every End-User Device(s) 109 which has licensed this Content 113. The encrypted master Key 623, as part of the License SC(s) 660, is only cached on the hard disk of the End-User Device(s) 109 for a very short time and is in the clear only in memory and for a very short time. During this execution phase, the Key 623 is protected via Tamper Resistant Code technology. Not having to retain this Key 623 in any form on the End-User Device(s) 109 once this Decryption and Re-Encryption 194 phase has completed, greatly lessens the possibility of piracy from hackers.

Once the song has been re-encrypted, it is stored in the Digital Content Library 196. All metadata required for use by the Player Application 195, is extracted from the associated Offer SC(s) 641 and also stored in the Digital Content Library 196, step 1403. Any parts of the metadata which are encrypted, such as the song lyrics, are decrypted and re-encrypted in the same manner as described above for the other content. The same SEAL key used to encrypt the Content 113 is used for any associated metadata needing to be encrypted.

D. The Player Application 195

1. Overview

The Secure Digital Content Electronic Distribution Player Application 195 (referred to here as the Player Application 195) is analogous to both a CD, DVD or other Digital Content player and to a CD, DVD, or other digital content storage management system. At its simplest, it performs Content 113, such as playing songs or videos. At another level, it provides the End-User(s) a tool for managing his/her Digital Content Library 196. And just as importantly, it provides for editing and playing of collections of content, such as songs, (referred to here as Play-lists).

The Player Application 195 is assembled from a collection of components that may be individually selected and customized to the requirements of the Content Provider(s) 101 and Electronic Digital Content Store(s) 103. A generic version of the player is described, but customization is possible.

Figure 15A:
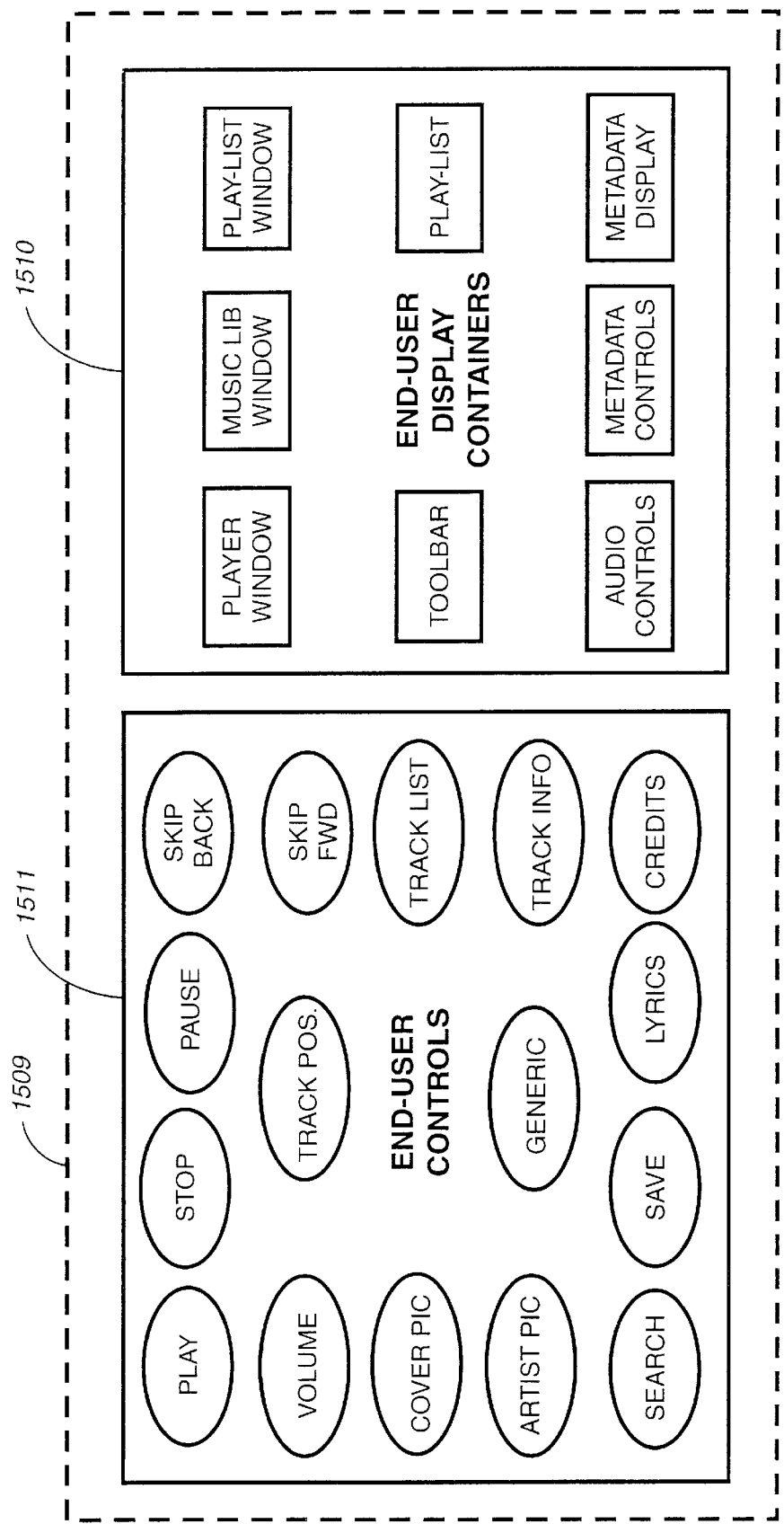
FIG. 15 is a block diagram illustrating the major components and processes of a Player Application running on End-User Device of FIG. 9 according to the present invention.
Figure 15B:
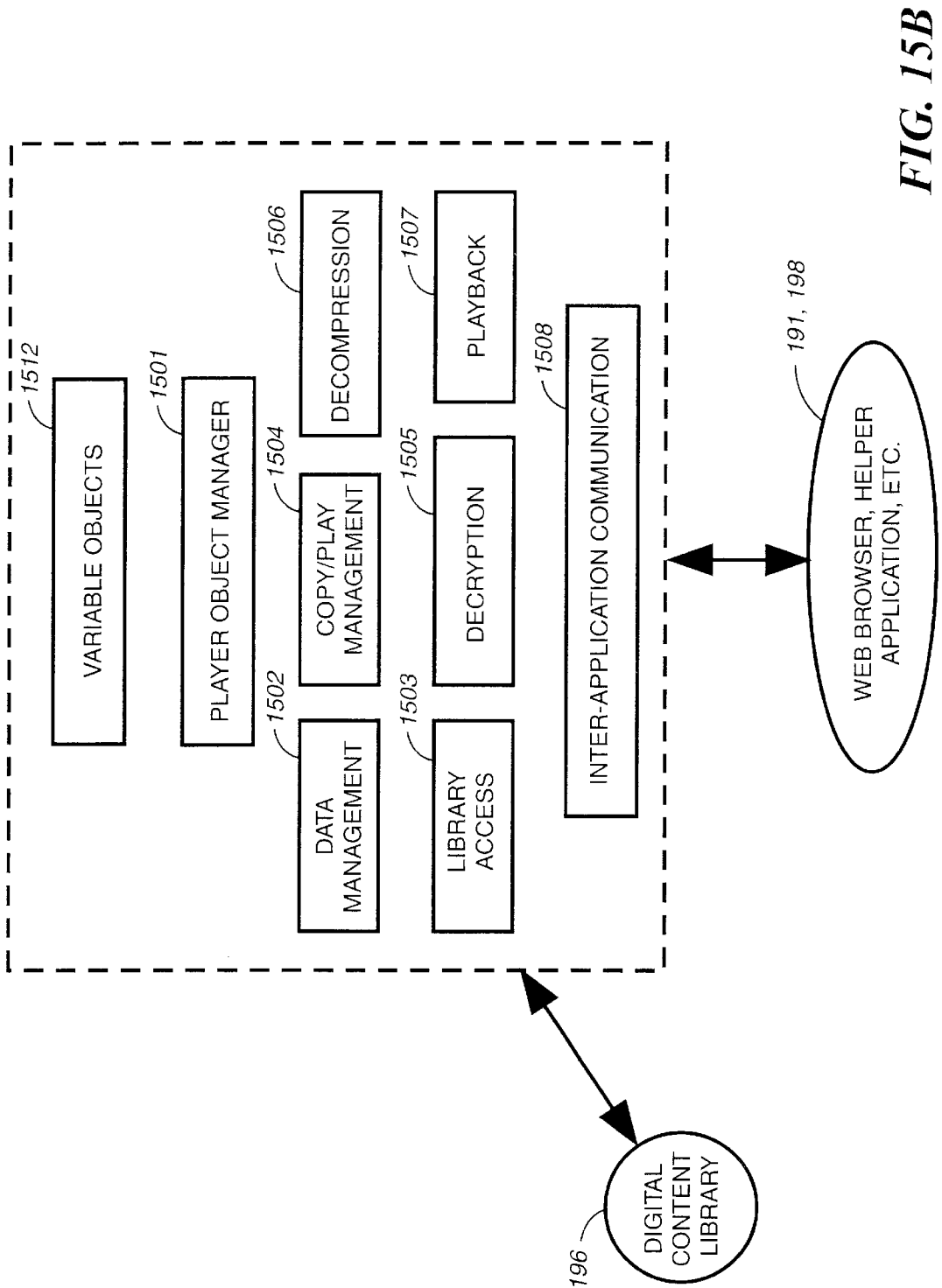

Referring now to FIG. 15 there is shown a block diagram of the major components and processes of the Player Application 195 running on End-User Device(s) 109 of FIG. 10.

There are several component-sets that make up the subsystems of the Player Object Manager 1501:

1. End-User Interface Components 1509
2. Copy/Play Management Components 1504
3. Decryption 1505, Decompression 1506, Playback Components 1507 and may include recording.
4. Data Management 1502 and Library Access Components 1503
5. Inter-application Communication Components 1508
6. Other miscellaneous (Installation, etc) Components Components from within each of these sets may be selected, based on the requirements of:
  the platform (Windows, Unix, or equivalent)
  communications protocols (network, cable, etc)
  Content Provider(s) 101 or Electronic Digital Content Store(s) 103

Hardware (CD, DVD, etc)

Clearinghouse(s) 105 technology and more.

The sections below detail the various component sets. The final section details how these components are put together in the generic player, and discusses how the components can be customized.

In another embodiment, the components of the Player Application 195 and the SC(s) Processor 192 are available as part of a programmer's software toolkit. This toolkit enables predefined interfaces to the components of the generic player application listed above. These predefined interfaces are in the form of APIs or Application Programming Interfaces. A developer using these APIs can implement any of the functionality of the components from a high level application program. By providing APIs to these components, a programmer can quickly develop a customized Player Application 195 without the need to re-created these functions and resources of any of these components.

2. End-User Interface Components 1509

Components from this set combine to provide the on-screen manifestation of the Player Application 195. Note that the design establishes no definitive layout of these components. One such layout is provided in the generic player. Based on requirements from Content Provider(s) 101 and/or Electronic Digital Content Store(s) and other requirements, alternate layouts are possible.

This set is grouped into subgroups, starting with the components used to present End-User Display 1510 and handle controls called End-User Controls 1511 used for such low-level functions as audio playback, and presentation of metadata. Next, the End-User Display Component 1510 is further divided by special function groupings (Play-list, Digital Content Library), and then object-container components used for grouping and placing of those lower-level components.

Within the component listings below, any reference to creating CDS or copying of Content 113 to a CD or other recordable medium only applies to the case where the Player Application 195 has such functionality enabled. Also note that the term CD in that context is a generic one, that can also represent various other external recording devices, such as MiniDisc or DVD.

Figure 16:
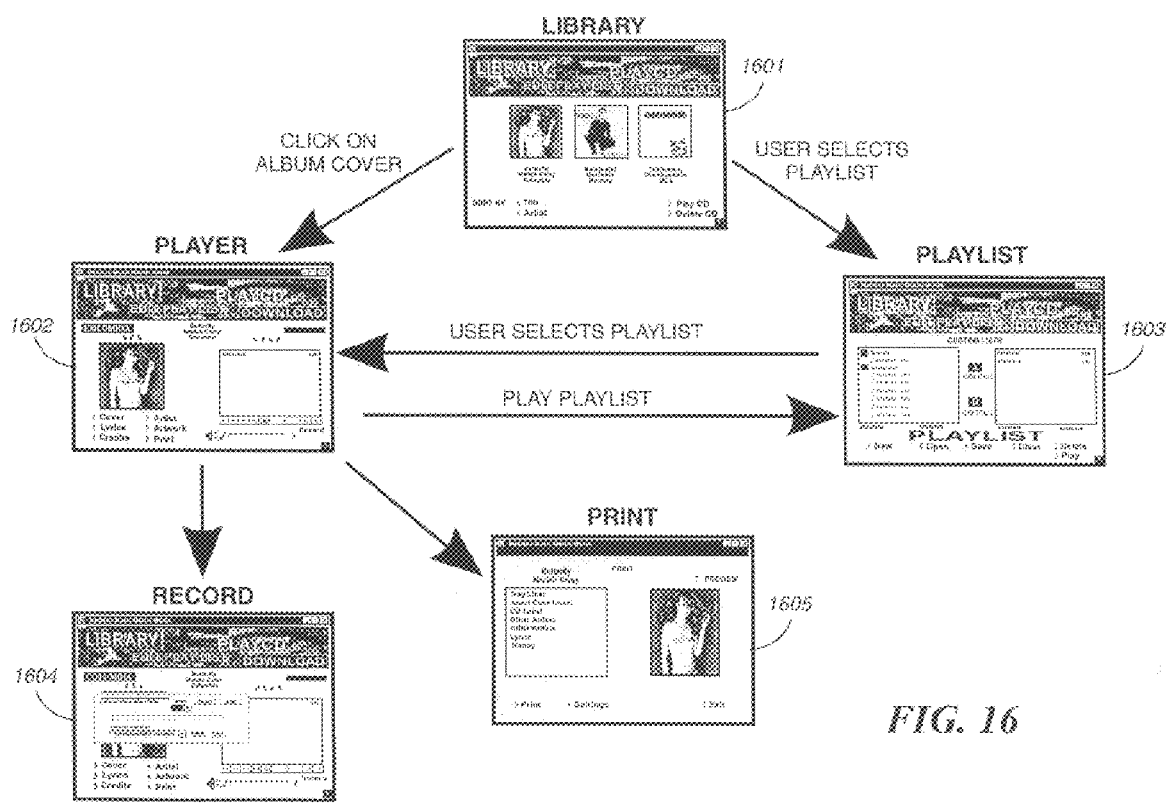
FIG. 16 is an example user interface screens of the Player Application of FIG. 15 according to the present invention.

FIG. 16 is an example user interface screens of the Player Application 195 of FIG. 15 according to the present invention. Function for the End-User Controls 1511 include (corresponding screens of an End-User Interface are shown 1601–1605):

Controls for performing the Content 113:
Play/Stop button
Play button
Stop button
Pause button
Skip forward button
Skip backward button
Volume control
Track position control/display
Audio channel volume level display and more.

Controls for the displaying metadata associated with the Content 113
Cover Picture button
Cover Picture object
Artist Picture button
Artist Picture object
Track List button Track List Information object
Track List Selector object (click to play)
Track Name object
Track Information object
Track Lyrics button
Track Lyrics object
Track Artist Name object
Track Credits button
Track Credits object
CD Name object
CD Credits button
CD Credits object
Generic (Configurable) Metadata button
Generic Metadata object and more.

Function for the End-User Display 1510 include (corresponding screens of an End-User Interface are shown 1601–1605):

Play-list of display container
Play-list Management button
Play-list Management window
Digital Content search button
Digital Content search Definition object
Digital Content search Submit button
Digital Content search Results object
Copy Selected Search Result Item To Play-list button
Play-list object (editable)
Play-list Save button
Play-list Play button
Play-list Pause button
Play-list Restart button
Create CD from Play-list button and more.

Display of Digital Content Library 196
Digital content library button
Digital content librarian window
Digital content categories button
Digital content categories object
By-artist button
By-genre button
By-label button
By-category button
Delete button
Add-to-Play-list button
Copy to CD button
Song List object
Song List display container and more Containers and Misc.
Player window container
Audio controls container
Metadata controls container
Metadata display container
Toolbar container object
Sample button
Download button
Purchase button
Record button
Player Name object
Label/Provider/Store Advertisement object
Label/Provider/Store URL button
Artist URL Button and more 3. Copy/Play Management Components 1504

These components handle set up of encryption keys, Watermark processing, Copy management, and more. Interfaces also exist for communication with the Clearinghouse(s) 105, transmission of purchase requests, and more, for special services such as pay per listen or cases where each access to the Content 113 is accounted for. Currently, the communications to the Clearinghouse(s) 105 functions are handled by the SC(s) Processor 192.

The use of the Content 113 by the Player Applications 195 on End User Device(s) 109 is logged into a database such as the License Database 197. The tracking of each use of Content 113 by the Player Application 195 can be transmitted to one or more logging sites such as the Clearing House(s) 105 or Content Provider(s) 101 or Electronic Digital Content Store(s) 103 or any site designated and coupled to Transmission Infrastructures 107. This transmission can be scheduled at predetermined times to upload the usage information to a logging site. One predetermined time contemplated is early in the morning when Transmission Infrastructures 107 may not be as congested with network traffic. The Player Application 195 using known techniques, wakes-up at a scheduled time, and transmit the information from the local logging database to the logging site. By reviewing the logging site information, the Content Provider(s) 101 can measure the popularity of their Content 113.

In another embodiment, the instead of logging the usage of Content 113 for later uploading to a logging site, the use of the Content 113 is uploaded to the logging site during every use of the Content 113. For example, when duplicating or copying the Content 113 stored at the End User Device(s) 109, on to an external device such as DVD Disc, digital tape, flash memory, mini Disc or equivalent read/writeable removable media, the use is updates to the logging site. This may be a precondition to copying the Content 113 in the usage conditions 206 that is transmitted when the Content 113 is purchased. This ensures the Content Provider(s) 101 can accurately track the usage of their Content 113 during their playing, duplicating or other actions upon the Content 113.

In addition, other information about the Content 113 can be uploaded to the logging site. For example the last time (e.g., hour and day) the Content 113 was performed; how many times the Content 113 was performed; if the Content 113 has been duplicated or copied to an authorized external device such as DVD Disc, digital tape or mini-Disc. In cases where there are multiple distinct users of a single Player Application 195 on the End User Device(s) 109, such as different members of a family, the identifications of the user of the Content 113 is transmitted along with the usage information to the logging site. By reviewing the usage information uploaded to the logging site, the Content Provider(s) 101 can measure the popularity of the Content 113 base on the actual usage, the identification of the user and the number of times the Content 113 has been performed. The actual usage measurement makes this system more factual driven over systems using sampling methods, such as a Nielsen Rating scheme for televisions, or telephone surveys, where only a limited number of users are sampled at any one time and the results extrapolated. In this present embodiment, the actual usage can be measures for the users logging back onto a designated web site such as the Electronic Digital Content Store(s) 103 or Content Provider(s) 101.

4. Decryption 1505, Decompression 1506 and Playback Components 1506

These components use the keys acquired by the Copy/Play Management components to unlock the audio data acquired from the Data Management and Library Access components, apply the appropriate decompression to prepare it for playback, and use system audio services to play it. In an alternate embodiment, the audio data acquired from the Data Management and Library Access components may be copied to removable media such as CDS, diskettes, tapes or MiniDisks.

5. Data Management 1502 and Library Access Components 1503

These components are used to store and retrieve song data on various storage devices on the End-User(s)' system, as well as handle requests for information about the stored songs.

6. Inter-application Communication Components 1508

These components are used for coordination between the Secure Digital Content Electronic Distribution Player and other applications (e.g., Browser, helper-app and/or plug-in, etc) that may invoke the Player Application 195, or that the Player Application 195 needs to use when carrying out its functions. For example, when a URL control is activated, it invokes the appropriate browser and instruct it to load the appropriate page.

7. Other Miscellaneous Components Individual components that don't fall into the categories above (e.g., Installation) are grouped here.

8. The Generic Player

In this section the combining of the components above into a version of the Player Application 195 is discussed. This is just one of many different examples possible, since the Player Application 195 is designed for customization by being based on software objects.

The Player Object Manager 1501 is a software framework holding all the other components together. As discussed in the sections above, the blocks below the Player Object Manager 1501 in this diagram are required for any player, but may be replaced by specialized versions depending on such things as form of encryption or scrambling being used, types of audio compression, access methods for the Content 113 library, and more.

Above the Player Object Manager 1501 are Variable Objects 1512, which are mostly derived from the metadata associated with the Content 113 being played or searched. These Variable Objects are made available to the End-User Device(s) 109 by way of the End-User Display 1510 and received input from the End-User Controls 1511. All objects are configurable, and the layouts of all containers are customizable. These objects may be implemented in C/C++, Java or any equivalent programming language.

Using the Player Application 195

The following embodiment is for an example where the Player Application 195 running on End-User Device(s) 109 is an audio player where Content 113 is music. It should be understood to those skilled in the art that other types of Content 113 can be supported by the Player Application 195. A typical audio enthusiast has a library of CDS holding songs. All of these are available within the Secure Digital Content Electronic Distribution System 100. The set of songs that have been purchased from Electronic Digital Content Store(s) 103 are stored within a Digital Content Library 196 on his or her system. The groupings of songs that are analogous to physical CDS are stored as Play-lists. In some cases a Play-list exactly emulates a CD (e.g., all tracks of a commercially available CD has been purchased from an Electronic Digital Content Store(s) 103 as an on-line version of the CD and is defined by a Play-list equivalent to that of the CD). But most Play-lists is put together by End-User(s) to group songs they have stored in the Digital Content Libraries on their systems. However for the purposes of the ensuing discussions, an example of a custom made music CD is used when the term a Play-list is mentioned.

When the End-User(s) starts the Player Application 195 explicitly, rather than having it start up via invocation from the SC(s) Processor 192 Application, it pre-loads to the last Play-list that was accessed. If no Play-lists exist in the Digital Content Library 196, the Play-list editor is started automatically (unless the user has turned off this feature via a preference setting). See The Play-list, below for further details.

The Player Application 195 may also be invoked with a specific song as an argument, in which case it immediately enters Song-play mode. Optionally, the song may be prepared for play but await action by the End-User(s) before proceeding. See Song Play, below for more on this situation.

The Play-list (corresponding screen of an End-User Interface 1603):

When the End-User(s) has invoked the Play-list function, these are the available functions:

Open Play-list
  Digital Content Librarian is invoked to display a list of stored Play-lists for selection. Also see Digital Content Librarian below for more info.
Edit Play-list
  Invokes the Play-list Editor (see below), primed with the current Play-list if one has been loaded already. Otherwise the editor creates an empty Play-list to start with.
Run Play-list
  Songs are played one at a time starting with the selected song (or the beginning of the play-list, if no song is selected). Options set in the Play-list Editor affect the sequencing of the playback. However there is controls available here to override those options for this play of the Play-list.
Play song
  Only the selected song from the Play-list is played. See Song Play below for more info.
Play-list Info
  Display information about the Play-list.
Song Info
  Display information about the selected song within the Play-list.
Visit web site
  Load web site associated with this Play-list into browser.
Librarian
  Open the Digital Content Librarian window. Also see Digital Content Librarian below for more info.

The Play-list Editor (corresponding screen of an End-User Interface 1603):

When invoking the Play-list editor, these are the End-User(s)' options:

View/Load/Delete Play-lists
  Digital Content Librarian is invoked to display a list of stored Play-lists for selection of one to load or delete. Also see Digital Content Librarian below for more info.
Save Play-list
  Current version of Play-list is saved in the Digital Content Library 196.

Delete Song

Currently selected song is deleted from Play-list.

Add Song

Digital Content Librarian is invoked in song-search mode, for selection of song to add to the Play-list. Also see Digital Content Librarian below for more info.

Set Song Information

Display and allow changes to information about the selected song within the play-list. This information is stored within the Play-list, and does not alter information about the song stored within the Digital Content Library 196. These things can be changed:

Displayed Song Title

End-User(s) notes about the song

Lead-in delay on playing the song

Follow-on delay after playing the song

Start-point within song when playing

End-point within song when playing

Weighting for random mode

Volume adjustment for this song and more.

Set Play-list attributes: Display and allow changes to the attributes of this Play-list. These attributes may be set:

Play-list title

Play-list mode (random, sequential, etc)

Repeat mode (play once, restart when done, etc)

End-User(s) notes about this Play-list

Librarian (corresponding screen of an End-User Interface 1601):

Open the Digital Content Librarian window. Also see Digital Content Librarian below for more info.

Song Play

When a song has been prepared for play, either by invoking the Player Application 195 with the song as an argument or by selecting a song for play from a Play-list or within the Digital Content Librarian, these are the End-User(s)' options: (corresponding screen of an End-User Interface 1601):

Play

Pause

Stop

Skip Backward

Skip Forward

Adjust Volume

Adjust Track Position

View Lyrics

View Credits

View CD Cover

View Artist Picture

View Track Information

View other metadata

Visit web site

Play-list

Librarian and more.

Digital Content Librarian

The Digital Content Librarian can be invoked implicitly when selecting songs or Play-lists (see above) or may be opened in its own window for management of the Song Library on the End-User(s)' system. In that case, these are the End-User(s)' options:

Working with songs:

Sort All by Artist, Category, Label, other

Select Songs by Artist, Category, Label, other

Add selected songs to Current Play-list

Copy Song to CD (if enabled)

Delete Song

Add Song to Category and more.

Work with Play-lists:

Sort by Name

Sort by Category

Search by Keyword

Search by Included Song Title

Load Selected Play-list

Rename Play-list

Delete Play-list

Create CD from Selected Play-list (if enabled) and more.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A computer readable medium containing program instructions for permitting the electronic delivery of digital content from an electronic store to one or more user systems, the program instructions for execution at the electronic store comprising instructions for:

acquiring metadata including usage conditions which has been previously associated with digital content and a first decrypting key for decrypting previously encrypted digital content, the first decrypting key previously encrypted with a second encrypting key from a trusted custodian for rights management and metering;

extracting at least part of the metadata;

altering, as permitted by the usage conditions, at least one of the metadata to create offer data;

receiving a request from at least one user system for the offer data, wherein the offer data includes a transaction id;

sending to the one or more user systems the offer data which has been requested;

receiving a request from the at least one user system for transaction data corresponding to the offer data including the transaction id previously sent and a third encrypting key from the at least one user system;

altering at least one of the metadata to create transaction data; and sending the transaction data to the one or more user systems that requested the transaction data, wherein the transaction data includes usage conditions for the digital content along with the third encrypting key which is subsequently used by the trusted custodian for rights management and metering to reencrypt the first decrypting key, which was previously encrypted with the second encrypting key.

2. The computer readable medium according to claim 1 further comprising instructions for:

acknowledging that a customer's system has requested the purchase of the content described in the offer data; and transmitting the transaction data to the customer's system.

3. The computer readable medium according to claim 1 further comprising instructions for:

querying if the electronic store has paid for at least part of the promotional metadata; and allowing at least that part of promotional metadata which has been paid for by the electronic store to be extracted.

4. The computer readable medium according to claim 1, wherein the step of receiving a request includes receiving a request from one or more user systems for transaction data corresponding to the offer data including the transaction id previously sent and an encryption key from the one or more user systems and the step of sending the transaction data includes sending the transaction data to the one or more user systems that requested the transaction data, wherein the transaction data includes usage conditions for the content and the encryption key from the one or more user systems.

5. The computer readable medium according to claim 1, further comprising instructions for:

prompting an authorized operator of the electronic store for one or more addresses for an account reconciliation house and the electronic store; and placing any addresses entered by an authorized operator into the transaction data.

6. The computer readable medium according to claim 1, further comprising instructions for:

logging offer data and transaction data sent to a customer's system; and reconciling the transaction data sent from the customer's system to a clearinghouse with the transaction data sent to the customer's system by the electronic store for the same content.

7. The computer readable medium according to claim 1, further comprising an instruction for presenting the non-encrypted content of the metadata to an authorized operator of the electronic store after the metadata has been acquired.

8. The computer readable medium according to claim 1, further comprising an instruction for presenting the non-encrypted content of the metadata to an authorized operator for reviewing the metadata before acquiring the metadata.

9. The computer readable medium according to claim 8, wherein the instruction for presenting the non-encrypted content is presented through a web browser interface.

10. The computer readable medium according to claim 8, further comprising instructions for previewing the metadata containing one or more types of data associated with a musical recording at least one of graphic data, song clip data, album data, artist data, and lyric data.

11. The computer readable medium according to claim 1, further comprising instructions for:

extracting usage conditions from the metadata;

prompting an authorized operator of the electronic store for modifications to the usage conditions;

validating the modifications of the usage conditions from the operator with the usage conditions that have been extracted; and placing the validated usage conditions into the offer data.

12. The computer readable medium according to claim 11, further comprising instructions for:

constructing a license having terms and conditions of the use for the content based on the usage conditions placed into the transaction data; and placing the license into the transaction data.

13. A method for permitting the electronic delivery of digital content from an electronic store to one or more user systems the method for execution at the electronic store comprising the steps of:

acquiring metadata including usage conditions which has been previously associated with digital content and a first decrypting key for decrypting previously encrypted digital content, the first decrypting key previously encrypted with a second encrypting key from a trusted custodian for rights management and metering;

extracting at least part metadata;

altering, as permitted by the usage conditions, at least one of the metadata to create offer data as provided by the usage conditions;

receiving a request from at least one user system for the offer data, wherein the offer data includes a transaction id;

sending to the one or more user systems the offer data which has been requested;

receiving a request from the at least one user system for transaction data corresponding to the offer data including the transaction id previously sent and a third encrypting key from the at least one user system;

altering at least one of the metadata to create transaction data; and sending the transaction data to the one or more laser systems that requested the transaction data, wherein the transaction data includes usage conditions for the digital content along with the third encrypting key which is subsequently used by the trusted custodian for rights management and metering to reencrypt the first decrypting key, which was previously encrypted with the second encrypting key.

14. The method of claim 13, further comprising the steps of:

acknowledging that a customer's system has requested the purchase of the content described in the offer data; and transmitting the transaction data to the customer's system.

15. The method of claim 13, further comprising the steps of:

querying if the electronic store has paid for at least part of the promotional metadata; and allowing at least that part of promotional metadata which has been paid for by the electronic store to be extracted.

16. The method of claim 13, wherein the step of receiving a request includes receiving a request from one or more user systems for transaction data corresponding to the offer data including the transaction id previously sent and an encryption key from the one or more user systems and the step of sending the transaction data includes sending the transaction data to the one or more user systems that requested the transaction data, wherein the transaction data includes usage conditions for the content and the encryption key from the one or more user system.

17. The method of claim 13, further comprising the steps of:

prompting an authorized operator of the electronic store for one or more addresses for an account reconciliation house and the electronic store; and placing any addresses entered by an authorized operator into the transaction data.

18. The method of claim 13, further comprising the steps of:

logging offer data and transaction data sent to a customer's system; and reconciling the transaction data sent from the customer's system to a clearinghouse with the transaction sent to the customer's system by the electronic store for the same content.

19. The method of claim 13, further comprising the steps of:

presenting the non-encrypted content of the metadata to an authorized operator of the electronic store after the metadata has been acquired.

20. The method of claim 13, further comprising the steps of:

presenting the non-encrypted content of the metadata to an authorized operator for reviewing the metadata before acquiring the metadata.

21. The method of claim 20 wherein the instruction for presenting the non-encrypted content is presented through a web browser interface.

22. The method of claim 20, further comprising the step of previewing the metadata containing one or more types of data associated with a musical recording at least one of graphic data, song clip data, album data, artist data, and lyric data.

23. The method of claim 13 further comprising the steps of:

extracting usage conditions from the metadata;

prompting an authorized operator of the electronic store for modifications to the usage conditions;

validating the modifications of the usage conditions from the operator with the usage conditions that have been extracted; and placing the validated usage conditions into the offer data.

24. The method of claim 23 further comprising the steps of:

constructing a license having terms and conditions of the use for the content based on the usage conditions placed into the transaction data; and placing the license into the transaction data.

25. An electronic store for permitting the decryption of electronic content comprising:

a secure container packing tool including:

means for acquiring metadata including usage conditions which has been previously associated with digital content and a first decrypting key for decrypting previously encrypted digital content, the first decrypting key previously encrypted with a second encrypting key from a trusted custodian for rights management and metering;

means for extracting promotional metadata by an electronic store;

means for altering, as permitted by the usage conditions, at least one of the metadata to create offer data as provided by the usage conditions;

means for receiving a request from at least one user system for the offer data, wherein the offer data includes a transaction id;

means for sending to the one or more user systems the offer data which has been requested;

means for receiving a request from the at least one user system for transaction data corresponding to the offer data including the transaction id previously sent and a third encrypting key from the at least one user system;

a transaction processor module interfaced with the secured container packer tool for altering at least one of the metadata to create transaction data; and wherein the transaction data is sent to the one or more user systems that requested the transaction data, wherein the transaction data includes usage conditions for the digital content along with the third encrypting key which is subsequently used by the trusted custodian for rights management and metering to reencrypt the first decrypting key, which was previously encrypted with the second encrypting key.

26. The electronic store of claim 25 further comprising:

means for querying if the electronic store has paid for at least part of the promotional metadata; and means for allowing at least that part of promotional metadata which has been paid for by the electronic store to be extracted.

27. The electronic store of claim 25 further comprising:

means for prompting an authorized operator of the electronic store for one or more addresses for an account reconciliation house and the electronic store; and means for placing any addresses entered by an authorized operator into the transaction data.

28. The electronic store of claim 25 further comprising:

means for logging offer data and transaction data sent to a customer's system; and means for reconciling the transaction data sent from the customer's system to a clearing house transaction data sent to the customer's system by the electronic store for the same content.

* * * * *